United States Patent
Romanov

(10) Patent No.: US 6,434,144 B1
(45) Date of Patent: Aug. 13, 2002

(54) MULTI-LEVEL TABLE LOOKUP

(76) Inventor: Aleksey Romanov, 24 Highland View Dr., Sutton, MA (US) 01590

( * ) Notice: Subject to any disclaimer, the term of this patent is extended or adjusted under 35 U.S.C. 154(b) by 0 days.

(21) Appl. No.: 09/110,627

(22) Filed: Jul. 6, 1998

(51) Int. Cl.[7] .......................... H04L 12/28; H04L 12/56
(52) U.S. Cl. .................. 370/392; 370/395.32; 711/206; 711/211
(58) Field of Search ................................ 370/390, 392, 370/400, 401, 402, 395.1, 395.3, 395.31, 395.32; 709/238, 242; 711/216, 202, 206

(56) References Cited

U.S. PATENT DOCUMENTS

| | | | | |
|---|---|---|---|---|
| 5,754,547 A | * | 5/1998 | Nakazawa | 370/401 |
| 5,835,720 A | * | 11/1998 | Nelson et al. | 709/224 |
| 5,898,686 A | * | 4/1999 | Virgile | 370/381 |
| 5,996,021 A | * | 11/1999 | Civanlar et al. | 709/238 |
| 6,011,795 A | * | 1/2000 | Varghese et al. | 370/392 |
| 6,157,644 A | * | 12/2000 | Bernstein et al. | 370/392 |

* cited by examiner

*Primary Examiner*—David Vincent
*Assistant Examiner*—Bob A. Phunkulh
(74) *Attorney, Agent, or Firm*—Davis & Bujold, P.L.L.C.

(57) ABSTRACT

A multi-level table is searched for an item in an item database matching a search key. For example, a multi-level search table is searched for an identifier of an Internet Protocol prefix stored in a prefix database which most closely matches an Internet Protocol address. The search table may be modified in response to changes to the item database while the table is being searched. Default item identifier tables may be used to store default item identifiers which reduce the complexity of update operations.

40 Claims, 29 Drawing Sheets

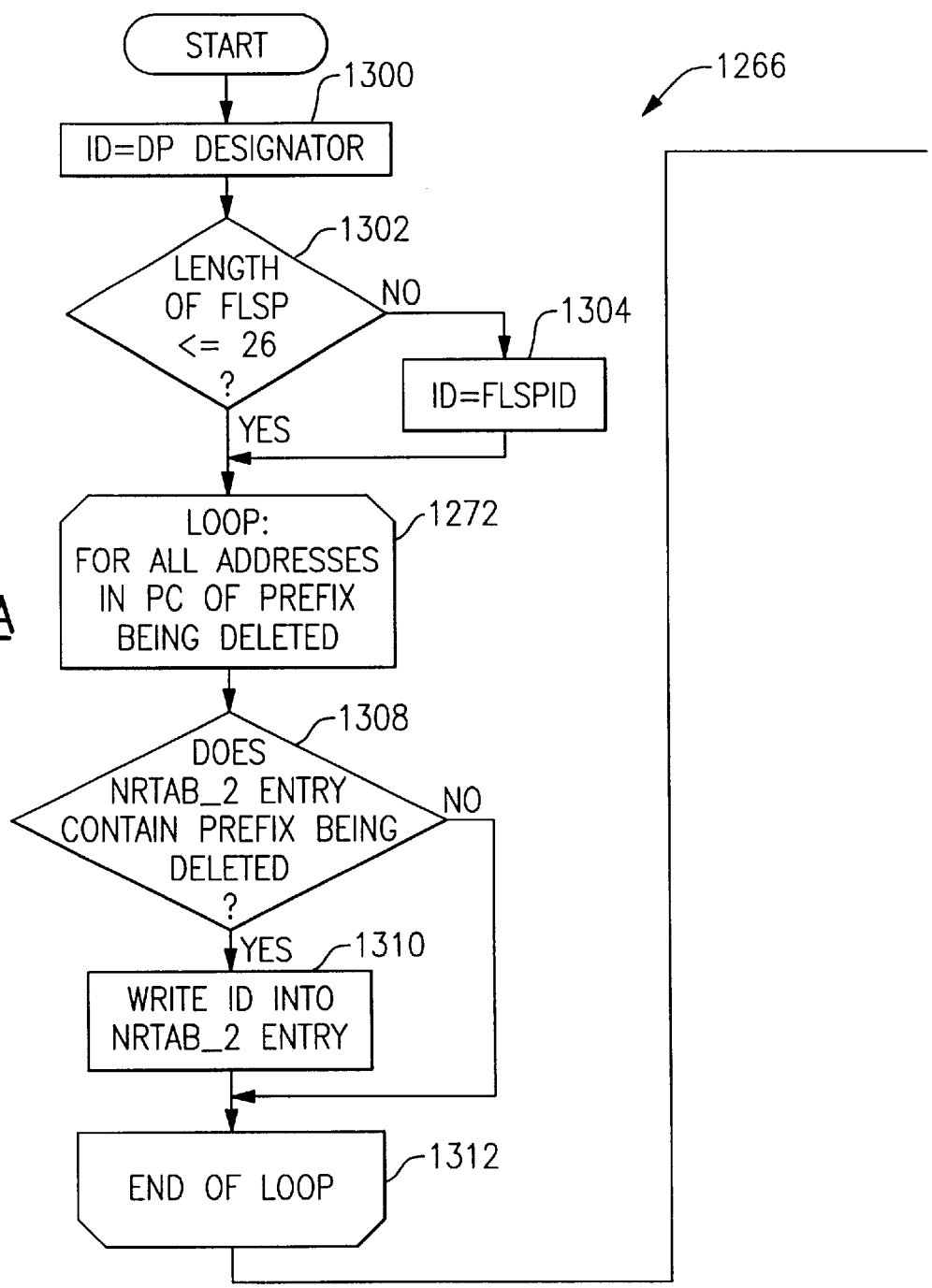
FIG. 24A
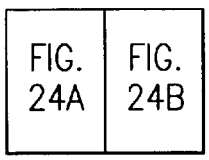

MULTI-LEVEL TABLE LOOKUP

BACKGROUND OF THE INVENTION

The present invention relates to searching for a value in a multi-level table.

Routers route network packets based on network address information that is embedded in the headers of the packets. For example, referring to FIG. 1, in an Internet Protocol (IP) network 10 such as the Internet, end stations ES1, ES2, and ES3 are connected to routers R1, R4, and R5, respectively. End stations E1, E2, and E3 may each be, for example, a client or a server. Each of the routers in the network 10 is connected to one or more other routers. Each stream of information transmitted from one end station to another is broken into packets containing, among other things, a destination address indicating the end station to which the packet should be delivered.

A packet is transmitted from one end station to another via a sequence of routers. For example, a packet may originate at end station ES1, traverse routers R1, R2, R3, and R4, and then be delivered to end station ES2. Each router has access to information about each of the nodes to which the router is connected. When a router receives a packet, the router examines the packet's destination address and forwards the packet to a node that the router calculates to be most likely to bring the packet closer to its destination address. The process of choosing an intermediate destination for a packet and forwarding the packet to the intermediary destination is called routing.

The main step performed by a router is to look up the destination address of each incoming packet in a table called a routing table in order to determine to which router or end station the packet should be forwarded.

An IP router's routing table contains records which each associate an IP address "prefix" with an output link of the router. For this reason the routing table of an IP router will also be referred to as a "prefix database" herein. A prefix is a sequence of bits representing the most significant bits of an IP address, such as the portion of an IP address corresponding to a second-level domain. When an IP router receives a packet, it identifies the longest prefix in the routing table that matches the beginning of the packet's destination address. The router then sends the packet to the router output link associated with the identified prefix, thereby forwarding the packet to another router or to the packet's destination end station (the "next hop" in the network).

For example, if a routing table contains the prefixes P1=0101, P2=0101101, and P3=010110101011, the longest matching prefix for a destination address whose first 12 bits are 010101101011 is the prefix P1. The longest matching prefix for a destination address whose first 12 bits are 010110101101 is the prefix P3. The process of finding the longest matching prefix for a destination address is called lookup.

SUMMARY OF THE INVENTION

In one aspect, the invention features a device for identifying an item that is an optimal match for a search key. The device includes a first search stage, which includes an input for receiving a signal corresponding to a first part of the search key, a first output for developing a first control signal indicating whether the item can be identified from the first part of the search key, and a second output for developing a first item identifier signal identifying the item if the item can be identified from the first part of the search key and for developing a second control signal if the item cannot be identified from the first part of the search key. The device also includes a second search stage for identifying the item based on the second control signal and a second part of the search key, including a first input coupled to the second output of the first search stage, a second input for receiving a signal corresponding to the second part of the search key, and a first output for developing a second item identifier signal identifying the item. The device also includes a demultiplexor for selecting a select one of the first item identifier signal and the second item identifier signal based on the first control signal.

The item may correspond to a range of Internet Protocol (IP) addresses. The item may be an the item comprises an IP address prefix. The range of addresses may include addresses corresponding to multiple IP address prefixes. The search key may be a destination IP address. The item that is the optimal match for the search key may be the longest prefix in a prefix database that matches the search key. The first part of the search key may be a contiguous sequence of bits in the destination address. The second part of the identifier may be a contiguous sequence of bits in the destination address.

The first search stage may be a first search table memory. The first search table memory may store a first search table, wherein entries in the first search table correspond to ranges of Internet Protocol addresses, some entries in the first search table store prefix identifiers for developing the first item identifier signal, and some entries store second search stage identifiers for developing the second control signal.

The second search stage may be a second search table memory, and the second control signal may be an addressing signal for partially addressing the second search table memory. The second search table memory may store a second search table, entries in the second search table corresponding to ranges of Internet Protocol addresses, the entries storing prefix identifiers for developing the second item identifier signal.

The device may include default memories for storing default values of items. The demultiplexor may include a first control input coupled to the first output of the first search stage, a first data input coupled to the second output of the first search stage, and a second data input coupled to the output of the second search stage. The demultiplexor may select the first prefix identifier signal if the first control signal indicates that the prefix can be identified from the first part of the destination address, and may select the second prefix identifier signal otherwise.

The second search stage of the device may operate simultaneously with the first search stage.

In another aspect, the invention features a computer-implemented method for searching a multi-level search table for a best-matching item identifier specifying an item corresponding to a search key. An entry in a first level of the search table corresponding to the search key is identified. If the entry contains an item identifier, the item identifier is identified as the best-matching item identifier. Otherwise, a subsequent level of the multi-level search table is searched for the best-matching item identifier using information associated with the entry that is descriptive of the subsequent level and of a first default value.

Searching the subsequent level of the multi-level search table may result in information descriptive of a second default value, in which case the second default value is replaced with the first default value.

The item may be a prefix of an IP address. The search key may be an IP address. The information contained in the entry may identify a part of the subsequent level of the multi-level search table corresponding to the destination address. The part may be a sub-table of the subsequent level of the multi-level search table. The part may be an entry of the subsequent level of the multi-level search table.

Entries in the multi-level search table may correspond to ranges of Internet Protocol addresses. If a prefix database contains a prefix corresponding to all Internet Protocol addresses within a range, then an entry in the search table corresponding to the range identifies the prefix. Otherwise, the entry in the search table corresponding to the range identifies a part of a subsequent level of the search table corresponding to the destination address. If the entry indicates a default item identifier, a default item identifier corresponding to the search key is idenfitied as the best-matching item identifier.

The item may be a prefix of an Internet Protocol address, and the search key may be an Internet Protocol address. The default item identifier may be stored in a table of default item identifiers, and the default item identifier may be located in the table of default item identifiers using the search key. An exception may be generated if the item identifier is associated with exception information descriptive of the search key.

In another aspect, the invention features a data structure tangibly stored on a computer-readable medium, the data structure representing a multi-level search table for identifying a best-matching prefix identifier identifying a prefix corresponding to a destination address. The data structure includes a plurality of levels of search tables, entries of the search tables corresponding to ranges of Internet Protocol addresses. If a prefix database contains a prefix corresponding to all Internet Protocol addresses within a range, then an entry in the search table corresponding to the range identifies the prefix. Otherwise, the entry in the search table corresponding to the range identifies a part of a subsequent level of the search table corresponding to the destination address. The data structure further includes a plurality of levels of default prefix tables, entries of the default prefix tables corresponding to default prefixes for ranges corresponding to entries in the search tables.

If a prefix corresponding to all and only all of the addresses within the range is contained in a prefix database, then the default prefix of the range is the prefix. Otherwise, the default prefix of the range is the first prefix in the prefix database that is less specific than the prefix.

In another aspect, the invention features a computer-implemented method for updating a multi-level search table in response to addition of an item to an item database, the item corresponding to a level of the multi-level search table. The level of the search table is updated and a default table corresponding to the level of the search table is updated.

The item may be an Internet Protocol address prefix, and the search key may be an Internet Protocol address. Entries in the default table may correspond to ranges of Internet Protocol addresses corresponding to the level of the search table, and entries of the default table may contain default prefixes for the ranges of Internet Protocol addresses. Entries of a first level of the multi-level search table may contain a default value, and other levels of the multi-level search table may contain a default value designator. Updating may be pipelined.

In another aspect, the invention features a computer-implemented method for updating a multi-level search table in response to deletion of an item from an item database, the item corresponding to a level of the multi-level search table. The level of the search table is updated and a default table corresponding to the level of the search table is updated.

The item may be an Internet Protocol address prefix and the search key may be an Internet Protocol address. Entries in the default table may correspond to ranges of Internet Protocol addresses corresponding to the level of the search table, and entries of the default table may contain default prefixes for the ranges of Internet Protocol addresses. Entries of a first level of the multi-level search table may contain a default value, and other levels of the multi-level search table may contain a default value designator. Updating may be pipelined. Detection of whether the prefix is the only prefix in the item database that is more specific than a range of Internet Protocol addresses corresponding to an entry in the multi-level search table may be performed.

Among the advantages of the invention are one or more of the following.

One advantage of the invention is that the size of the multi-level search table varies linearly with the size of the pattern database to which it corresponds. This results in the ability to maintain search tables for very large pattern databases at a cost that varies linearly with the size of the pattern database.

Another advantage of the invention is that searches performed using the multi-level search table can be performed very quickly, for example, at speeds of 100,000,000 searches per second using SRAM technology currently available or at speeds of 10,000,000 lookups per second using DRAM technology currently available. Furthermore, if pipelining is used, the speed at which searches are performed does not noticeably increase as the number of levels in the search table is increased.

Another advantage of the invention is that search table update operations can be performed in an incremental manner, allowing search table update operations to be interleaved with search operations. This eliminates service interruptions due to the need to wait for completion of updates before searching can be resumed. Furthermore, because search operations can be performed while search memory is being updated, it is not necessary to maintain multiple copies of search memory in order to interleave update operations with search operations.

Another advantage of the invention is that the rate at which searches are performed is uniform and predictable, regardless of the particular distribution of patterns in the pattern database and of the nature of the search requests.

Another advantage of the invention is that it does not require that the entire search table be re-generated in response to changes to the prefix database. Rather, when a prefix is added to or deleted from the prefix database, only those parts of the search table that are affected by the change to the prefix database are updated.

Another advantage of the invention is that the methods of searching and updating the search table are particularly well suited for use in systems such as IP networks, where the length of the patterns (e.g., prefixes) in the pattern database varies. For example, under IPv4, prefix lengths vary from 8 to 32 bits, and under IPv6, prefix lengths vary from 16 to 64 bits.

Another advantage of the invention is that the use of default prefix tables simplifies the process of updating the multi-level search table and therefore increases the speed with which the table can be updated. Furthermore, the use of default prefix tables simplifies the update machinery, allowing updates to be limited to a single stage of the search device. Additionally, because default prefix tables reduce the complexity of update operations and increase the speed at which updates can be performed, the degree to which search operations are interrupted by update operations is greatly reduced.

The techniques described below may be implemented in computer hardware or software, or a combination of the two. However, the techniques are not limited to any particular hardware or software configuration; they may find applicability in any computing or processing environment that may be used for searching a multi-level table for a value. The techniques may be implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to the one or more output devices.

Each process described herein may be implemented, for example, in a high level procedural or object oriented programming language to communicate with a computer system. However, the programs can be implemented in assembly or machine language, if desired. In any case, the language may be a compiled or interpreted language.

Each such computer program may be stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages of the invention will become apparent from the following description and from the claims.

BRIEF DESCRIPTION OF THE DRAWINGS

FIGS. 22, 23 and 24A and 24B (FIGS. 24A and 24B are hereafter collectively referred to as FIG. 24) are flow charts of methods for updating a multi-level search table with default prefix tables in response to the deletion of a prefix from a prefix database.

DETAILED DESCRIPTION

To illustrate how a packet may be forwarded to the correct output link of a router, it is necessary first to describe certain aspects of IP prefixes. For purposes of example, the discussion below relates to IPv4 unless otherwise stated. A prefix is expressed herein as a sequence of four bytes in decimal notation separated by dots, followed by a slash and the number of bits in the prefix. The length of a prefix is counted from the left. Bits beyond the prefix length are considered to be equal to zero.

Figure 1:
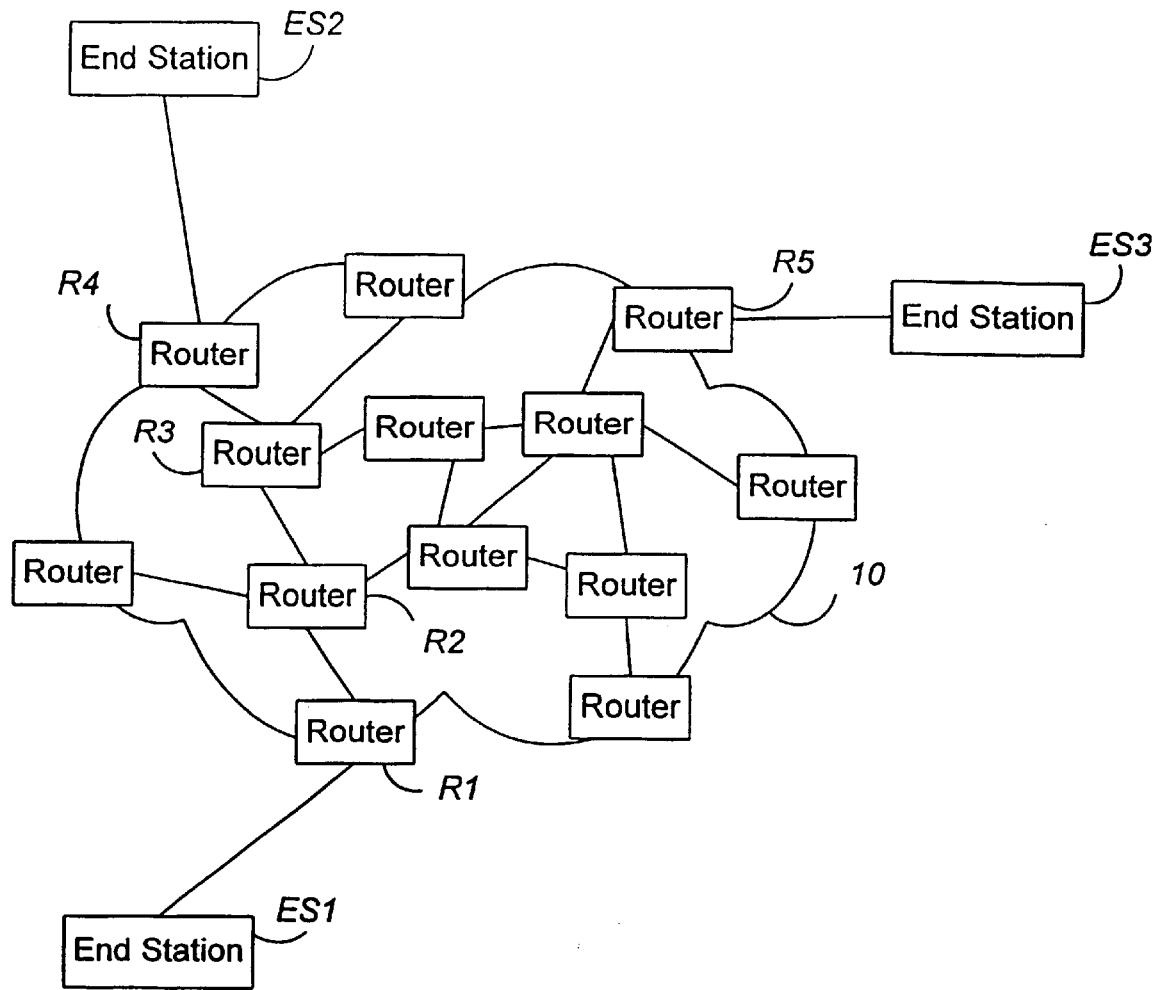
FIG. 1 is a block diagram of an Internet Protocol (IP) network.
Figure 2:
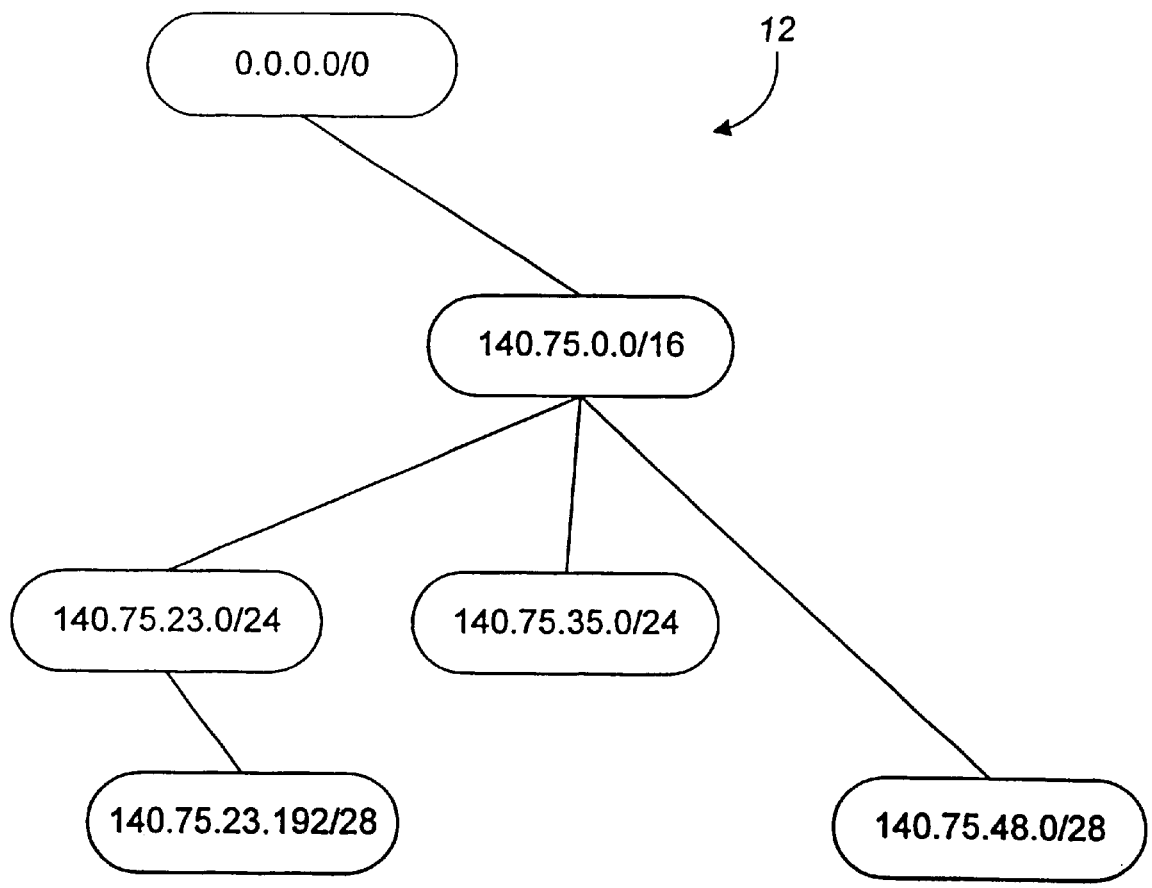
FIG. 2 is a diagram of a tree structure representing the prefixes in a prefix database.

Referring to FIG. 2, a prefix database containing the prefixes 0.0.0.0/0, 140.75.0.0/16, 140.75.23.0/24, 140.75.23.192/28, 140.75.35.0/24, and 140/75.48.0/28 may be represented hierarchically by a tree 12. Each node of the tree 12 represents a prefix in the prefix database. Consider, for example, the prefix 140.75.0.0/16. This prefix corresponds to the IP addresses in a continuum from 140.75.0.0 to 140.75.255.255. This continuum is referred to as the "prime continuum" of the prefix 140.75.0.0/16. Similarly, the prime continuum of the prefix 140.75.23.0/24 ranges from 140.75.23.0 to 140.75.23.255, and so on. Each prefix in the prefix database has one and only one prime continuum.

It is possible that there is no prefix in the prefix database which matches a particular destination address. We define all such destination addresses as matching the "default prefix" of 0.0.0.0/0. The prime continuum of the default prefix is the entire IP address space, in other words, the range of addresses from 0.0.0.0 to 255.255.255.255. The output link to which packets matching the default prefix should be routed is determined by the user. For example, the user can specify that packets whose destination addresses match the default prefix be forwarded along a default route. The user may also specify, for example, that such packets be dropped. The default prefix is always present in the prefix database and is always included in the count of the number of entries in the prefix database.

If a prefix matches the beginning of a longer prefix, then the longer prefix is a "more specific" prefix than the shorter prefix. For example, the prefix 140.75.23.0/24 is more specific than 140.75.0.0/16 and the prefix 140.75.23.192/28 is more specific than both 140.75.0.0/16 and 140.75.23.0/24. If a first prefix is more specific than a second prefix, then the prime continuum of the first (more specific) prefix is wholly contained in the prime continuum of the second (less specific) prefix. This is reflected in the tree 12 of FIG. 2. Any two prefixes in the prefix database that belong to the same branch of the tree 12 are in a less specific/more specific relationship with each other. If a first prefix is immediately above a second prefix in the tree 12, the first prefix is referred to as the second prefix's "first less specific prefix." For example, referring to FIG. 2, the prefix 140.75.0.0/16 is the first less specific prefix of 140.75.48.0/28.

To forward a packet with a particular destination address to the proper output link of the router, it is necessary to find the longest prefix in the prefix database that matches the beginning of the destination address. Such a prefix is referred to as the destination address' "longest-matching prefix" or "best-matching prefix." For example, the longest matching prefix in the prefix database shown in FIG. 2 for the destination address 140.75.35.12 is the prefix 140.75.35.0/24.

Each prefix in the prefix database is assigned a "prefix identifier" (prefix ID). Referring again to FIG. 2, assume that the prefixes in the prefix database have been assigned prefix identifiers as follows: 0.0.0.0/0 (0), 140.75.0.0/16 (1), 140.75.23.0/24 (2), 140.75.35.0/24 (3), 140.75.23.192/28 (4), 140.75.48.0/28 (5).

Each prefix in the prefix database is the longest matching prefix for a different range of addresses in the IP address space. Table 1 shows the longest matching prefix in the prefix database shown in FIG. 2 for each range of addresses in the IP address space.

TABLE 1

| First Address | Last Address | Longest Matching Prefix | Prefix ID |
| --- | --- | --- | --- |
| 0.0.0.0 | 140.74.255.255 | 0.0.0.0/0 | 0 |
| 140.75.0.0 | 140.75.22.255 | 140.75.0.0/16 | 1 |
| 140.75.23.0 | 140.75.23.191 | 140.75.23.0/24 | 2 |
| 140.75.23.192 | 140.75.23.207 | 140.75.23.192/28 | 4 |
| 140.75.23.208 | 140.75.23.255 | 140.75.23.0/24 | 2 |
| 140.75.24.0 | 140.75.34.255 | 140.75.0.0/16 | 1 |
| 140.75.35.0 | 140.75.35.255 | 140.75.35.0/24 | 3 |
| 140.75.36.0 | 140.75.47.255 | 140.75.0.0/16 | 1 |
| 140.75.48.0 | 140.75.48.15 | 140.75.48.0/28 | 5 |
| 140.75.48.16 | 140.75.255.255 | 140.75.0.0/16 | 1 |
| 140.76.0.0 | 255.255.255.255 | 0.0.0.0/0 | 0 |

Figure 3:
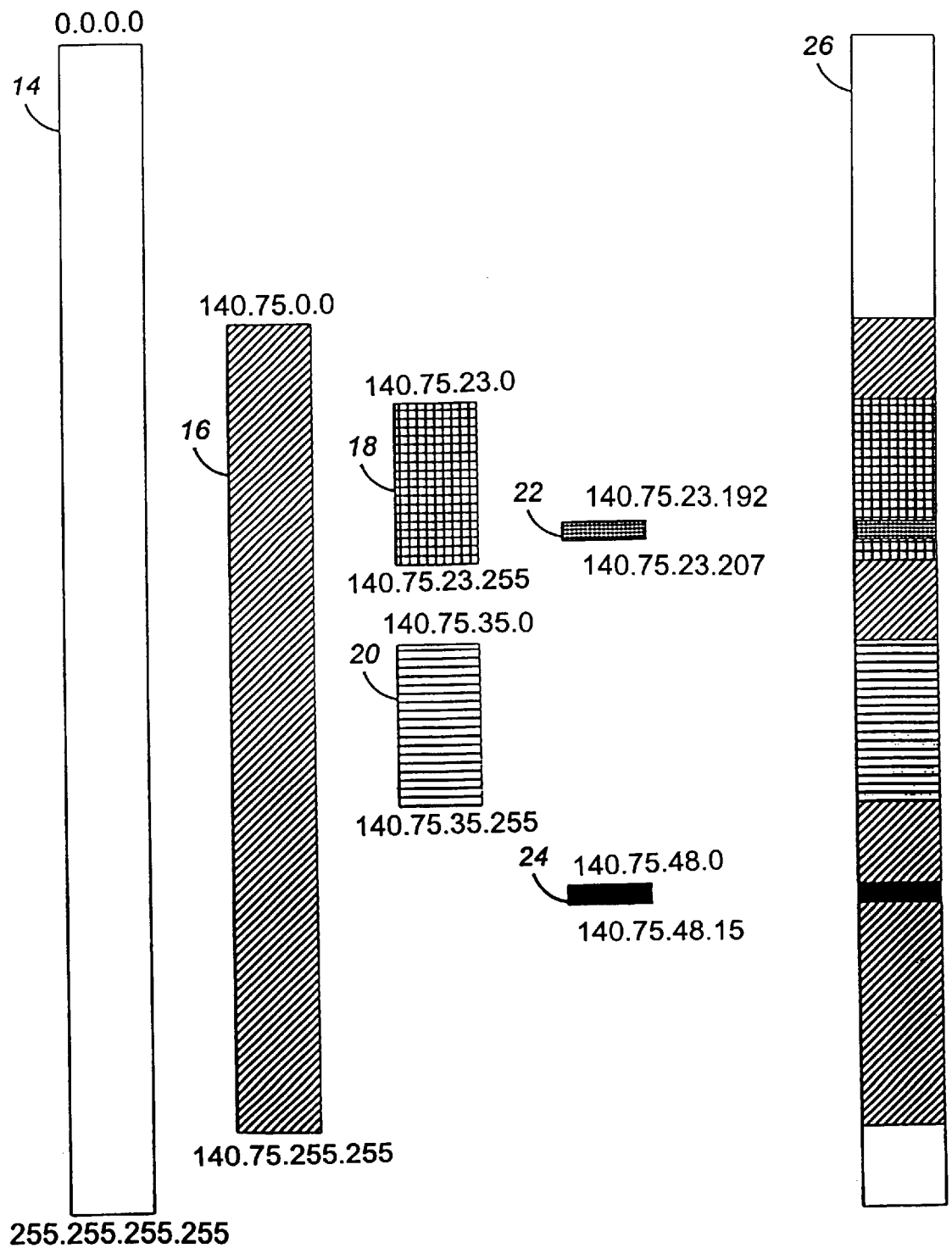
FIG. 3 is a diagram representing IP addresses corresponding to IP prefixes in a prefix database.

The range of addresses covered by each prefix and the longest matching prefix for each range of addresses is shown graphically in FIG. 3. Column 14 represents the prime continuum of the default prefix, in other words, the entire IP address space ranging from 0.0.0.0 to 255.255.255.255. Column 16 represents the prime continuum of the prefix 140.75.0.0/16, in other words, the IP addresses ranging from 140.75.0.0 to 140.75.255.255. Similarly, columns 18, 20, 22, and 24 represent the prime continuums of the prefixes 140.75.23.0/24, 140.75.35.0/24, 140.75.23.192/28, and 140.75.48.0/28, respectively. Each of the columns 14–24 is filled with a distinct pattern.

Column 26, like column 14, represents all addresses in IP address space. Each area within column 26 represents a range of IP addresses, and is filled with the pattern of the longest matching prefix for the range of addresses. For example, the longest matching prefix for destination address 140.75.23.12 is 140.75.23.0/24, which is indicated by the fact that the location on column 22 corresponding to destination address 140.75.23.12 is filled with the same pattern as column 18, representing the prefix 140.75.23.0/24.

Assume that IP address space is divided into 16M equal contiguous ranges of addresses, referred to as "search intervals" (SI's), with the first search interval ranging from 0.0.0.0 to 0.0.0.255, the second search interval ranging from 0.0.1.0 to 0.0.1.255, ... and the 16,777,216$^{th}$ search interval ranging from 255.255.255.0 to 255.255.255.255. If the same prefix in the prefix database matches all addresses in a given interval (contiguous range) of IP addresses, then the interval is a "uniform" search interval (USI). If more than one prefix matches addresses in an interval, then the interval is a "non-uniform" search interval (NSI). Given the prefix database shown in FIG. 2, all intervals created in this way are uniform intervals except for the interval ranging from 140.75.23.0 to 140.75.23.255 and the interval ranging from 140.75.48.0 to 140.75.48.255. The interval ranging from 140.75.23.0 to 140.75.23.255 is non-uniform, for example, because some of the addresses contained within it match the prefix 140.75.23.0/24 and some of the addresses contained within it match the prefix 140.75.23.192/28.

If intervals are selected to make every interval be the prime continuum of an IP address prefix (which need not be a prefix in the prefix database), then the number of non-uniform intervals is related to the number of prefixes in the prefix database. Given a particular interval which is the prime continuum of a particular IP address prefix, if there is no prefix in the prefix database that is more specific than the interval's prefix, then the interval is a uniform interval. For example, consider the interval ranging from 140.75.35.0 to 140.75.35.255, which is the prime continuum of the prefix 140.75.35.0/24. As shown in FIG. 3, there is no prefix in the prefix database that is more specific than this interval's prefix, and therefore the interval is a uniform interval.

Conversely, there is at least one prefix in the prefix database that is more specific than any given non-uniform interval. Therefore, the number of non-uniform intervals is limited by the number of prefixes that are longer (more specific) than the prefixes corresponding to the intervals into which the address space has been divided. Because this number of prefixes cannot be greater than the number of prefixes in the prefix database, the following relationship holds:

$$N_{non-uniform} \leq N_{prefixes} - 1, \qquad \text{Equation 1}$$

where $N_{non-uniform}$ is the number of non-uniform intervals, and $N_{prefixes}$ is the number of prefixes in the prefix database. The −1 in Equation 1, above, is due to the fact that the default prefix (0.0.0.0/0) is always present in the prefix database and is shorter than any other prefix.

Search Table Structure

Figure 4:
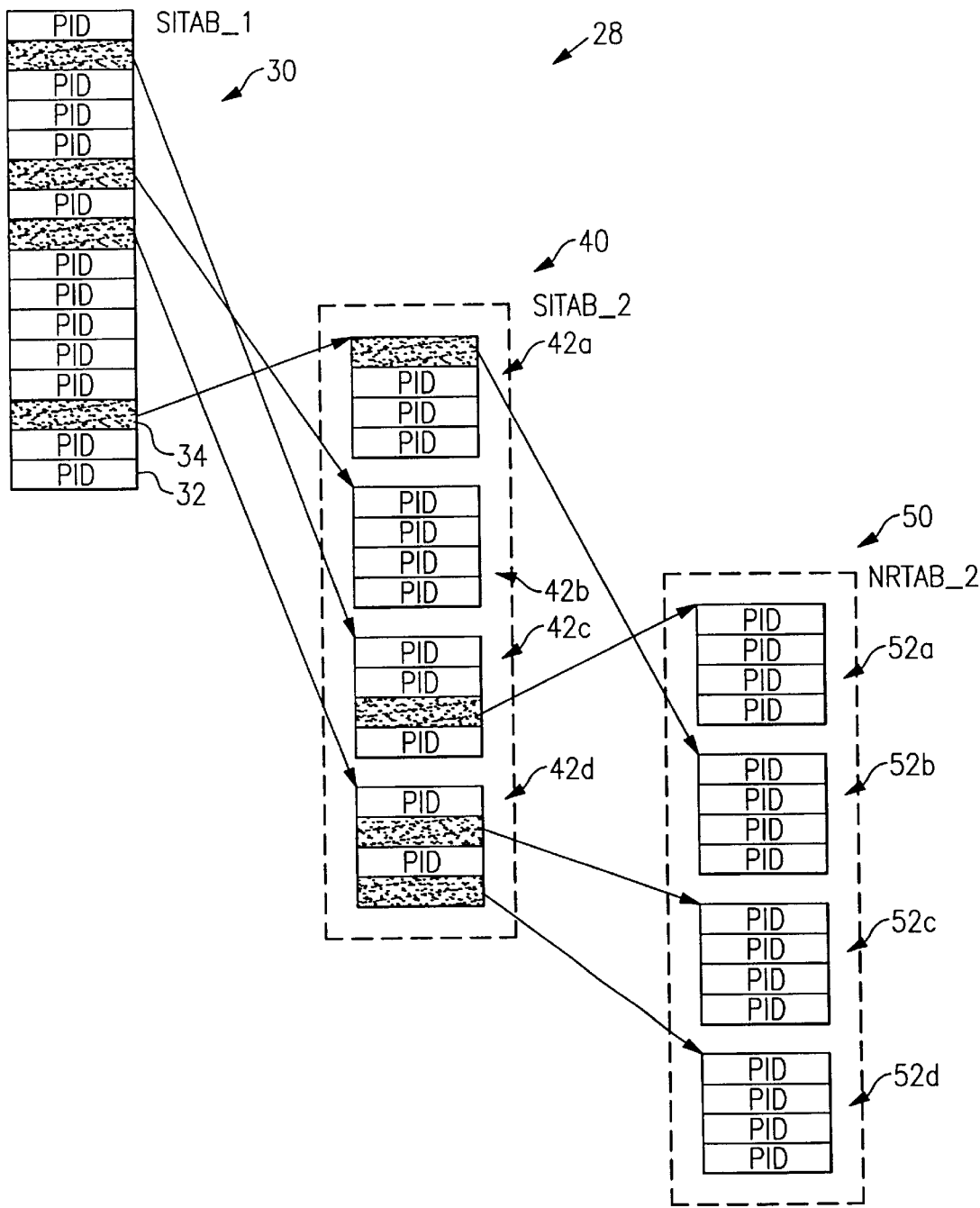
FIG. 4 is a diagram representing a multi-level search table.

A search table is used to search for the longest prefix in the prefix database that matches a given destination address. As will be described in more detail below, the relationship represented by Equation 1 can be used to determine how much memory is needed to store the search table. Referring to FIG. 4, a two-level search table 28 includes a level 1 search interval table (SITAB_1) 30, a level 2 search interval table (SITAB_2) 40, and a level 2 non-uniform resolution table 50 (NRTAB_2). Each entry in the two-level search table 28 corresponds to an interval of IP addresses. Consecutive entries in the tables 30, 40, and 50 correspond to consecutive IP address intervals.

Associated with each entry in the level 1 search interval table 30 is a discriminator specifying whether the corresponding interval is a uniform search interval or a non-uniform search interval. The table entry for each uniform search interval stores the prefix identifier of the longest prefix in the prefix database that matches the addresses contained in the uniform search interval. Entries containing a prefix identifier are shown in FIG. 4 by the letters "PID";

note, however, that different entries may contain either the same or different prefix identifiers.

The table entry for each non-uniform search interval stores a non-uniform search interval identifier (NSIID) that uniquely identifies the non-uniform search interval. Entries containing a non-uniform search interval identifier are drawn in gray in FIG. 4.

The prefix identifier for a search interval can be of any appropriate form. For example, it can be a pointer to an area in memory containing data specific to the prefix's route. It can also be, for example, a numerical identifier, or a set of data such as an interface number and next hop information used to forward the packet.

The non-uniform search interval identifier can be of any appropriate form. For example, it can be a pointer to the beginning of a sub-table within a subsequent level of the multi-level search table 28. In FIG. 4, for example, the entry 34 in the level 1 search interval table 30 contains a pointer to the beginning of sub-table 42a within the level 2 search interval table 40. The sub-table 42a contains entries corresponding to level 2 search intervals contained within the interval corresponding to entry 34.

Each level 1 non-uniform search interval (NSI_1) is divided into smaller search intervals, referred to as level 2 search intervals (SI_2's). A level 2 search interval table (SITAB_2) 40 consists of sub-tables 42a–d, each of which corresponds to a level 1 non-uniform search interval.

Each level 2 non-uniform search interval (NSI_2) is divided into smaller intervals to create level 3 search intervals (SI_3's), as described above, and so on, until a level X is reached where the intervals are small enough that it is possible to store a prefix identifier identifying the longest prefix in the prefix database matching every address in all of the level's intervals. The table used to store identifiers at this level is referred to as a "level X non-uniform resolution table" (NRTAB_X).

For example, as shown in FIG. 4, a level 2 non-uniform resolution table 50 consists of sub-tables 52a–d, each of which contains only prefix identifiers. Therefore, no additional levels in the multi-level search table 28 are necessary.

Searching

The multi-level search table 28 is used to search for the longest prefix in the prefix database that matches a given destination IP address. The search method described below for searching the search table 28 comprises a sequence of memory read operations, where each memory read operation provides either the information sought (i.e., the longest matching prefix for a destination address) or intermediate information (e.g., a pointer to another memory location) which causes the occurrence of another memory read operation. This method guarantees that the information being sought will be obtained in no more than a predefined number of consecutive memory accesses.

Figure 5:
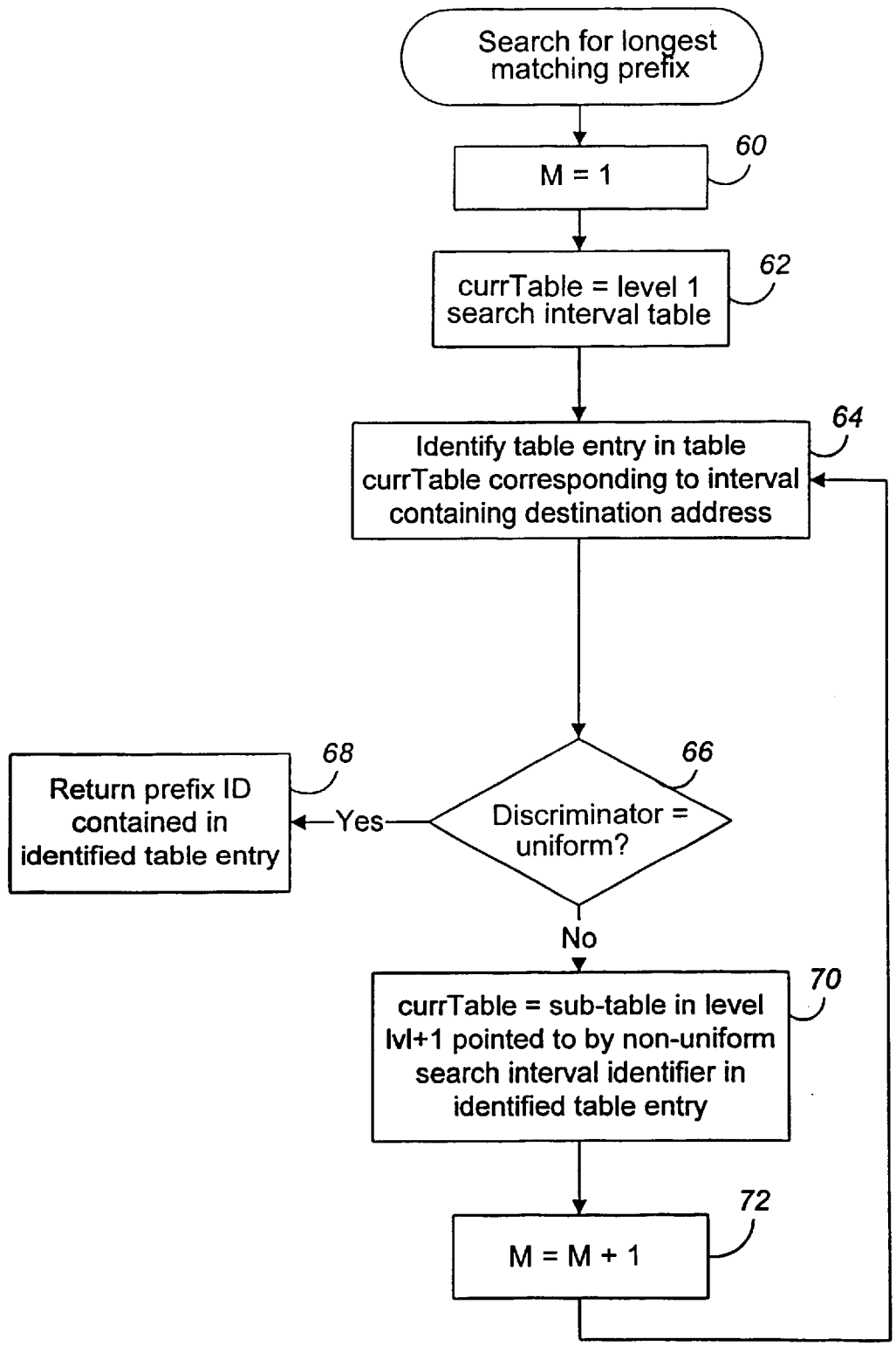
FIG. 5 is a flow chart of a method for searching a multi-level search table for the most-specific prefix matching a destination address.

To identify the longest prefix in the prefix database matching the destination address of a given packet, the following method is used. Referring to FIG. 5, a variable lvl representing the level of the multi-level search table 28 that is currently being searched, is assigned a value of 1 (step 60). A pointer currTable, which points to the table currently being searched, is set to point to the level 1 search interval table (step 62). The table entry in the table pointed to by currTable corresponding to the interval containing the destination address is identified (step 64). If the table entry's discriminator indicates that the corresponding interval is uniform (decision step 66), then the prefix ID contained in the identified table entry is returned (step 68). Otherwise, currTable is set to point to the sub-table in level lvl+1 of the multi-level search table that is pointed to by the non-uniform search interval identifier contained in the identified table entry (step 70). The variable lvl is incremented (step 72), and the table pointed to by currTable is searched (step 64). The loop consisting of steps 64–72 is repeated at subsequent levels of the multi-level search table until the prefix identifier of the longest-matching prefix is found.

Search Device

The search method described above with respect to FIG. 5 may be implemented by any of a number of search devices. Below a number of alternative implementations are discussed for purposes of example.

The following discussion assumes that there exists some form of numerical identifier for each prefix database entry, such as an offset into the array of prefix database entries. We also assume that there exists a numerical identifier for each non-uniform interval, such as an offset into the array of non-uniform interval descriptors.

We assume in the following discussion that an interval entry at a level L is identified by a level −L1 non-uniform identifier concatenated with bits from the destination address being matched. For example, if level 1 intervals have a prefix length of 20 and level 2 intervals have a prefix length of 26, then the address of a level 2 interval entry is defined by the numerical identifier of the level 1 non-uniform interval concatenated with the destination address bits from bit 11 to bit 6.

Consider a one-level search table for a prefix database with a capacity of 64K entries. If IP address space is divided into 16M level 1 search intervals of equal size (resulting in a level 1 search interval prefix length of 24), then each corresponding level 1 search interval in the search table will contain 256 IP addresses. There will be at most 64K non-uniform level 1 search intervals according to Equation 1, above. Therefore, to store the search table it will be necessary to store a total of 32M table entries (16M level 1 search interval table entries, plus 16M=64K×256 entries in the level 1 non-uniform resolution table). We will refer to this search table configuration as "Layout 1."

Figure 6:
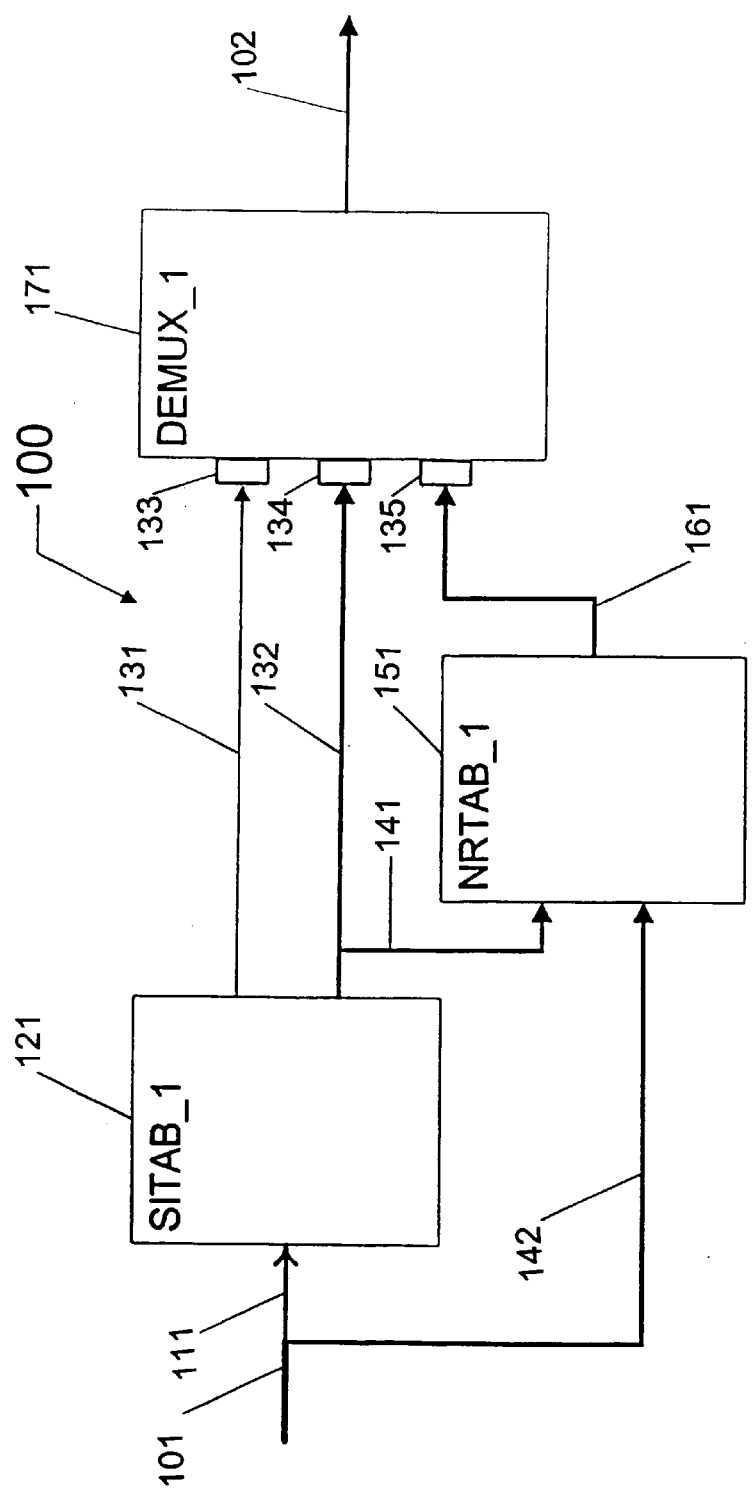
FIG. 6 is a block diagram of a one-level search device.

Referring to FIG. 6, a one-level (two-stage) search device 100 for searching a search table is implemented according to Layout 1. The destination address of the packet to be routed is inputted into device 100 at an input 101. The 20 most significant bits of the destination address received on input 101 are connected to address lines 111 of a level 1 search interval table memory 121. The output line 131 carries the most significant bit of the output of level 1 search interval table memory 121, and is connected to a control input 133 of a level 1 demultiplexor 171. Output lines 132 carry the 16 least significant bits of the output of the level 1 search interval table memory 121, and are connected to a first data input 134 of the level 1 demultiplexor 171. These lines 132 are also connected to the 16 most significant address lines 141 of a level 1 non-uniform resolution table memory 151. The 8 least significant address lines 142 of the level 1 non-uniform resolution table memory 151 carry the 8 least significant bits (destination address bits 11 to 6) of the address received on input 101. Output lines 161 of the level 1 non-uniform resolution table memory 151 are connected to a second data input 135 of the demultiplexor 171. The numerical prefix identifier of the longest matching prefix entry in the prefix database is outputted by the level 1 demultiplexor 471 on the output 402.

The level 1 search interval memory 121 is capable of storing 1M 17-bit words. Each word represents one entry in the level 1 search interval table. The most significant bit of such a word represents the entry's discriminator. If the most significant bit is 1 then the corresponding interval is uniform, in which case the word's 16 least significant bits contain a numerical prefix identifier identifying the matching prefix for all addresses contained in the interval. If the word's most significant bit is 0, then the corresponding interval is non-uniform, in which case the word's 16 least significant bits contain a numerical identifier identifying the corresponding level 1 non-uniform interval.

Table 2 shows the contents of the level 1 search interval table memory 121 for the prefix database shown in FIG. 2. Values in Table 2 are in hexadecimal. Table 2 assumes that the level 1 non-uniform interval 140.75.16.0/20 has a numerical identifier of 1234, that the level 1 non-uniform interval 140.75.32.0/20 has a numerical identifier of 5678, and that the level 1 non-uniform interval 140.75.48.0/20 has a numerical identifier of 9ABC.

TABLE 2

| Address | Contents | Comment | |
|---|---|---|---|
| 00000 | 10000 | 0.0.0.0/24 | |
| . . . | 10000 | | |
| 8C4AFF | 10000 | 140.74.255.0/24 | |
| . . . | 10001 | | |
| 8C4B16 | 10001 | 140.75.22.0/24 | |
| 8C4B17 | 01234 | 140.75.23.0/24 | (non-uniform) |
| 8C4B18 | 10001 | 140.75.24.0/24 | |
| . . . | 10001 | . . . | |
| 8C4B22 | 10001 | 140.75.34.0/24 | |
| 8C4B23 | 05678 | 140.75.35.0/24 | (non-uniform) |
| 8C4B24 | 10001 | 140.75.36.0/24 | |
| . . . | 10001 | . . . | |
| 8C4B2F | 10001 | 140.75.47.0/24 | |
| 8C4B30 | 09ABC | 140.75.48.0/24 | (non-uniform) |
| 8C4B31 | 10001 | 140.75.49.0/24 | |
| . . . | 10001 | . . . | |
| 8C4BFF | 10001 | 140.75.255.0/24 | |
| 8C4C00 | 10000 | 140.76.0.0/24 | |
| . . . | 10000 | 140.76.0.0/24 | |
| FFFFF | 1000 | 255.255.255.255.0/24 | |

The level 1 non-uniform resolution table memory 151 is capable of storing 16M 16-bit words. Each word represents a single prefix identifier. Table 3 shows the contents of a relevant part of the level 1 non-uniform resolution table memory 151 for the prefix database shown in FIG. 2.

TABLE 3

| Address | Content | Comment |
|---|---|---|
| . . . | | |
| 123400 | 0002 | 140.75.23.0 |
| . . . | 0002 | . . . |
| 1234BF | 0002 | 140.75.23.191 |
| 1234C0 | 0004 | 140.75.23.192 |
| . . . | 0004 | . . . |
| 1234CF | 0004 | 140.75.23.207 |
| 1234D0 | 0002 | 140.75.23.208 |
| . . . | 0002 | . . . |
| 1234FF | 0002 | 140.75.23.255 |
| . . . | . . . | . . . |
| 567800 | 0003 | 140.75.35.0 |
| . . . | 0003 | . . . |
| 5678FF | 0003 | 140.75.35.255 |
| . . . | . . . | . . . |
| 9ABC00 | 0005 | 140.75.48.0 |
| . . . | 0005 | . . . |
| 9ABC0F | 0005 | 140.75.48.15 |
| 9ABC10 | 0001 | 140.76.48.16 |
| . . . | 0001 | . . . |
| 9ABCFF | 0001 | 104.75.48.255 |

The level 1 demultiplexor 171 connects one of its data inputs 134, 135 to its output 102 depending upon the value on its control input 133. If the value on the control input 133 is 1 (indicating a uniform interval) then the data input 134 is connected to output 102; if the value on the control input is 0 (indicating a non-uniform interval), then data input 135 is connected to output 102.

Table 4 shows the results of several examples of search operations with relevant intermediate values. An entry containing all x's (e.g., "xxxxxx") indicates that the actual value is irrelevant for purposes of the search. The values in the column entitled "Address Lines 241 and 242" represent values developed by concatenating the values on the address lines 141 and 142.

TABLE 4

| Destination Address | Address Lines 111 | Data Bit 131 | Data bits 132 | Address Lines 241 and 242 | Output 161 | Prefix ID 102 |
|---|---|---|---|---|---|---|
| 10.45.16.98 | 0A2D10 | 1 | 0000 | xxx | xxx | 0000 |
| 140.75.5.20 | 8C4B05 | 1 | 0001 | xxx | xxx | 0001 |
| 140.75.23.10 | 8C4B17 | 0 | 1234 | 12340A | 0002 | 0002 |
| 140.75.23.200 | 8C4B17 | 0 | 1234 | 1234C8 | 0004 | 0004 |
| 140.75.23.220 | 8C4B17 | 0 | 1234 | 1234DC | 0002 | 0002 |
| 140.75.30.56 | 8C4B1E | 0 | xxxx | xxxxxx | xxxx | 0001 |
| 140.75.35.20 | 8C4B23 | 0 | 5678 | 567814 | 0003 | 0003 |
| 140.75.48.7 | 8C4B30 | 0 | 9ABC | 9ABC07 | 0005 | 0005 |
| 140.75.48.20 | 8C4B30 | 0 | 9ABC | 9ABC14 | 0001 | 0001 |
| 140.75.160.34 | 8C4BA0 | 1 | 0001 | xxxxxx | xxxx | 0001 |
| 189.34.15.16 | BD220F | 1 | 0000 | xxxxxx | xxxx | 0000 |

For example, consider the destination address 140.75.5.20 (8C4B0514 in hexadecimal). This address belongs to the level 1 search interval 140.75.5.20/24 (8C4B0500hex), which is a uniform interval whose longest-matching prefix is 140.75.0.0/16, whose prefix identifier is 1. Therefore, the level 1 search interval table memory 121 has the value 10001hex stored at address 8C4B05hex. The first bit of the value 10001hex is 1, representing the fact that the corresponding search interval is uniform. The remaining sixteen bits (0001) correspond to the prefix identifier 1. Therefore, when the twenty most significant bits 111 of the destination address 140.75.5.20 (8C4B0514hex) are input to the level 1 search interval table memory 121, the value 1 will be output on line 131 and the value 0001 will be output on line 132. The demultiplexor 171 will therefore connect lines 132 to output 102, causing the output on line 102 to be 0001. This value represents the prefix identifier 1, which is the longest-matching prefix for the destination address 140.75.5.20 (8C4B0514hex).

Now consider the IP address 140.75.23.200 (8C4B17C8hex). This address belongs to the level 1 search interval 140.75.23.0/24 (8C4B1700hex), which is a non-uniform interval. Table 4 assumes that the non-uniform search interval identifier of this interval is 1234hex. The level 1 search interval table memory 121 therefore has a value of 01234hex stored at address 8C4B17hex. The first bit of the value 01234hex is 1, representing the fact that the corresponding search interval is non-uniform, and the remaining sixteen bits (1234) corresponding to the non-uniform search interval identifier 1234hex. Therefore, when the twenty most significant bits 111 of the destination address 140.75.23.200 (8C4B17000hex) are input to the level 1 search interval table memory 121, the value 0 will be output on line 131 and the value 1234 will be output on lines 132.

The level 1 non-uniform resolution table memory 151 will therefore receive the value 1234hex on its most significant address lines 141 and the value C8hex (corresponding to the 8 least significant bits of the destination address 8C4B17C8hex) on its least significant address lines 142. The result of concatenating these two values is 1234C8hex. The memory location of the level 1 non-uniform resolution table 151 at the address 1234C8hex therefore contains the value 0004hex, which is the prefix identifier of the longest prefix matching the destination address 8C4B17C8hex. The value 0004hex is therefore output by the level 1 non-uniform resolution table memory 151 on the lines 161, where it is received by the second data input of the demultiplexor 171. Because, as described above, the value at the control input 133 of the demultiplexor 171 is 0, the demultiplexor 171 will connect lines 161 to output 102, causing the output on line 102 to be 0004hex. This value represents the prefix identifier 4, which is the longest-matching prefix for the destination address 8C4B17C8hex.

Two-level Search Device

In the previous example, a multi-level search table with a single level of search intervals was used. Using two levels of search intervals instead can reduce the amount of memory required to store the multi-level search table. For example, if IP address space is divided into 1M level 1 search intervals (search intervals with a prefix length of 20), then each interval will contain 4K IP addresses. According to Equation 1, there will be at most 64K level 1 non-uniform search intervals. If each level 1 non-uniform search interval is divided into 64 level 2 search intervals (search intervals with a prefix length of 26), then each level 2 search interval will contain 64 IP addresses. Therefore, there will be a total of 4M=64K×64 level 2 search intervals, of which at most 64K will be non-uniform intervals, according to Equation 1. Therefore, the level 1 search interval table will require room for 1M entries, the level 2 search interval table will require 4M=64K×64 entries, and the level 2 non-uniform resolution table will require 4M=64K×64 entries. This is a total of 9M entries for the multi-level search table. We will refer to this configuration as "Layout 2" hereinafter.

Figure 7:
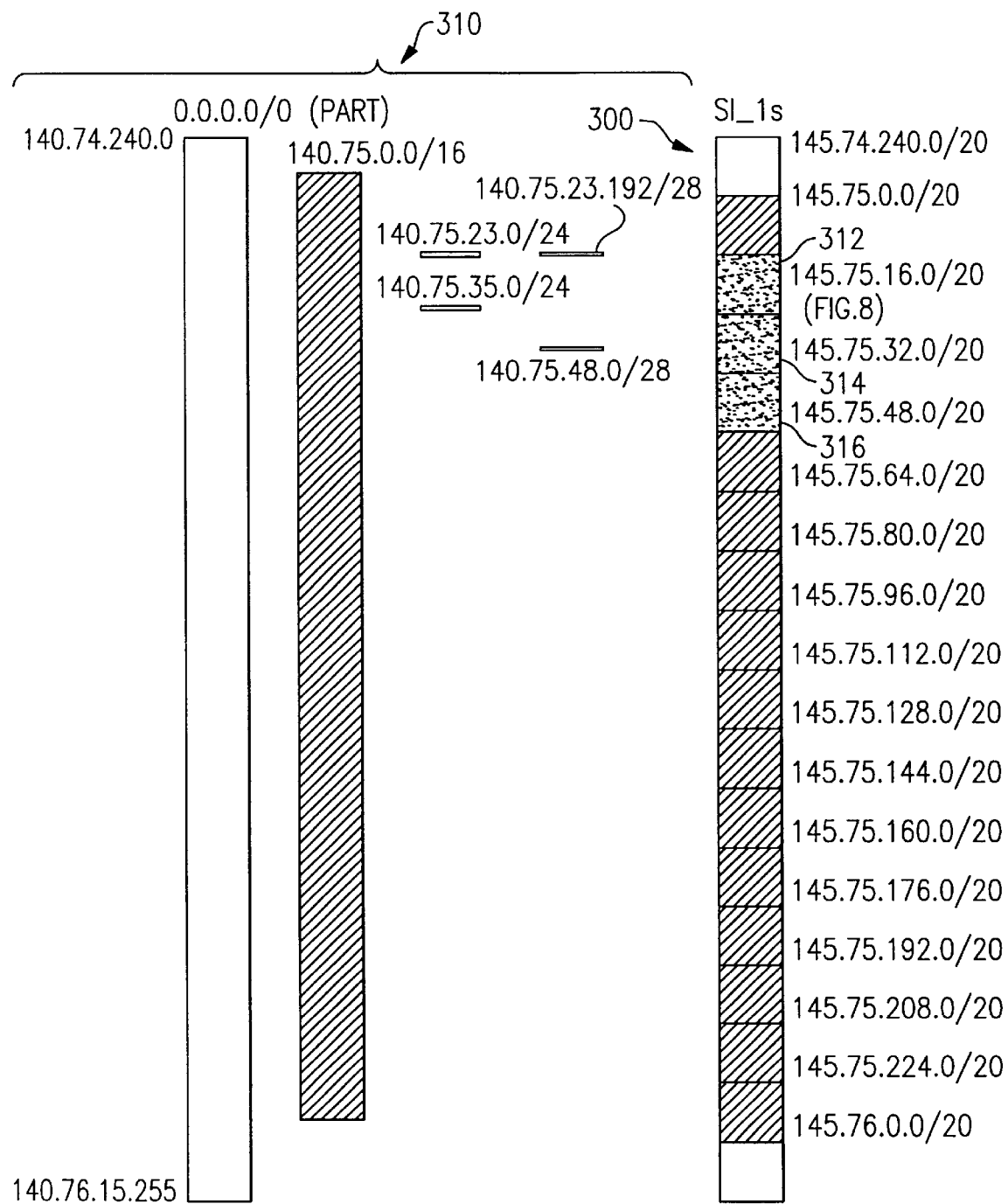
FIGS. 7 and 8 are diagrams of IP address intervals and the most-specific prefixes matching the intervals.

Referring to FIG. 7, level 1 search intervals 300 in the range from 140.74.240.0 to 140.76.15.255 each contain 4K IP addresses. The prime continuums 310 of prefixes in the prefix database shown in FIG. 2 are shown on the left side of FIG. 7. Each of the level 1 search intervals 300 that is uniform is shaded with the same pattern as that of its longest-matching prefix. The non-uniform search intervals 312, 314, and 316 are filled with a solid gray pattern.

Figure 8:
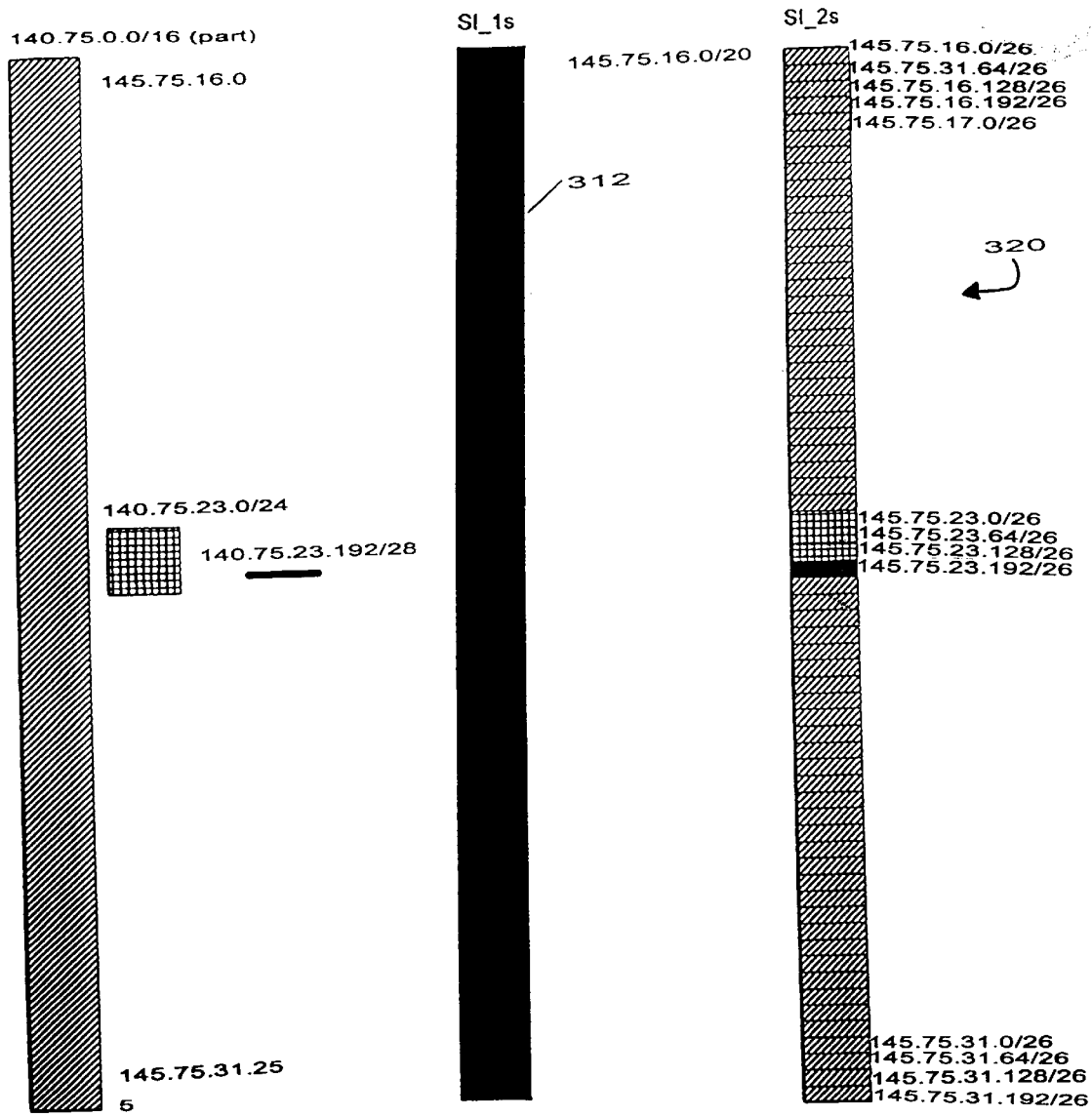

Referring to FIG. 8, the (non-uniform) level 1 search interval 312 containing the addresses from 145.75.16.0 to 145.75.31.255 is shaded in gray. The corresponding level 2 search intervals 320 are filled with the same pattern as that of their longest-matching prefixes. For example, the interval from 145.75.23.0 to 145.75.23.63 is filled with the same pattern as the prefix 140.75.23.0/24, which is the longest prefix in the prefix database that matches all of the addresses in the interval from 145.75.23.0 to 145.75.23.63.

Figure 9:
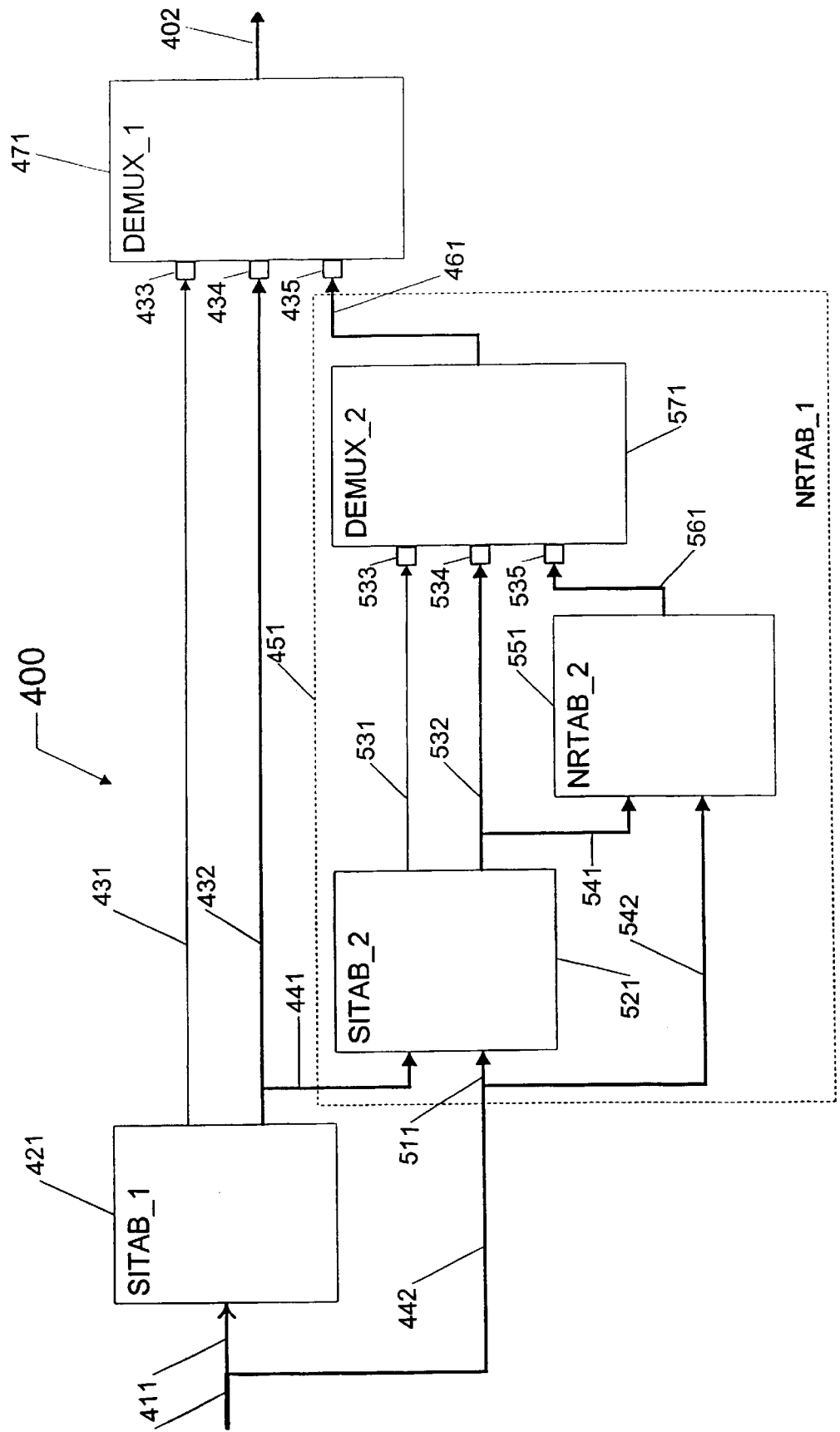
FIG. 9 is a block diagram of a two-level search device.

Referring to FIG. 9, a two-level (three stage) search device 400 according to Layout 2 can be used as an alternative to the single-level (two-stage) search device 100. The destination address of the packet to be routed is inputted into device 400 at an input 401. The 20 most significant bits of the destination address received on input 401 are connected to address lines 411 of a level 1 search interval memory 421. The output line 431 carries the most significant bit of the output of the level 1 search interval memory 421, and is connected to a control input 433 of a level 1 demultiplexor 471. Output lines 432 carry the 16 least significant bits 432 of the output of the level 1 search interval table memory 421, and are connected to a first data input 434 of the level 1 demultiplexor 471. These lines 432 are also connected to the 16 most significant address lines 441 of a level 2 search interval table memory 521. The lines 442 carry the 12 least significant bits of the address received on input 401 are directed to the 6 least significant address lines 511. The six most significant address lines 511 of a level 2 search interval table memory 521 carry bits 11 to 6 of the destination address. The 6 least significant address lines 542 of the level 2 non-uniform resolution table memory 551 carry bits 5 to 0 of the destination address.

The output line 531 of the level 2 search interval table memory 521 carries the most significant bit of the output of the level 2 search interval table memory, and is connected to a control input of a level 2 demultiplexor 571. Output lines 532 carry the 16 least significant bits of the output of the level 2 search interval table memory 521, and are connected to a first data input of the level 2 demultiplexor 571. These lines 532 are also connected to the 16 most significant address lines 541 of a level 2 non-uniform resolution table memory 551. Output lines 261 of the level 2 non-uniform resolution table memory 551 are connected to a second data input of the level 2 demultiplexor 571. Output lines 461 of the level 2 demultiplexor 571 are connected to a second data input of the level 1 demultiplexor 471.

Demultiplexor 571 connects one of its data inputs to output 461 depending upon the value on its control input. If the value on the control input is 1, then the first data input is connected to output 461; otherwise, the second data input is connected to output 461.

Demultiplexor 471 connects one of its data inputs to output 402 depending upon the value on its control input. If the value on the control input is 1, then the first data input is connected to output 402; otherwise; the second data input is connected to output 402. As a result, the numerical identifier of the longest matching prefix entry in the prefix database is outputted by the level 1 demultiplexor on an output 402.

The level 1 search interval memory 421 is capable of storing 1M 17-bit words. Each word represents one entry in the level 1 search interval table. If the most significant bit of such a word is 1 then the corresponding interval is uniform, in which case the word's 16 least significant bits contain a numerical prefix identifier identifying the matching prefix for all addresses contained in the interval. If the word's most significant bit is 0 then the corresponding interval is non-uniform, in which case the word's 16 least significant bits contain a numerical identifier identifying the corresponding level 1 non-uniform interval.

Table 5 shows the contents of the level 1 search interval memory 421 for the prefix database shown in FIG. 2. Values in Table 2 are in hexadecimal. Table 2 assumes that the level 1 non-uniform interval 140.75.16.0/20 has a numerical identifier of 1234, that the level 1 non-uniform interval 140.75.32.0/20 has a numerical identifier of 5678, and that the level 1 non-uniform interval 140.75.48.0/20 has a numerical identifier of 9ABC.

TABLE 5

| Address | Contents | Comment | |
|---|---|---|---|
| 00000 | 10000 | 0.0.0.0/24 | |
| 00001 | 10000 | | |
| . . . | 10000 | | |
| 8C4AF | 10000 | | |
| 8C4B0 | 10001 | 140.75.0.0/20 | |
| 8C4B1 | 01234 | 140.75.16.0/20 | (non-uniform) |
| 8C4B2 | 05678 | 140.75.32.0/20 | (non-uniform) |
| 8C4B3 | 09ABC | 140.75.48.0/20 | (non-uniform) |

TABLE 5-continued

| Address | Contents | Comment |
|---|---|---|
| 8C4B4 | 10001 | 140.75.64.0/20 |
| 8C4B5 | 10001 | 140.75.80.0/20 |
| ... | ... | ... |
| 8C4BF | 10001 | 140.75.240.0/20 |
| 8C4C0 | 10000 | 140.76.0.0/20 |
| ... | ... | ... |
| FFFFF | 1000 | |

The level 2 search interval table memory 521 is capable of storing 4M 17-bit words. Each word represents an entry in the level 2 search interval table. Table 6 shows the contents of a relevant part; of the level 2 search interval table memory 521 for the prefix database shown in FIG. 2. Table 6 assumes that the level 2 non-uniform interval 140.75.23.192/26 has a numerical identifier of FEDChex, and that the level 2 non-uniform interval 140.75.48.0/26 has a numerical identifier of BA98hex. Note that 1234hex shifted left by 6 bit positions is equal to 048D00hex, that 5678hex shifted left by 6 bit positions is equal to 15900hex, and that 9ABChex shifted left by 6 bit positions is equal to 26AF00hex.

TABLE 6

| Address | Content | Comment |
|---|---|---|
| ... | | |
| 048D00 | 10001 | 140.75.16.0/26 |
| 048D01 | 10001 | 140.75.16.64/26 |
| ... | | |
| 048D1A | 10001 | 140.75.22.192/26 |
| 048D1C | 10002 | 140.75.23.0/26 |
| 048D1D | 10002 | 140.75.23.64/26 |
| 048D1E | 10002 | 140.75.23.128/26 |
| 048D1F | 0FEDC | 140.75.23.192/26 (non-uniform) |
| 048D20 | 10001 | 140.75.24.0/26 |
| ... | ... | ... |
| 048D3F | 10001 | 140.75.31.192/26 |
| ... | | |
| 159E00 | 10001 | 140.75.32.0/26 |
| 159E01 | 10001 | 140.75.32.64/26 |
| ... | ... | ... |
| 159E0B | 10001 | 140.75.34.192/26 |
| 159E0C | 10003 | 140.75.35.0/26 |
| 159E0D | 10003 | 140.75.35.64/26 |

TABLE 6-continued

| Address | Content | Comment |
|---|---|---|
| 159E0E | 10003 | 140.75.35.128/26 |
| 159E0F | 10003 | 140.75.35.192/26 |
| 159E10 | 10001 | 140.75.36.0/26 |
| ... | ... | ... |
| 159E3F | 10001 | 140.75.47.192/26 |
| ... | ... | ... |
| 26AF00 | 0BA98 | 140.75.48.0/26 (non-uniform) |
| 26AF01 | 10001 | 140.75.48.128/26 |
| ... | ... | ... |
| 26AF3F | 10001 | 140.75.63.192/26 |

The level 2 non-uniform resolution table memory 551 is capable of storing 4M 16-bit words. Each word represents an entry in the level 2 non-uniform resolution table. Table 7 shows the contents of a relevant part of the level 2 non-uniform resolution table memory 551 for the prefix database shown in FIG. 2.

TABLE 7

| Address | Contents | Comment |
|---|---|---|
| ... | ... | ... |
| 2EA600 | 0005 | 140.75.48.0 |
| ... | ... | ... |
| 2EA60F | 0005 | 140.75.48.15 |
| 2EA610 | 0001 | 140.75.48.16 |
| ... | ... | ... |
| 2EA63F | 0001 | 140.75.48.63 |
| ... | ... | ... |
| 3FB700 | 0004 | 140.75.23.192 |
| ... | ... | ... |
| 3FB70F | 0004 | 140.75.23.207 |
| 3FB710 | 0002 | 140.75.23.208 |
| ... | ... | ... |
| 3FB73F | 0002 | 140.75.23.255 |
| ... | ... | ... |

Table 8 shows the results of several examples of search operations using the search device 400 with relevant intermediate values. A value of "xxx" indicates that the actual value is irrelevant for purposes of the search. The values in the column entitled "Address Lines 241 and 242" represent values developed by concatenating the values on the address lines 141 and 142.

TABLE 8

| Destination Address | Address Lines 411 | Data Bit 431 | Data bits 432 | Address Lines 441 and 511 | Data Bit 531 | Data Bits 532 | Address Lines 541 and 542 | Output 561 | Prefix ID 102 |
|---|---|---|---|---|---|---|---|---|---|
| 10.45.16.98 | 0A2D1 | 1 | 0000 | xxxxxx | x | xxxx | xxxxxx | xxxx | 0000 |
| 140.75.5.20 | 8C4B0 | 1 | 0001 | xxxxxx | x | xxxx | xxxxxx | xxxx | 0001 |
| 140.75.23.10 | 8C4B1 | 0 | 1234 | 048D1C | 1 | 0002 | xxxxxx | xxxx | 0002 |
| 140.75.23.200 | 8C4B1 | 0 | 1234 | 048D1F | 0 | FEDC | 3FB708 | 0004 | 0004 |
| 140.75.23.220 | 8C4B1 | 0 | 1234 | 048D1F | 0 | FEDC | 3FB71C | 0002 | 0002 |
| 140.75.30.56 | 8C4B1 | 0 | 1234 | 048D38 | 1 | 0001 | xxxxxx | xxxx | 0001 |
| 140.75.35.20 | 8C4B2 | 0 | 5678 | 159E0C | 1 | 0003 | xxxxxx | xxxx | 0003 |
| 140.75.48.7 | 8C4B3 | 0 | 9ABC | 26AF00 | 0 | BA98 | 2EA607 | 0005 | 0005 |
| 140.75.48.20 | 8C4B3 | 0 | 9ABC | 26AF00 | 0 | BA98 | 2EA614 | 0001 | 0001 |
| 140.75.160.34 | 8C4BA | 1 | 0001 | xxxxxx | x | xxxx | xxxxxx | xxxx | 0001 |
| 189.34.15.16 | BD220 | 1 | 0000 | xxxxxx | x | xxxx | xxxxxx | xxxx | 0000 |

A comparison of the single-level search device 100 (FIG. 6) and the two-level search device 400 (FIG. 9) shows that the two-level search device 400 can be obtained from the single-level search device 100 by replacing the level 1 non-uniform resolution table memory 151 in the single-level device 100 with the combination of the level 2 search interval table memory 521, the level 2 non-uniform resolution table memory 551, and the level 2 demultiplexor 571. Similarly, a three-level device can be obtained by replacing the level 2 non-uniform resolution table memory 551 in the two-level search device 400 with a combination of a level 3 search interval table memory, a level 3 non-uniform resolution table memory, and a level 3 demultiplexor. In this way, a search device with any number of levels can be constructed.

The amount of memory required to store the multi-level search table decreases as the number of levels in the search device increases. Table 9 presents memory requirements for several multi-level configurations. Table 9 assumes that 3 bytes are needed to store the 17 bits of a search interval table entry and that 2 bytes are needed to store the 16 bits of a non-uniform resolution table entry.

prefix 140.75.23.0/24 is a default prefix of the interval from 140.75.23.0 to 140.75.23.255 and the prefix 140.75.0.0/16 is a default prefix of an interval from 140.75.48.0 to 140.75.48.255. We will refer to the default prefix (0.0.0.0/0) as the "global default prefix" to distinguish it from a particular interval's default prefix. The following discussion assumes that the entries of the level 1 search interval table initially contain the global default prefix identifier.

Using the painting analogy represented by FIG. 3, for example, the default prefix of a non-uniform search interval represents the lowest visible paint layer inside the non-uniform search interval. Therefore, when the default prefix of a non-uniform search interval is changed, it is necessary to change the background color of the search interval table at the subsequent level of the search table.

Assume for purposes of the following discussion that a prefix P with a prefix identifier PID is added to the prefix database, and that the prefix identifier of the first less specific prefix of P is FLSP, which has a prefix ID of FLSPID. The search table is updated by replacing all occurrences of the prefix identifier FLSPID in entries of the search table corresponding to addresses within the prime continuum of

TABLE 9

| Levels | Bits per search interval table | Bits per non-uniform resolution table | Level 1 search interval table | Level 2 search interval table | Level 3 search interval table | Level 4 search interval table | Non-uniform resolution table | Total Size |
|---|---|---|---|---|---|---|---|---|
| 1 | 24 | 8 | 48 MB | | | | 32 MB | 80 MB |
| 2 | 20-6 | 6 | 3 MB | 12 MB | | | 8 MB | 23 MB |
| 3 | 20-4-4 | 4 | 3 MB | 3 MB | 3 MB | | 2 MB | 11 MB |
| 4 | 20-3-3-3 | 3 | 3 MB | 1.5 MB | 1.5 MB | 1.5 MB | 1 MB | 8.5 MB |

Because a memory access to a search interval table memory at a level L can be overlapped with a memory access to a search interval table memory at level L+1, it is practical to use pipelining to perform the kind of search described above. If pipelining is used, the overall throughput of the device is limited only by the time it takes to perform a single memory read. It is therefore currently possible to build a device capable of performing a search as described above with a throughput of 100,000,000 search operations per second using SRAM with 5 ns access. It is also possible to build a device with a throughput of more than 10,000,000 search operations per second using a DRAM rated at 50 ns (which can perform a new memory access every 84 ns).

Search Table Updates

Whenever the prefix database changes, either as a result of adding or removing a prefix from the database, the contents of the corresponding multi-level search table have to be changed accordingly. The following discussion of search table updating will make reference to Layout 2 for purposes of example. The following discussion also assumes that the prefix identifier of the first less specific prefix for the prefix being added or deleted is maintained by software and/or hardware present in standard routers.

An interval's "default prefix" is defined as follows. As described above, search intervals may be selected such that the IP addresses contained within each search interval corresponds to the prime continuum of an IP address prefix, referred to as the search interval's prefix. If a search interval's prefix is present in the prefix database, then the search interval's default prefix is the search interval's prefix. Otherwise, the search interval's default prefix is the first less-specific prefix of the search interval's prefix. For example, if search interval prefixes are 24 bits long, then the the prefix being added with the prefix identifier P. This process is described in more detail below.

Figure 10:
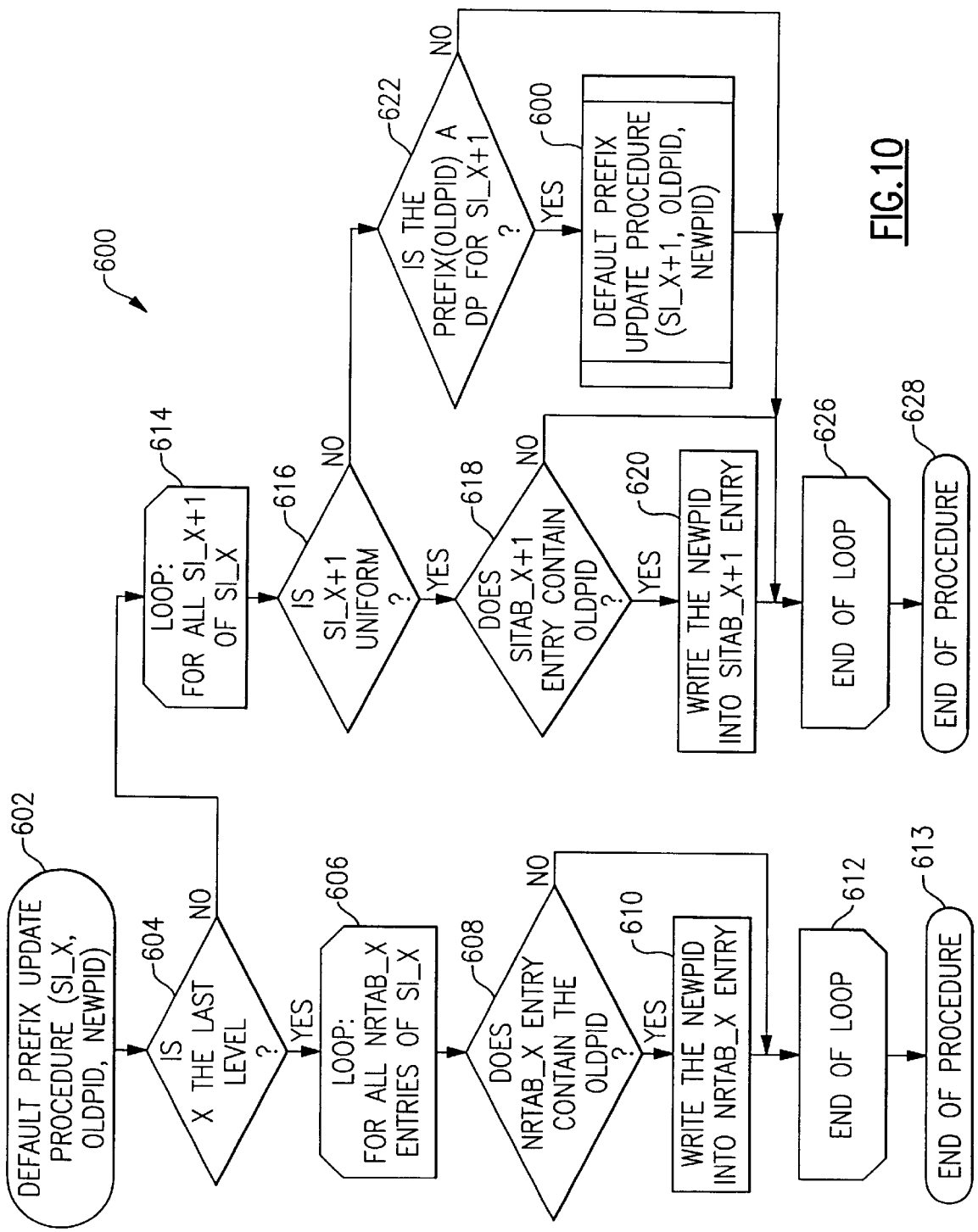
FIG. 10 is a flow chart of a method for replacing the default prefix of an IP address interval in a multi-level search table.

Updating a multi-level search table in response to a change in the prefix database sometimes requires changing the default prefix of an interval, as described in more detail below. Referring to FIG. 10, a default prefix update process 600 replaces an old default prefix of a search interval with a new default prefix in the multi-level search table as follows. The default prefix update process 600 takes as parameters a variable SI_X, indicating the level X search interval whose default prefix is to be updated, a variable oldPID, indicating the prefix ID of the old default prefix (the prefix ID to be replaced), and a variable newPID (the prefix ID of the new default prefix). The default prefix update processes 600 is called by other processes for updating the multi-level search table, as described below.

If X is the last level in the search table (decision step 604), then a loop over all entries of the non-uniform resolution table is entered (step 606). For each entry in the non-uniform resolution table, if the entry contains the prefix ID oldPID (decision step 60S), then newPID is written into the entry, replacing oldPID (step 610). The default prefix update process 600 terminates (step 613).

If X is not the last level in the search table (decision step 604), then a loop over all entries of the level X+1 search interval table corresponding to the addresses contained within the interval SI_X is entered (step 614). For each entry, if the entry corresponds to a uniform interval (decision step 616), and if the entry contains the prefix ID oldPID (decision step 618), then the prefix ID newPID is written into the entry, replacing the prefix ID oldPID (step 620). If the entry does not correspond to a uniform interval (decision step 616), then if the prefix represented by the prefix ID oldPID is a default prefix for the interval represented by the entry (decision step 622), then the default prefix update procedure 602 is called with the arguments SI_X+1, oldPID, and newPID (step 600). This recursively calls the default prefix update procedure 602 on the next level of the multi-level search table. After the loop begun in step 614 completes, the default prefix update process 600 terminates (step 628).

Figure 11:
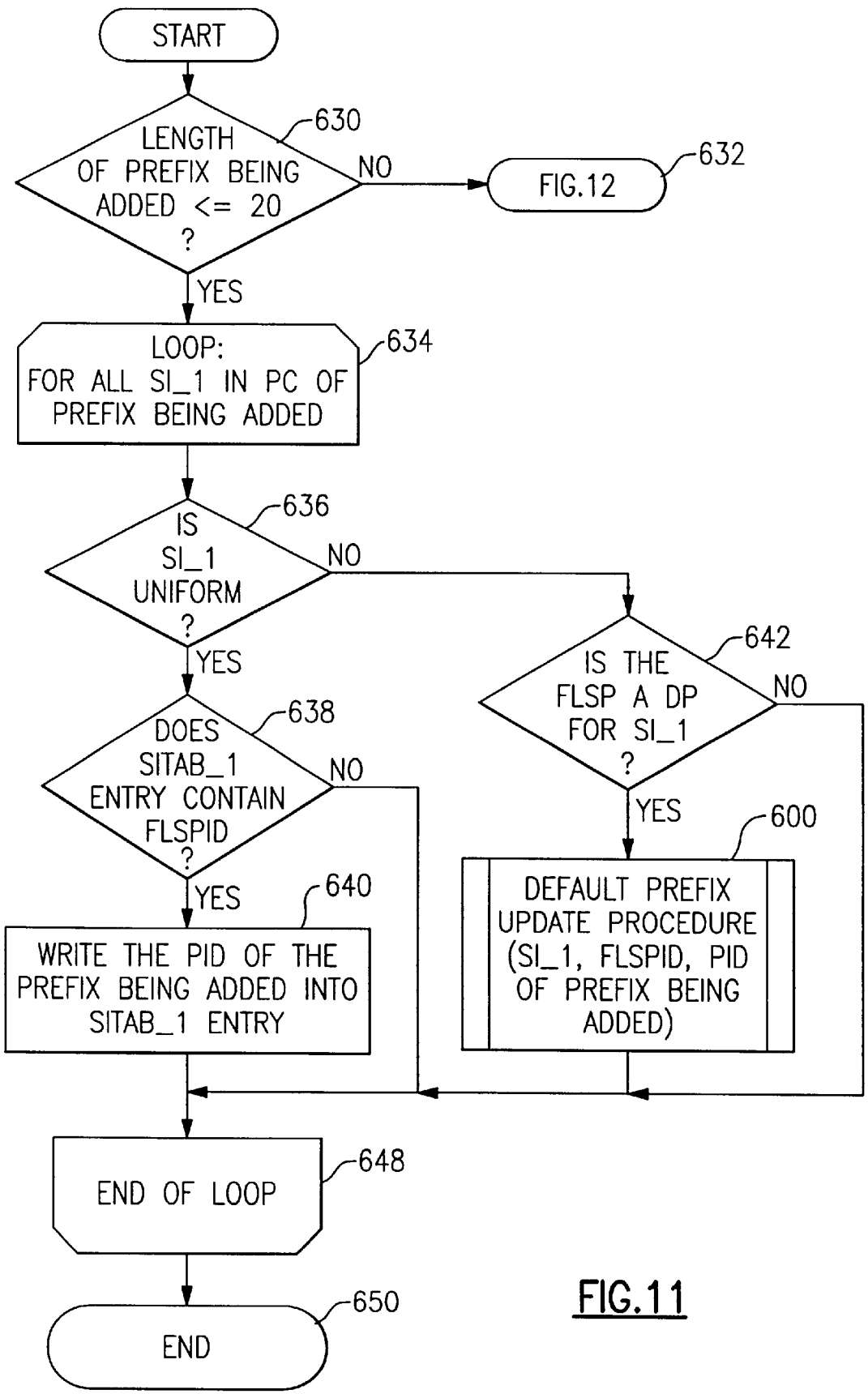
FIGS. 11, 12, and 13A and 13B (FIGS. 13A and 13B are hereafter collectively referred to as FIG. 13), are flow charts of methods for updating a multi-level search table in response to the addition of a prefix to a prefix database.

Referring to FIG. 11, the multi-level search table is updated in response to a prefix P being added to the prefix database as follows. If the length of the prefix P is greater than 20 bits (decision step 630), then control passes to the process shown in FIG. 12 (step 632). If the length of the prefix P is less than or equal to 20 bits, then a loop over all entries in the level 1 search interval table that correspond to intervals within the prime continuum of prefix P is entered (step 634). For each entry, if the entry corresponds to a uniform interval (decision step 636), and if the entry contains the prefix identifier of the first less specific prefix of prefix P (decision step 638), then the prefix ID of prefix P is written into the entry (step 640). If the entry corresponds to a non-uniform interval (decision step 636), and if the first less specific prefix of prefix P (having a prefix ID FLSPID) is the default prefix of SI_1 (decision step 642), then the default prefix update procedure 630 is called with the arguments SI_1, FLSPID, and PID (step 600). After the loop entered in step 634 is complete (step 648), updating of the search table terminates (step 650).

Figure 12:
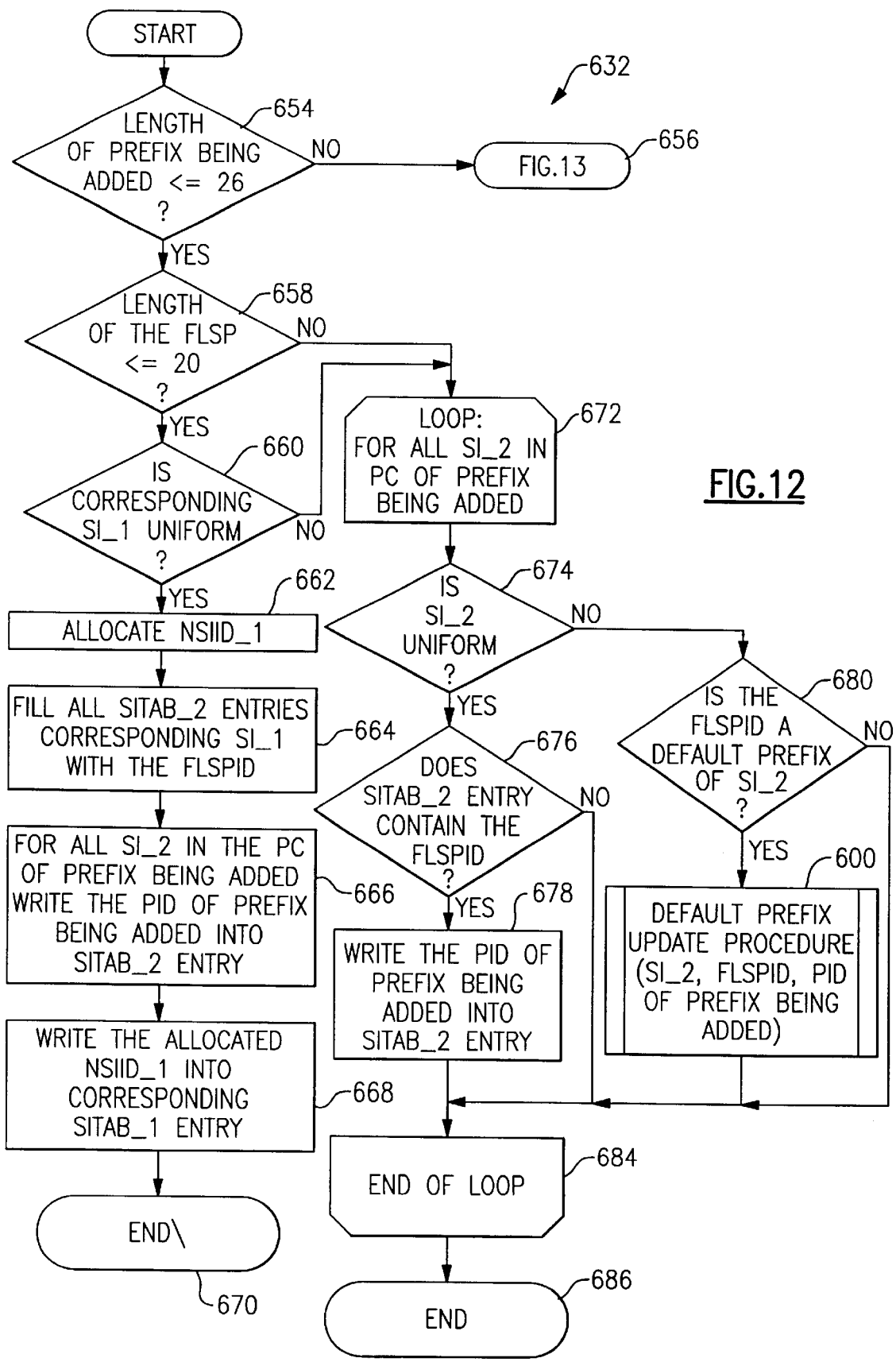

Referring to FIG. 12, the search table is updated in response to a prefix P with a length greater than 20 bits being added to the prefix database as follows. If the length of the prefix P is greater than 26 bits (decision step 654), then control passes to the process shown in FIG. 13 (step 656). If the length of the prefix P is less than or equal to 26 bits (decision step 654), then control proceeds as follows.

If the length of the first less specific prefix of P (having a prefix ID of FLSPID) is less than or equal to 20 bits, and the level 1 search interval (referred to as SI_1) that corresponds to the prefix P is uniform (decision step 660), then a non-uniform search interval ID is allocated (step 662), because the addition of prefix P makes SI_1 into a non-uniform interval. The prefix ID FLSPID is written into all level 2 search interval table entries corresponding to addresses within SI_1 (step 664). The prefix ID of P is written into all level 2 search interval table entries corresponding to addresses within the prime continuum of prefix P (step 666). The non-uniform search interval ID allocated in step 662 is written into the corresponding level 1 search interval table entry (step 668). Updating of the search table terminates (step 670).

If the length of the first less specific prefix of prefix P is greater than 20 bits (decision step 658), then a loop over all entries in the level 2 search interval (referred to as SI_2) corresponding to addresses within the prime continuum of prefix P is entered (step 672). For each such level 2 search interval table entry, if SI_2 is uniform (decision step 674), and if the entry contains the prefix ID of the first less specific prefix of prefix P (decision step 676), then the prefix ID of P is written into the entry (step 678). Is SI_2 is not uniform (decision step 674), and if the first less specific prefix of prefix P is the default prefix of SI_2 (decision step 680), then the default prefix update process 600 is called with the arguments SI_2, FLSPID, and PID (step 600). After the loop entered into in step 672 completes (step 684), updating of the search table terminates (step 686).

Figure 13A:
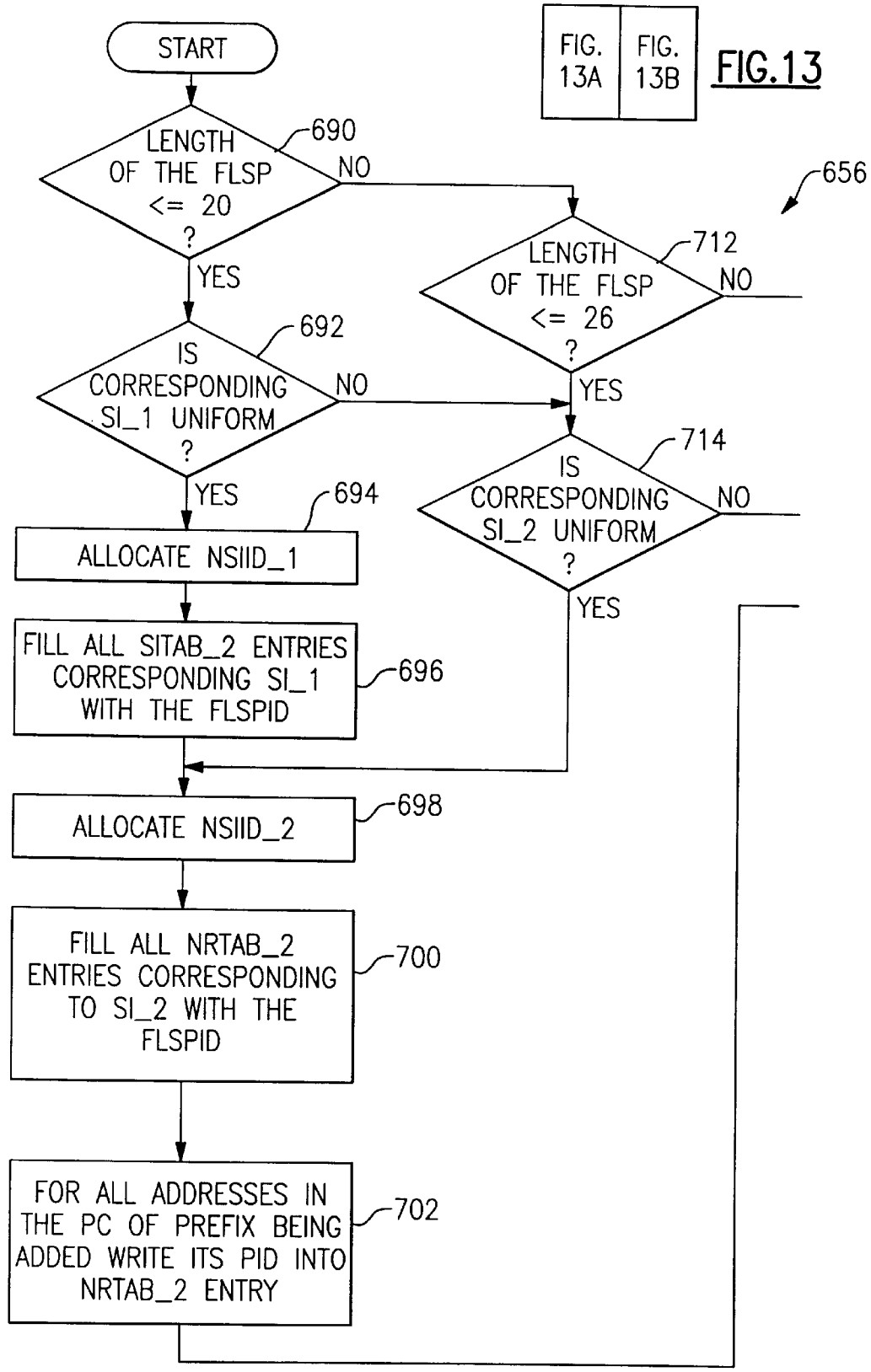
Figure 13B:
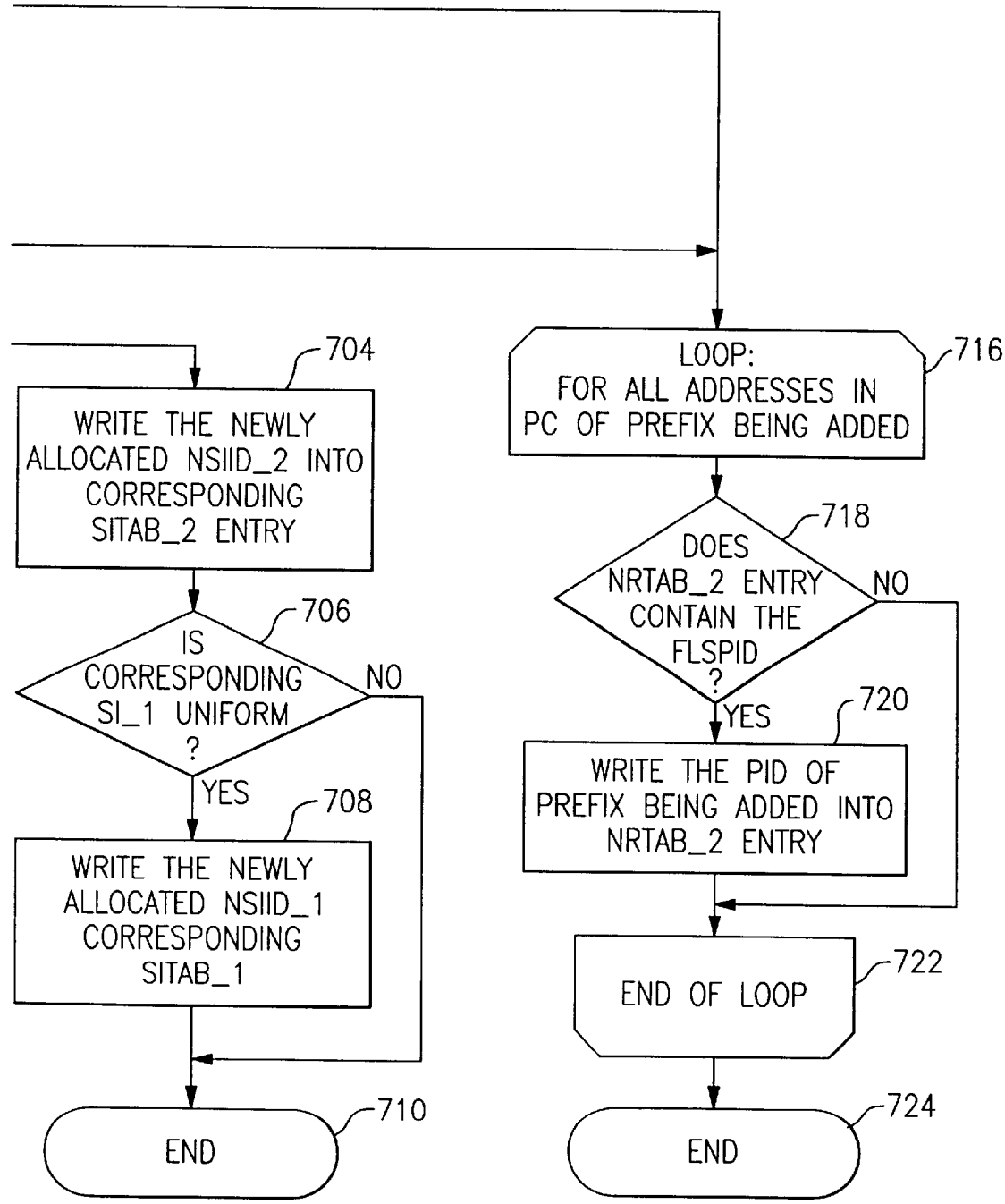

Referring to FIG. 13, the search table is updated in response to a prefix P with a length greater than 26 bits being added to the prefix database as follows. If the length of the prefix FLSP is less than or equal to 20 bits (decision step 690), and if the corresponding SI_1 is uniform (decision step 692), then control proceeds as follows. A level 1 non-uniform search interval ID is allocated (step 694), because addition of prefix P makes the corresponding level 1 search interval (referred to as SI_1) into a non-uniform interval. The prefix ID FLSPID is written into all level 2 search interval table entries corresponding to SI_1 (step 696).

A level 2 non-uniform search interval ID is allocated (step 698), because addition of prefix P makes the corresponding level 2 search interval (referred to as SI_2) into a non-uniform interval. The prefix ID FLSPID is written into all level 2 non-uniform resolution table entries corresponding to SI_2 (step 700). The prefix ID PID is written into all level 2 non-uniform resolution table entries corresponding to addresses within the prime continuum of P (step 702). The non-uniform search interval ID allocated in step 698 is written into the corresponding level 2 search interval table entry (704). If the corresponding level 1 search interval (referred to as SI_1) is uniform (decision step 706), then the non-uniform search interval ID allocated in step 694 is written into the corresponding level 1 search interval table entry (step 708). Updating of the search table terminates (step 710).

If the length of the prefix FLSP is greater than 20 bits (decision step 690) but less than or equal to 26 bits (decision step 712), and if SI_2 is uniform (decision step 714), then control passes to step 698 and proceeds as described above.

If the length of the prefix FLSP is greater than 26 bits (decision steps 690 and 712), or if the length of the prefix FLSP is greater than 20 bits (decision step 690) and SI_2 is not uniform (decision step 714), then control proceeds as follows. A loop over all level 2 non-uniform resolution table entries corresponding to addresses in the prime continuum of prefix P is entered (step 716). If the entry contains the prefix ID FLSPID (decision step 718), the prefix ID PID is written into the entry (step 720). After the loop entered into in step 716 completes (step 722), updating of the search table terminates (step 724).

Use of the techniques described above allow the search device 100 to be in a consistent state after each individual write access is performed. For example, the non-uniform interval identifier allocated in step 662 is not written into the appropriate level 1 search interval table entry until after the appropriate entries in the level 2 search interval table are updated. Therefore, read accesses to the level 1 search interval table will result in retrieval of the old (pre-update) table information until the update is complete and the table is in a consistent state. It can be seen from the order in which other operations in FIGS. 10–13 are performed that the multi-level search table is always in a consistent state while update operations are performed. Therefore, update operations can be performed without causing service interruptions, and each update operation can spread over many search operations, allowing practically no noticeable jitter in search throughput.

Assume for purposes of the following discussion that a prefix P with a prefix identifier PID is deleted from the prefix database, and that the prefix identifier of the first less specific prefix of P is FLSP, which has a prefix ID of FLSPID. The search table is updated by replacing all occurrences of the prefix identifier PID in entries of the search table corresponding to addresses within the prime continuum of prefix P with the prefix identifier FLSPID. This process is described in more detail below.

Figure 14:
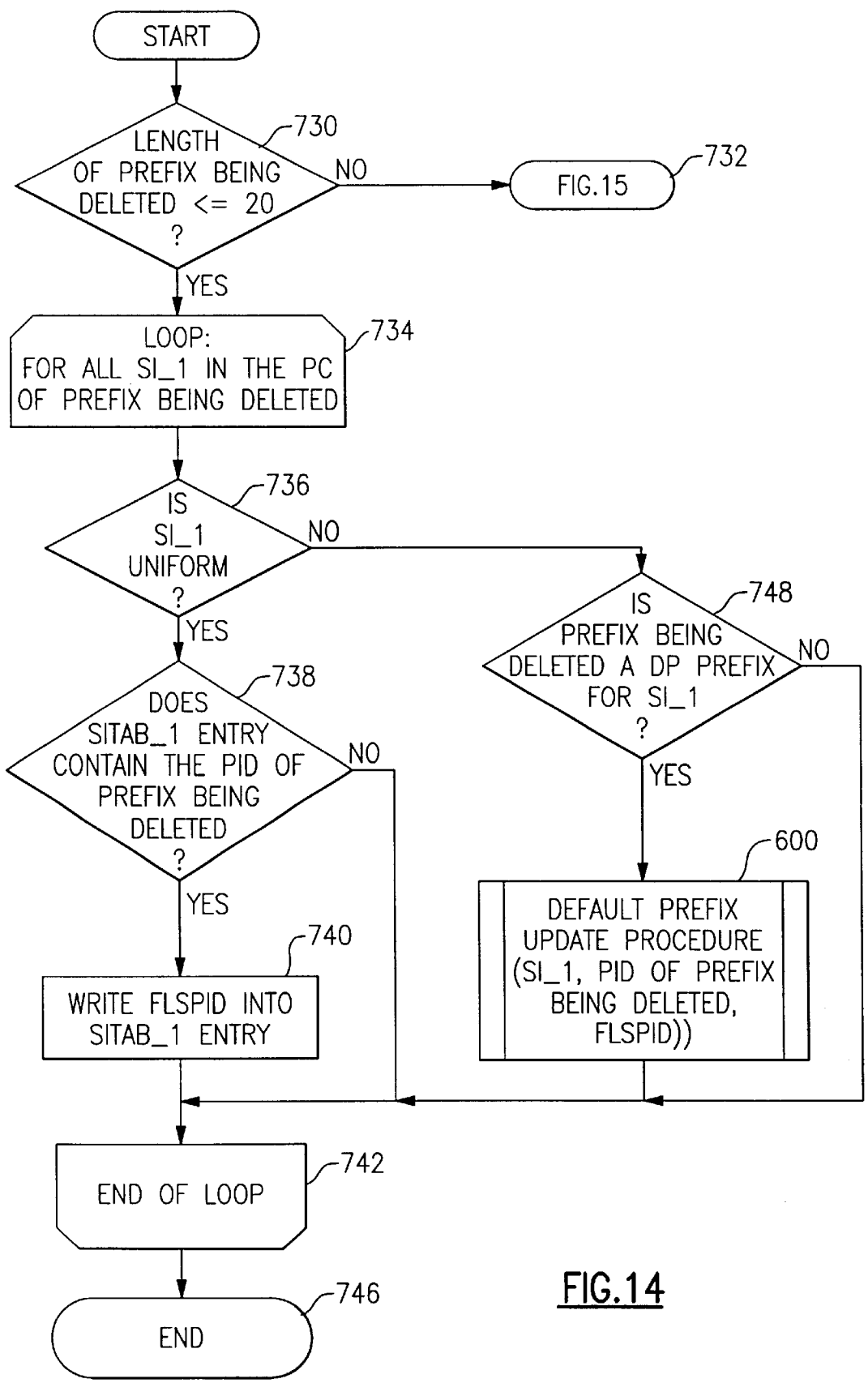
FIGS. 14, 15A and 15B (FIGS. 15A and 15B are hereafter collectively referred to as FIG. 15),and 16 are flow charts of methods for updating a multi-level search table in response to the deletion of a prefix from a prefix database.

Referring to FIG. 14, the search table is updated in response to a prefix P being deleted from the prefix database as follows. If the length of the prefix P is greater than 20 bits (decision step 730), then control passes to the process shown in FIG. 15 (step 732). If the length of the prefix P is less than or equal to 20 bits (decision step 730), then a loop over all level 1 search interval table entries corresponding to level 1 search intervals SI_1 that are within the prime continuum of prefix P is entered (step 734). For each entry, if the entry corresponds to a uniform interval (decision step 736), and if the entry contains the prefix identifier PID (decision step 738), then the prefix ID FLSPID is written into the entry (step 740). If SI_1 is a non-uniform interval (decision step 736), and if prefix P is the default prefix of SI_1 (decision step 748), then the default prefix update process 600 is called with the arguments SI_1, PID, and FLSPID (step 600). After the loop entered in step 734 is complete (step 742), updating of the search table terminates (step 746).

Figure 15A:
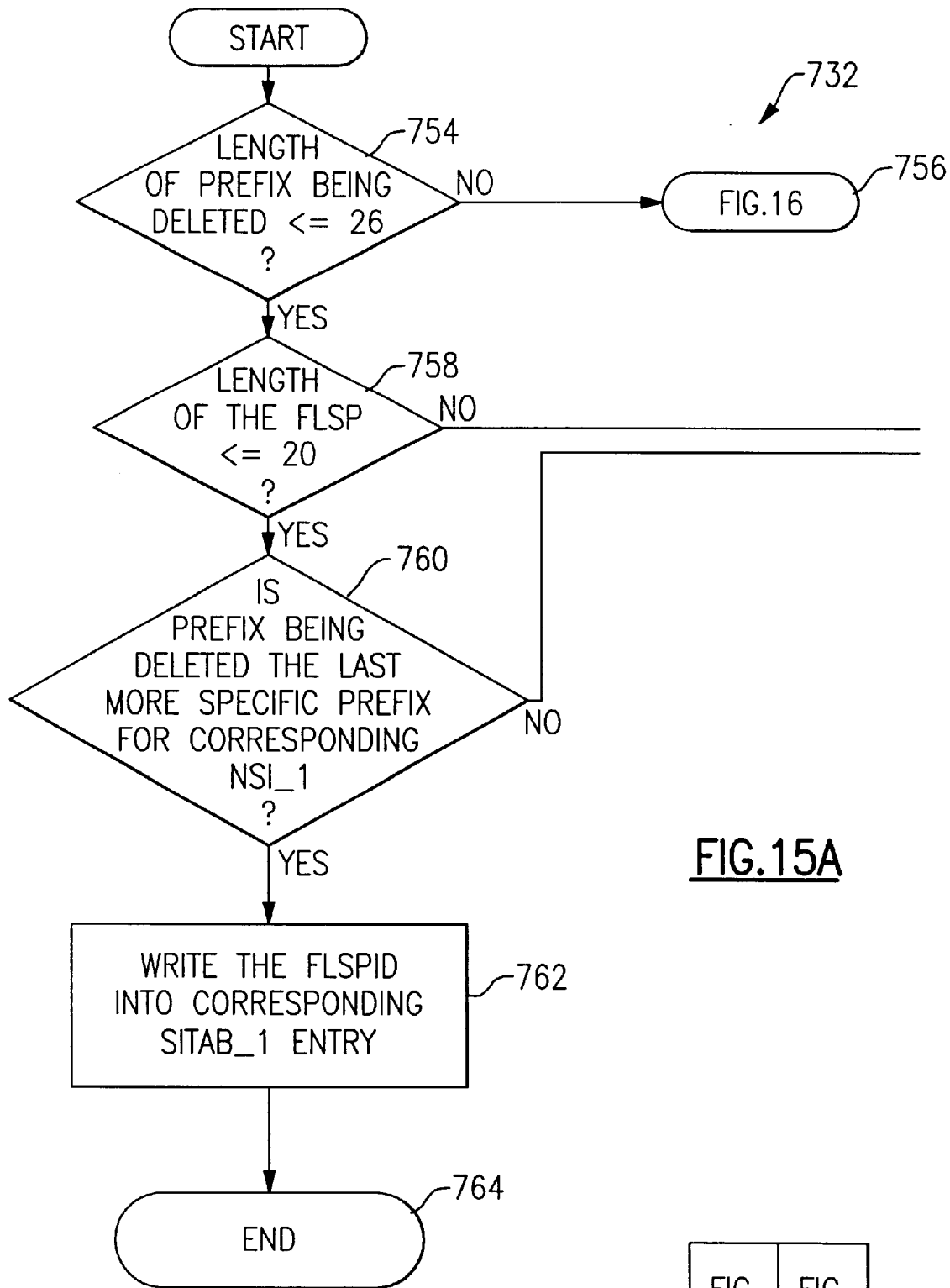
Figure 15:
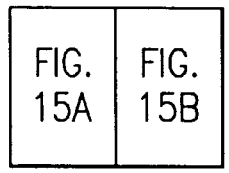
Figure 15B:
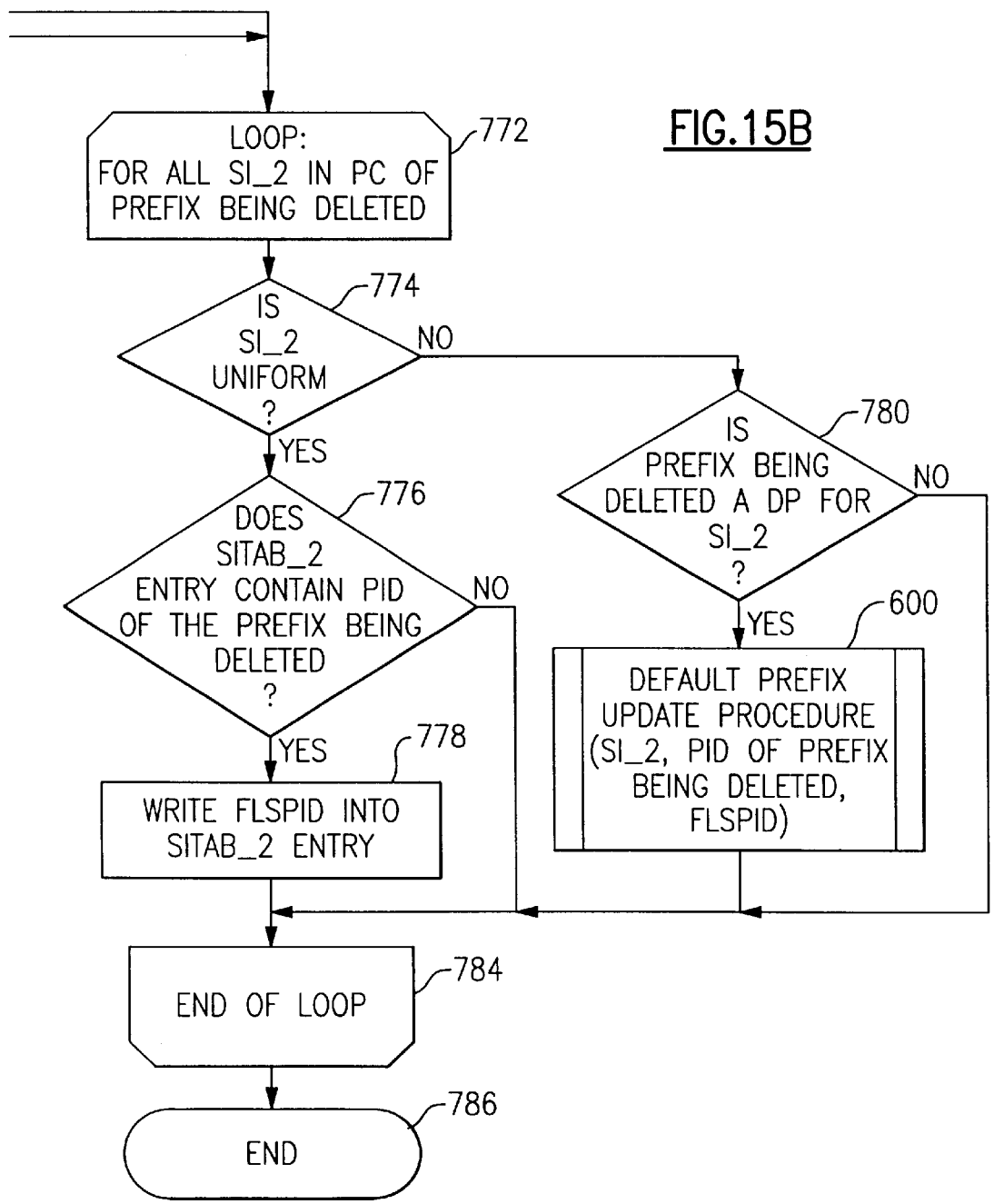

Referring to FIG. 15, the search table is updated in response to a prefix P with a length greater than 20 bits being deleted from the prefix database as follows. If the length of the prefix P is greater than 26 bits (decision step 754), then control passes to the process shown in FIG. 16 (step 756). If the length of the prefix P is less than or equal to 26 bits (decision step 754), then control proceeds as follows.

If the length of FLSP is less than or equal to 20 bits (decision step 758), and if prefix P is the only prefix in the prefix database that is more specific prefix than the corresponding level 1 non-uniform search interval (decision step 760), then FLSPID is written into the corresponding level 1 search interval table entry (step 762). Updating of the search table terminates (step 764).

If the length of FLSP is greater than 20 bits (decision step 758), or if prefix P is not the only prefix that is more specific than the corresponding level 1 non-uniform search interval (decision step 760), then a loop over all entries SI_2 in the level 2 search interval table corresponding to intervals within the prime continuum of prefix P is entered (step 772). For each level 2 search interval table entry, if SI_2 is uniform (decision step 774), and if the entry contains the prefix ID PID (decision step 776), then the prefix ID FLSPID is written into the entry (step 778). Is SI_2 is not uniform (decision step 774), and if the first less specific prefix of prefix P is the default prefix of SI_2 (decision step 780), then the default prefix update process 600 is called with the arguments SI_2, PID, and FLSPID (step 600). After the loop entered into in step 772 completes (step 784), updating of the search table terminates (step 786).

Figure 16:
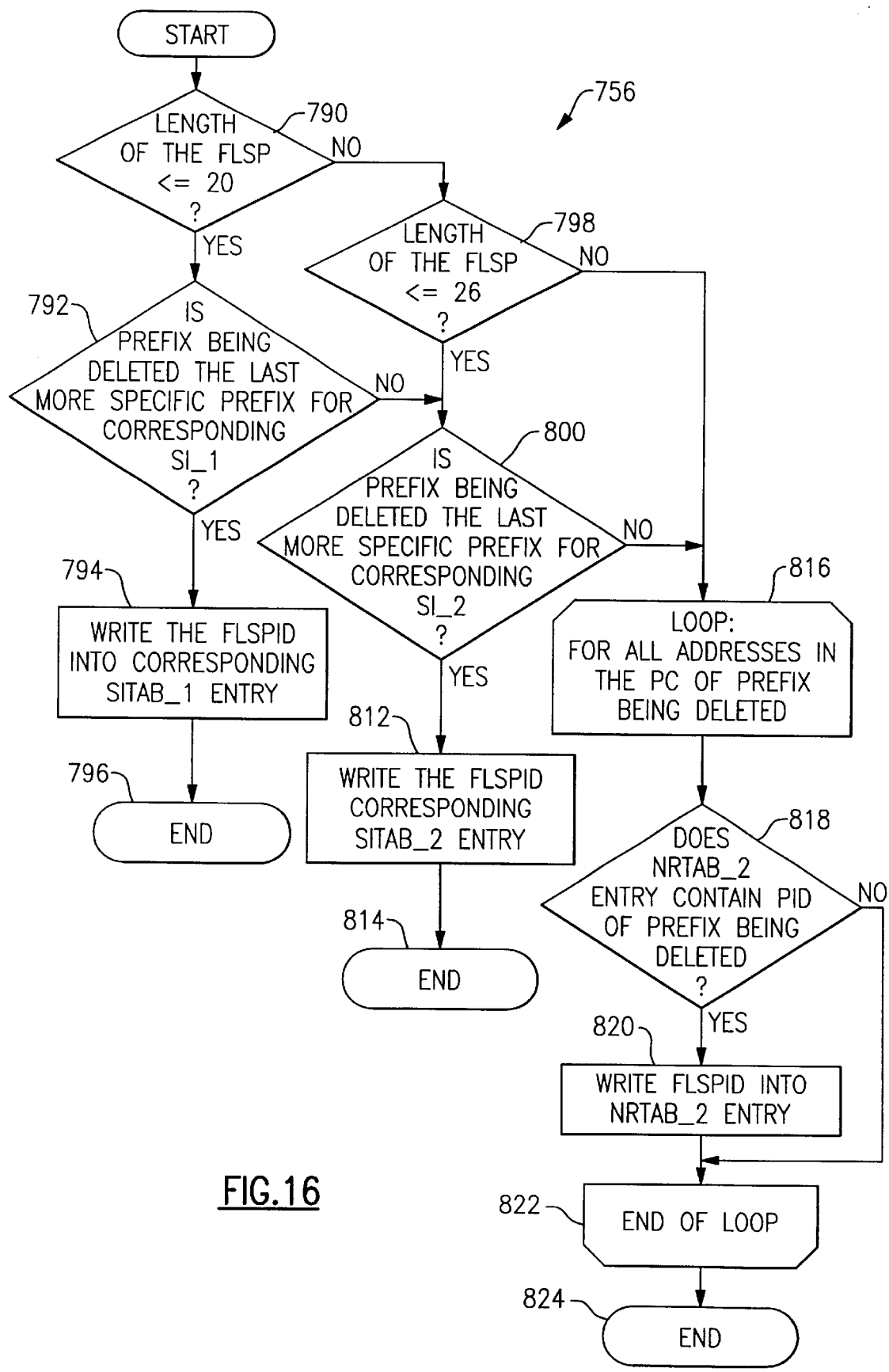

Referring to FIG. 16, the search table is updated in response to a prefix P with a length greater than 26 bits being deleted from the prefix database as follows. If the length of the prefix FLSP is less than or equal to 20 bits (decision step 790), and if prefix P is the last more specific prefix for the corresponding level 1 search interval SI_1 (decision step 792), then the prefix ID FLSPID is written into the corresponding level 1 search interval table entry (step 794). Updating of the search table terminates (step 796).

If the length of the prefix FLSP is greater than 20 bits (decision step 690) and the prefix P is the last more specific prefix for the corresponding level 2 search interval SI_2 (decision step 800), then the prefix ID FLSPID is written into the corresponding level 2 search interval table entry (step 812), and updating of the search table terminates (step 814). If the length of the prefix FLSP is greater than 26 bits (decision steps 790 and 798), or if the length of the prefix FLSP is greater than 20 bits (decision step 790) but less than or equal to 26 bits (decision step 798) and the prefix P is not the last more specific prefix for the search interval SI_2 (decision step 800), then a loop a loop over all level 2 non-uniform resolution table entries corresponding to addresses in the prime continuum of prefix P is entered (step 816). If the entry contains the prefix ID PID (decision step 818), then the prefix ID FLSPID is written into the entry (step 820). After the loop entered into in step 816 completes (step 822), updating of the search table terminates (step 824).

Default Prefix Tables

The rate at which the search table is updated can be increased by storing the default prefix of each level X non-uniform interval (NSI_X) in a separate table called a "level X default prefix table" (DPTAB_X). Instead of storing the NSI_X's default prefix ID (DPID) in entries of the level X+1 search interval table (SITAB_X+1) (or NRTAB_X if X is the last level of the device), those entries store a default prefix designator indicating that the entry corresponds to NSI_X's default prefix. If, during a search operation, an entry containing the default prefix designator is encountered, the prefix ID of the corresponding default prefix is looked up in the corresponding default prefix table. This arrangement reduces the number of updates to the search table required when the default prefix of NSI_x changes. When the default prefix of NSI_X changes, only the single corresponding entry in NSI_X's default prefix table need be changed.

If the device has more than one level, then the default prefix designator may in turn be a default prefix identifier for some NSI_X (X>1). In this case the default prefix designator is stored in the corresponding DPTAB_X entry. If, during a search operation at level X the default prefix designator is encountered, the prefix ID of the corresponding default prefix is looked up in the corresponding default prefix table. This will result in the default prefix designator, which will cause the prefix ID of the corresponding default prefix to be looked up in the corresponding level X−1 default prefix table, and so on recursively, until a default prefix ID that is not the default prefix designator is obtained. This process is guaranteed to succeed because DPTAB_1 cannot contain the default prefix designator.

The following discussion assumes that the entries of the level 1 search interval table contain the prefix identifiers of the global default prefix, and that the entries of all other tables are filled initially with the default prefix designator.

Figure 17:
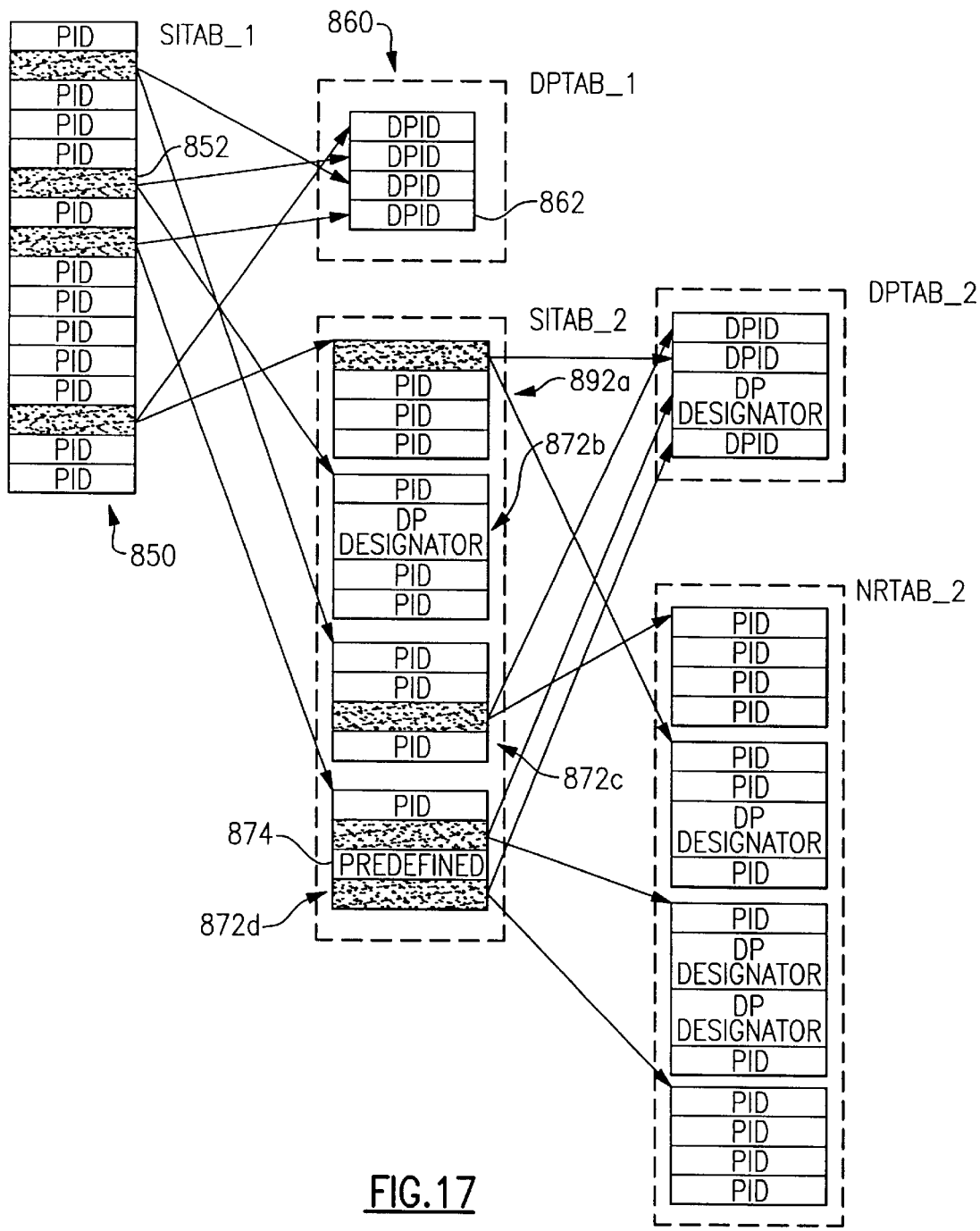
FIG. 17 is a diagram of a multi-level search table with default prefix tables.

The relationship between search interval tables and default prefix tables is shown in FIG. 17. Non-uniform search intervals are filled with solid gray. Arrows connect non-uniform intervals with corresponding sub-tables and entries in the default prefix tables. For each level X non-uniform interval there is a corresponding sub-table (either in SITAB_X+1 or in NRTAB_X) and an entry in DPTAB_X.

For example, a level 1 search interval table 850 (SITAB_1) contains entries corresponding to level 1 search intervals. A level 1 default prefix table 860 (DPTAB_1) contains entries containing the default prefixes of the level 1 non-uniform search intervals. A level 2 search interval table 870 (SITAB_2) contains sub-tables 872a–d corresponding to addresses within the level 1 non-uniform search intervals. The level 1 search interval table 850, for example, contains an entry 852 corresponding to a non-uniform search interval NSI_1. The entry 852 contains a pointer to the entry 862 in the level 1 default prefix table 860 containing the prefix ID of the default prefix of NSI_1. The entry 852 also contains a non-uniform search interval ID pointing to the sub-table 872d of the level 2 search interval table 870.

As an example of the default prefix designator, the sub-table 872d of the level 2 search interval table 870 contains an entry 874 corresponding to a level 2 uniform search interval (USI__2). The entry 874 contains the default prefix designator, indicating that the longest-matching prefix for USI__2 is the default prefix of the level 1 search interval that contains USI__2. Entry 874 corresponds to a level 2 search interval that is contained within the level 1 search interval represented by entry 852 (SI__1). The default prefix ID of the default prefix of SI__1 is contained within entry 862 of the level 1 default prefix table 860. Therefore, the prefix identifier of the longest-matching prefix for USI__2 is the default prefix identifier contained within entry 862.

The only requirement of the default prefix designator is that it be distinct from the prefix ID of any prefix more specific than the prefix of the corresponding search interval. The predetermined value may take any of a number of forms. For example, a designated bit in the PID may be used to mark the default prefix designator. A particular PID value may be reserved to represent the default prefix designator. The global default prefix ID may be used as the default prefix designator. It is assumed for purposes of example in the following discussion that the default prefix designator is the global default prefix ID, because it does not require additional bits of memory for representation.

Figure 18:
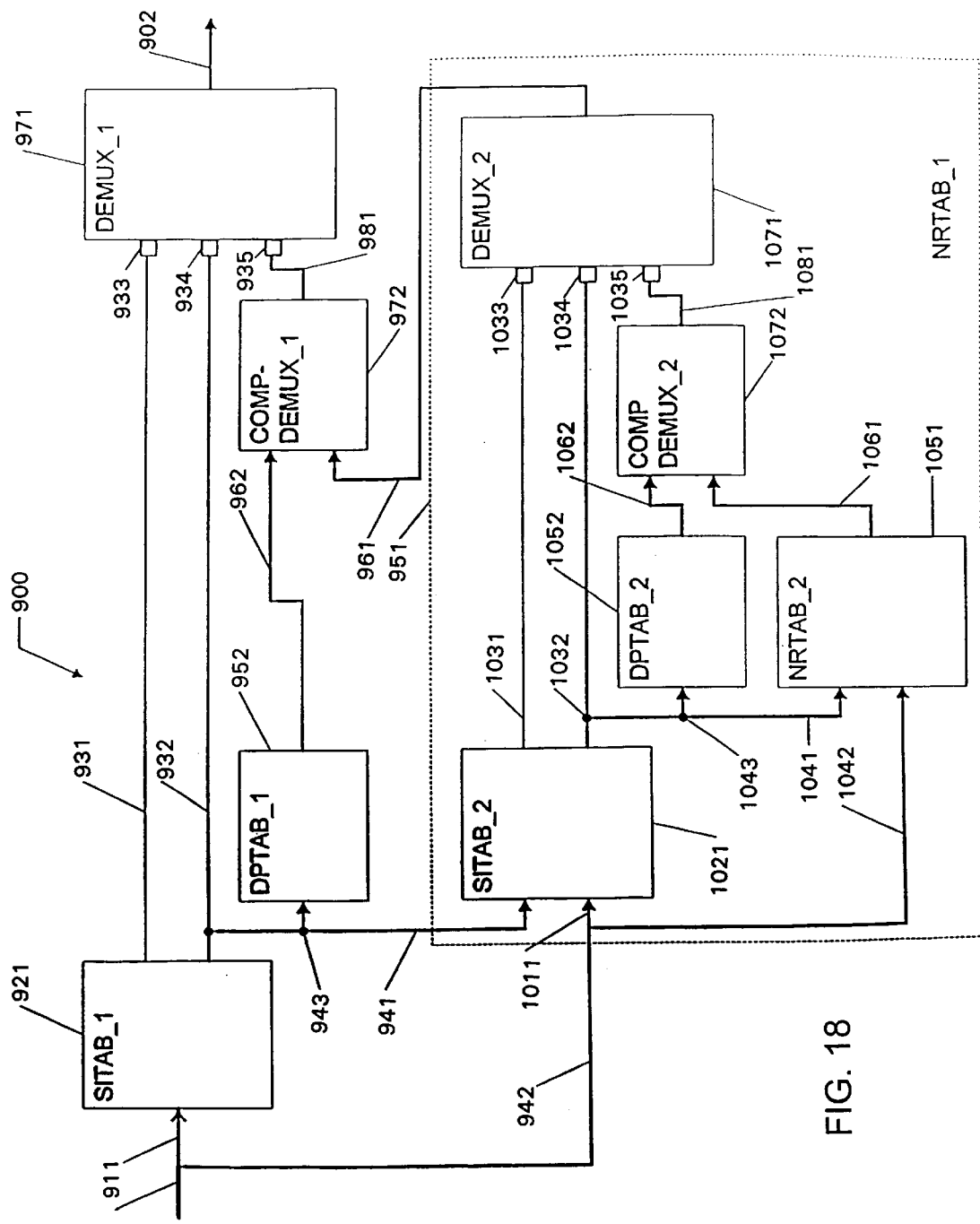
FIG. 18 is a block diagram of a two-stage search device with default prefix table memories.
Figure 19:
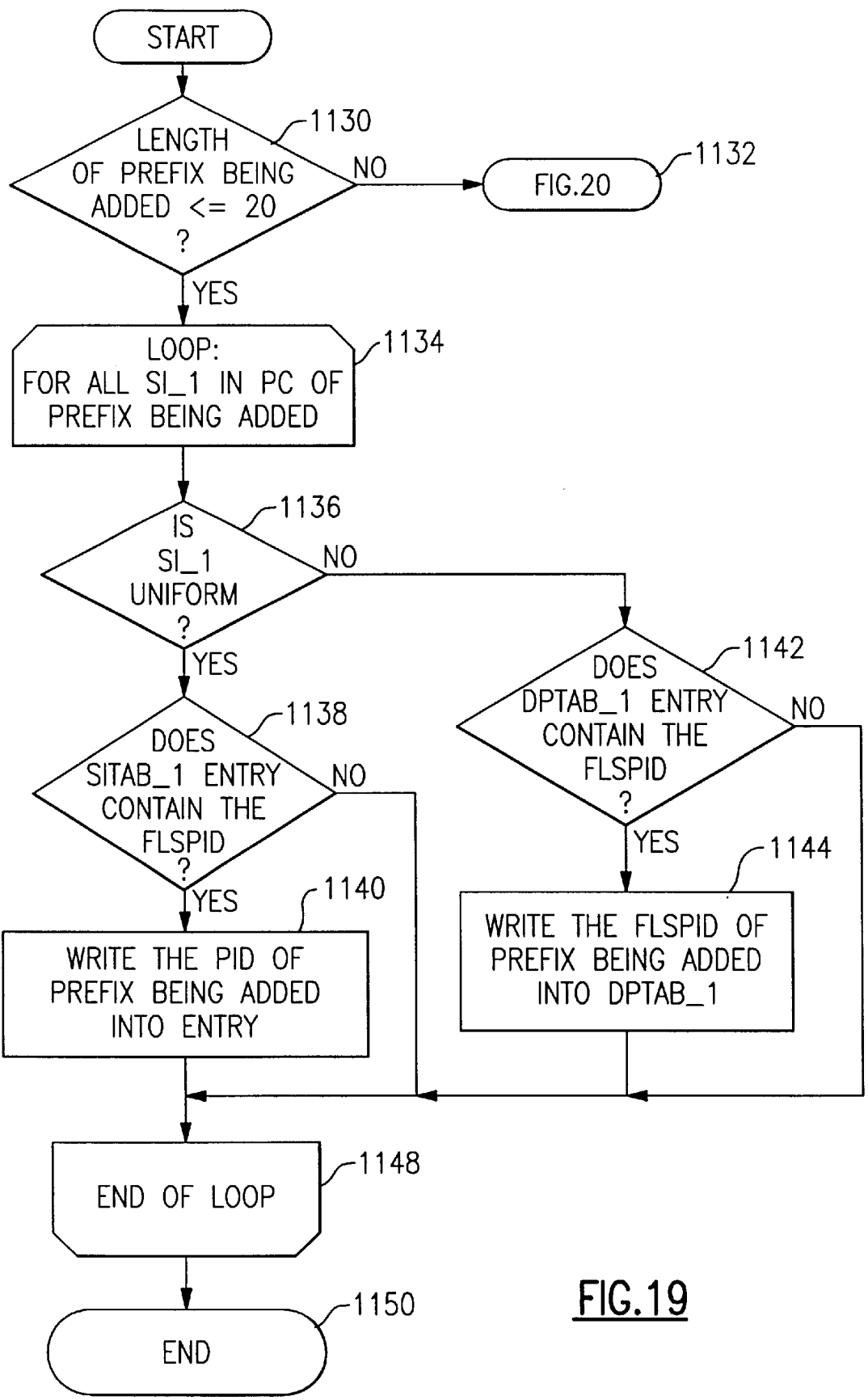
FIGS. 19, 20 and 21A and 21B (FIGS. 21A and 21B are hereafter collectively referred to as FIG. 21) are flow charts of methods for updating a multi-level search table with default prefix tables in response to the addition of a prefix to a prefix database.

Referring to FIG. 18, a two-level device 1000 for searching a search table with default prefix tables is as follows. The two-level device 1000 differs from the two-level device 400 (FIG. 9), in that the device 900 has a DPTAB__1 memory 952, a level 1 comparator-demultiplexor 972, a DPTAB__2 memory 1052, and a level 2 comparator-demultiplexor 272.

The output lines 932 carry the 16 least significant bits of the output of the SITAB__1 memory 921. These lines 932 are connected to address lines 943 of DPTAB__1 memory 952, to the most significant address lines 941 of SITAB__2 memory 221, and to a first data input 934 of a level 1 demultiplexor 971. Output lines 962 of DPTAB__1 952 are connected to a data input 963 of a level 1 comparator-demultiplexor 972.

The output lines 232 carry the 16 least significant bits of the output of SITAB__2 memory 1021. These lines are connected to address lines 1043 of DPTAB__2 memory 1052, to the most significant address lines 1041 of a NRTAB__2 memory 1051, and to a first data input A 1034 of a level 2 demultiplexor 1071. Output lines 1062 of DPTAB__2 memory 1052 are connected to a data input 1063 of comparator-demultiplexor 1072.

Output lines 1061 of NRTAB__2 memory 1051 are connected to a data-and-comparison input 1064 of comparator-demultiplexor 272. Output lines 1081 of comparator-demultiplexor 1072 are connected to a second data input 1035 of demultiplexor 1071. If the signals on all output lines 1061 of NRTAB__2 memory 1051 are equal to zero then comparator-demultiplexor 1072 connects output lines 1062 of DPTAB__2 memory 1052 to its output lines 1081; otherwise, comparator-demultiplexor 1072 connects output lines 1061 of NRTAB__2 non-uniform resolution memory 1051 to its output lines 1081.

Output lines 961 of demultiplexor 1071 are connected to a data-and-comparison input 964 of comparator-demultiplexor 1072. Output lines 981 of comparator-demultiplexor 972 are connected to a second data input 935 of demultiplexor 971. If the signals on all output lines 961 of demultiplexor 1071 are equal to zero then comparator-demultiplexor 972 connects output lines 962 of DPTAB__2 memory 952 to its output lines 981; otherwise, comparator-demultiplexor 972 connects output lines 961 of demultiplexor 1071 to its output lines 181.

SITAB__1 memory 921 has the same size and contents as SITAB__1 memory 421 (FIG. 9.) DPTAB__1 memory 1052 is capable of storing 64K 16-bit words. Each word contains the default prefix for a level 1 non-uniform search interval. The contents of relevant locations of DPTAB__1 memory 1052 are shown in Table 10.

TABLE 10

| Address | Contents | Comment |
|---------|----------|---------|
| . . . | . . . | . . . |
| 1234 | 0001 | 143.75.16.0/20 |
| . . . | . . . | . . . |
| 5678 | 0001 | 143.75.32.0/20 |
| . . . | . . . | . . . |
| 9ABC | 0001 | 143.75.48.0/20 |
| . . . | . . . | . . . |

The contents of SITAB__2 memory 221 are presented in Table 11. The contents differ from the case in which default prefix tables are not used in that all occurrences of a non-uniform search interval's default prefix ID is replaced with the global default prefix ID (10000hex), which is used as the default prefix designator.

TABLE 11

| Address | Content | Comment | |
|---------|---------|---------|---|
| . . . | . . . | . . . | |
| 048D00 | 10000 | 140.75.16.0/26 | |
| 048D01 | 10000 | 140.75.16.64/26 | |
| . . . | . . . | . . . | |
| 048D1A | 10000 | 140.75.22.192/26 | |
| 048D1C | 10002 | 140.75.23.0/26 | |
| 048D1D | 10002 | 140.75.23.64/26 | |
| 048D1E | 10002 | 140.75.23.128/26 | |
| 048D1F | 0FEDC | 140.75.23.192/26 | (non-uniform) |
| 048D20 | 10000 | 14075.24.0/26 | |
| . . . | . . . | . . . | |
| 048D3F | 10000 | 140.75.31.192/26 | |
| . . . | . . . | . . . | |
| 159E00 | 10000 | 140.75.32.0/26 | |
| 159E01 | 10000 | 140.75.32.64/26 | |
| . . . | . . . | . . . | |
| 159E0B | 10000 | 140.75.34.192/26 | |
| 159E0C | 10003 | 140.75.35.0/26 | |
| 159E0D | 10003 | 140.75.35.64/26 | |
| 159E0E | 10003 | 140.75.35.128/26 | |
| 159E0F | 10003 | 140.75.35.192/26 | |
| 159E10 | 10000 | 140.75.36.0/26 | |
| . . . | . . . | . . . | |
| 159E3F | 10000 | 140.75.47.192/26 | |
| . . . | . . . | . . . | |
| 26AF00 | 0BA98 | 140.75.48.0/26 | (non-uniform) |
| 26AF01 | 10000 | 140.75.48.128/26 | |
| . . . | . . . | . . . | |
| 26AF3F | 10000 | 140.75.63.192/26 | |

DPTAB__2 memory 252 is comprised of 64K 16-bit words. Each word contains default prefix for each NSI__2. Contents of relevant locations of DPTAB__2 memory 252 is presented in the Table 12, all numeric values in this table are hexadecimal.

TABLE 12

| Address | Contents | Comment |
|---------|----------|---------|
| . . . | . . . | . . . |
| BA98 | 0000 | 143.75.48.0/26 |
| . . . | . . . | . . . |
| FEDC | 0002 | 143.75.23.192/26 |
| . . . | . . . | . . . |

The contents of a relevant part of the NRTAB__2 memory 251 are presented in Table 13. It differs from the case without default tables in that all occurrences of a non-uniform search interval's default prefix ID is replaced with the global default prefix ID. Note that FEDChex shifted to the left by 6 bit positions is equal to 3FB700hex, and that BA98hex shifted to the left by 6 bit positions is equal to 2EA600hex.

TABLE 13

| Address | Contents | Comment |
|---------|----------|---------|
| ... | ... | ... |
| 2EA600 | 0005 | 140.75.48.0 |
| ... | ... | ... |
| 2EA60F | 0005 | 140.75.48.15 |
| 2EA610 | 0000 | 140.75.48.16 |
| ... | ... | ... |
| 2EA63F | 0000 | 140.75.48.63 |
| ... | ... | ... |
| 3FB700 | 0004 | 140.75.23.192 |
| ... | ... | ... |
| 3FB70F | 0004 | 140.75.23.207 |
| 3FB710 | 0000 | 140.75.23.208 |
| ... | ... | ... |
| 3FB73F | 0000 | 140.75.23.255 |

The results of several examples of search operations with relevant intermediate values are presented in Table 14.

TABLE 14

| IP Address | 911 | 931 | 932 | 962 | 941: 1011 | 1031 | 1032 | 1062 | 1041: 1042 | 1061 | 902 |
|---|---|---|---|---|---|---|---|---|---|---|---|
| 10.45.16.98 | 0A2D1 | 1 | 0000 | xxxx | xxxxxx | x | xxxx | xxxx | xxxxxx | xxxx | 0000 |
| 140.75.5.20 | 8C4B0 | 1 | 0001 | xxxx | xxxxxx | x | xxxx | xxxx | xxxxxx | xxxx | 0001 |
| 140.75.23.10 | 8C4B1 | 0 | 1234 | 0001 | 048D1C | 1 | 0002 | xxxx | xxxxxx | xxxx | 0002 |
| 140.75.23.200 | 8C4B1 | 0 | 1234 | 0001 | 048D1F | 0 | FEDC | 0002 | 3FB708 | 0004 | 0004 |
| 140.75.23.220 | 8C4B1 | 0 | 1234 | 0001 | 048D1F | 0 | FEDC | 0002 | 3FB71C | 0000 | 0002 |
| 140.75.30.56 | 8C4B1 | 0 | 1234 | 0001 | 048D38 | 1 | 0000 | xxxx | xxxxxx | xxxx | 0001 |
| 140.75.35.20 | 8C4B2 | 0 | 5678 | 0001 | 159E0C | 1 | 0003 | xxxx | xxxxxx | xxxx | 0003 |
| 140.75.48.7 | 8C4B3 | 0 | 9ABC | 0001 | 26AF00 | 0 | BA98 | 0000 | 2EA607 | 0005 | 0005 |
| 140.75.48.20 | 8C4B3 | 0 | 9ABC | 0001 | 26AF00 | 0 | BA98 | 0000 | 2EA614 | 0000 | 0001 |
| 140.75.160.34 | 8C4BA | 1 | 0001 | xxxx | xxxxxx | x | xxxx | xxxx | xxxxxx | xxxx | 0001 |
| 189.34.15.16 | BD220 | 1 | 0000 | xxxx | xxxxxx | x | xxxx | xxxx | xxxxxx | xxxx | 0000 |

The two-level device 900 can be modified to produce a single-level device by replacing SITAB_2 memory 1021, NRTAB_2 memory 1051, DPTAB_2 memory 1052, comparator demultiplexor 1072 and demultiplexor 1071 with a NRTAB_1 memory, with its address lines connected to lines 941 and 942 and its data output lines connected to lines 961.

Similarly, the two-level device 900 can be modified to produce a three-level device by replacing NRTAB_2 memory 1051 with a SITAB_3 memory, a NRTAB_3 memory, a DPTAB_3 memory, a comparator-demultiplexor, and a demultiplexor. A four level device is obtained by further decomposing NRTAB_3. This process can be continued until the desired number of levels is obtained. It is also possible to construct a search device in which some levels use default prefix tables and in which other levels do not use default prefix tables, because the operation of one levels does not depend upon whether any other levels use default prefix tables.

Because the number of entries in a default prefix table is limited by the number of prefixes in the prefix database, if the prefix database has a capacity of 64K entries, then each default prefix table will require only 64K entries. Because memory read operations from the default prefix table at a level X can be performed simultaneously with read operations from the level X+1 search interval table (or the level X non-uniform resolution table), the addition of default prefix tables does not affect overall device performance.

For example, adding or deleting a prefix of length 8 will result in 4K writes to the level 1 search interval table (and 4K writes to the level 1 default prefix table, performed simultaneously). This translates into sustained update rates of 82 updates per second.

It is possible to increase the update rate by decreasing the size of the level 1 search interval table and increasing the size of other tables. In some circumstances it is feasible to add an additional level to the search table to provide for better update characteristics. Another option is to select faster memory technology to hold the level 1 search interval table and to use a 'transparent update' technique in this area. "Transparent updates" are updates which are performed in faster memory while it is in an idle state waiting for slower memories to complete the search operation. Because 1M words of SRAM are needed to implement the level 1 search interval table of Layout 2, the worst case update will require 36 writes to add or delete a 21-bit or 27-bit long prefix and the sustained update rate will jump to about 9000 updates/s. Another benefit of using faster memory for small level 1 memories is a reduction in the overall search delay.

Referring to FIG. 11, a multi-level search table with default prefix tables is updated in response to a prefix P being added to the prefix database as follows. If the length of the prefix P is greater than 20 bits (decision step 1130), then control passes to the process shown in FIG. 20 (step 632). If the length of the prefix P is less than or equal to 20 bits, then a loop over all entries in the level 1 search interval table that correspond to intervals within the prime continuum of prefix P is entered (step 1134). For each entry, if the entry corresponds to a uniform interval (decision step 1136), and if the entry contains the prefix identifier FLSPID of the first less specific prefix of prefix P (decision step 1138), then the prefix ID of prefix P is written into the entry (step 1140). If the entry corresponds to a non-uniform interval (decision step 1136), and if the level 1 default prefix table entry for the non-uniform interval contains the prefix identifier FLSPID (decision step 1142), then the prefix identifier FLSPID is written into the entry in the level 1 default prefix table corresponding to the non-uniform interval (step 1144). After the loop entered in step 1134 is complete (step 1148), updating of the search table terminates (step 1150).

Figure 20:
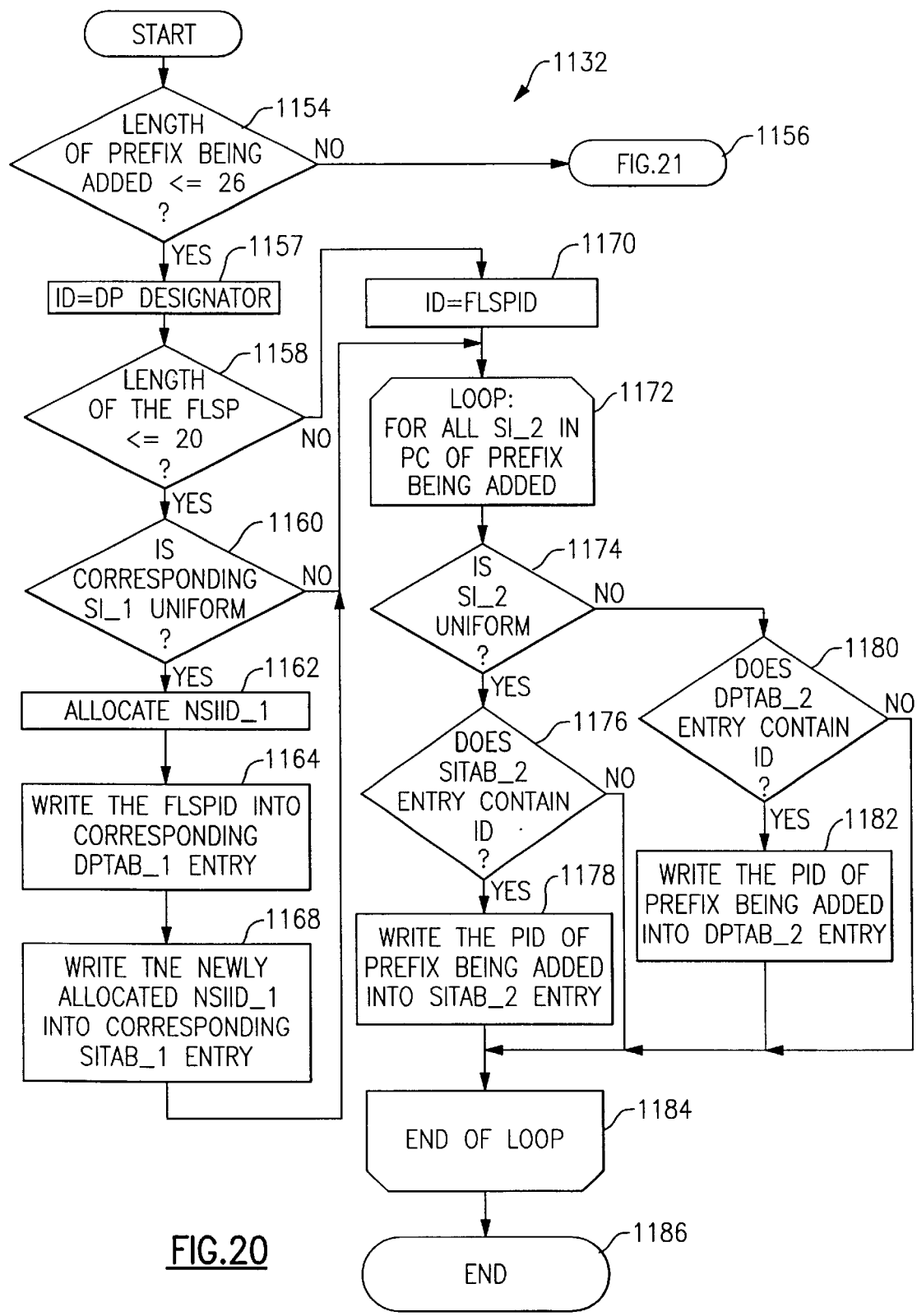

Referring to FIG. 20, the search table is updated in response to a prefix P with a length greater than 20 bits being added to the prefix database as follows. If the length of the prefix P is greater than 26 bits (decision step 1154), then control passes to the process shown in FIG. 21 (step 1156). If the length of the prefix P is less than or equal to 26 bits (decision step 1154), then control proceeds as follows.

If the length of the first less specific prefix of P (having a prefix ID of FLSPID) is less than or equal to 20 bits, and the corresponding level 1 search interval (referred to as SI_1) is uniform (decision step 1160), then a non-uniform level 1 search interval identifier NSIID_1 is allocated (step 1162), because the addition of prefix P makes SI_1 into a non-uniform interval. The prefix ID FLSPID is written into the level 1 default prefix table entry corresponding to NSIID_1 (step 1164). NSIID_1 is written into the corresponding level 1 search interval table entry (step 1168).

If the length of the first less specific prefix of prefix P is greater than 20 bits (decision step 1158), then a variable ID is assigned the value of FLSPID (step 1170). A loop over all entries in the level 2 search interval SI_2 corresponding to addresses within the prime continuum of prefix P is entered (step 1172). For each such level 2 search interval table entry, if SI_2 is uniform (decision step 1174), and if the entry contains the prefix ID of the first less specific prefix of prefix P (decision step 1176), then the prefix ID of P is written into the entry (step 1178). If SI_2 is not uniform (decision step 1174), and if the level 2 default prefix table entry corresponding to SI_2 contains the value of ID (decision step 180), then PID is written into the level 2 default prefix table entry (step 1182). After the loop entered into in step 1172 completes (step 1184), updating of the search table terminates (step 1186).

Figure 21A:
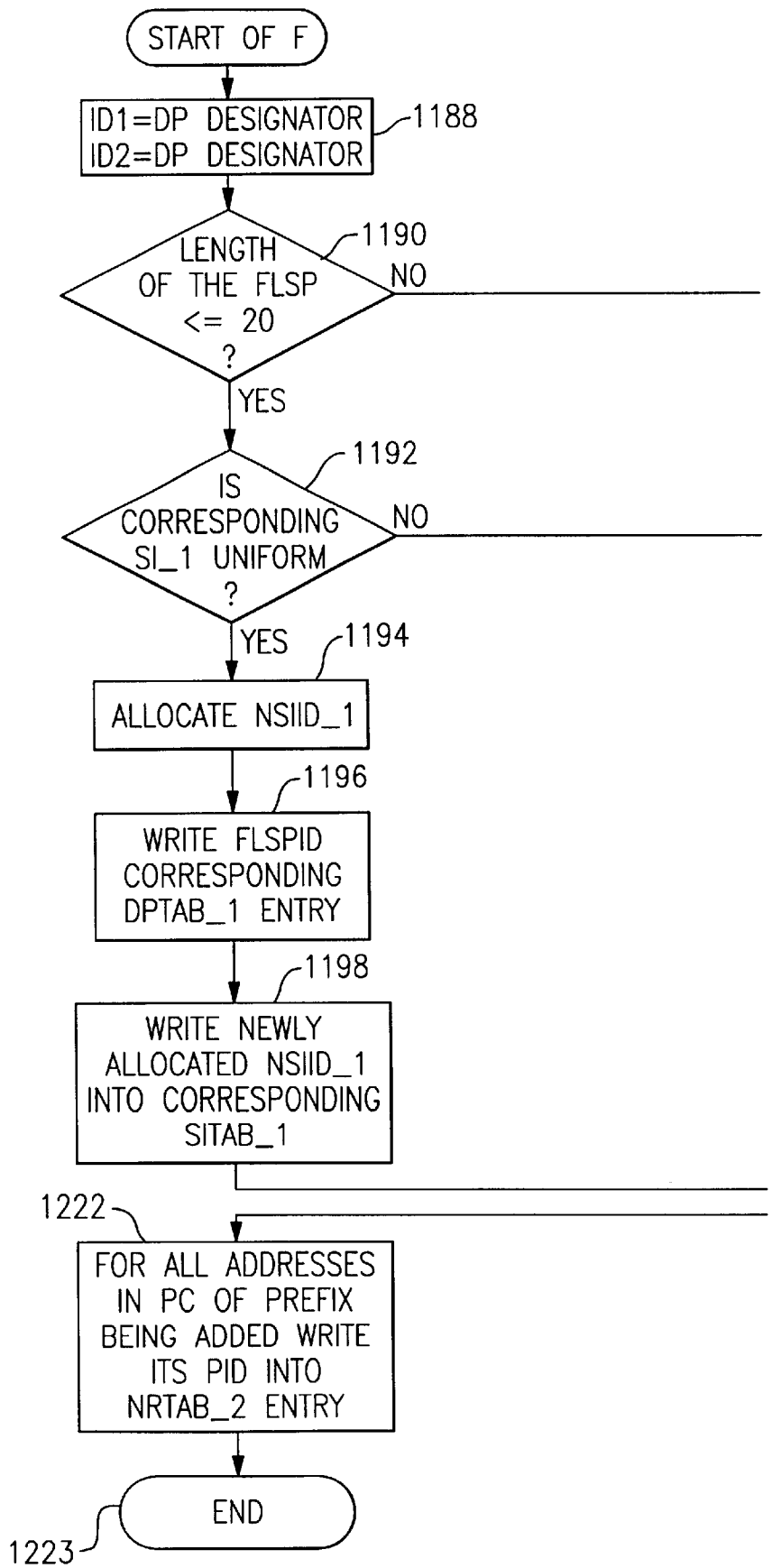
Figure 21B:
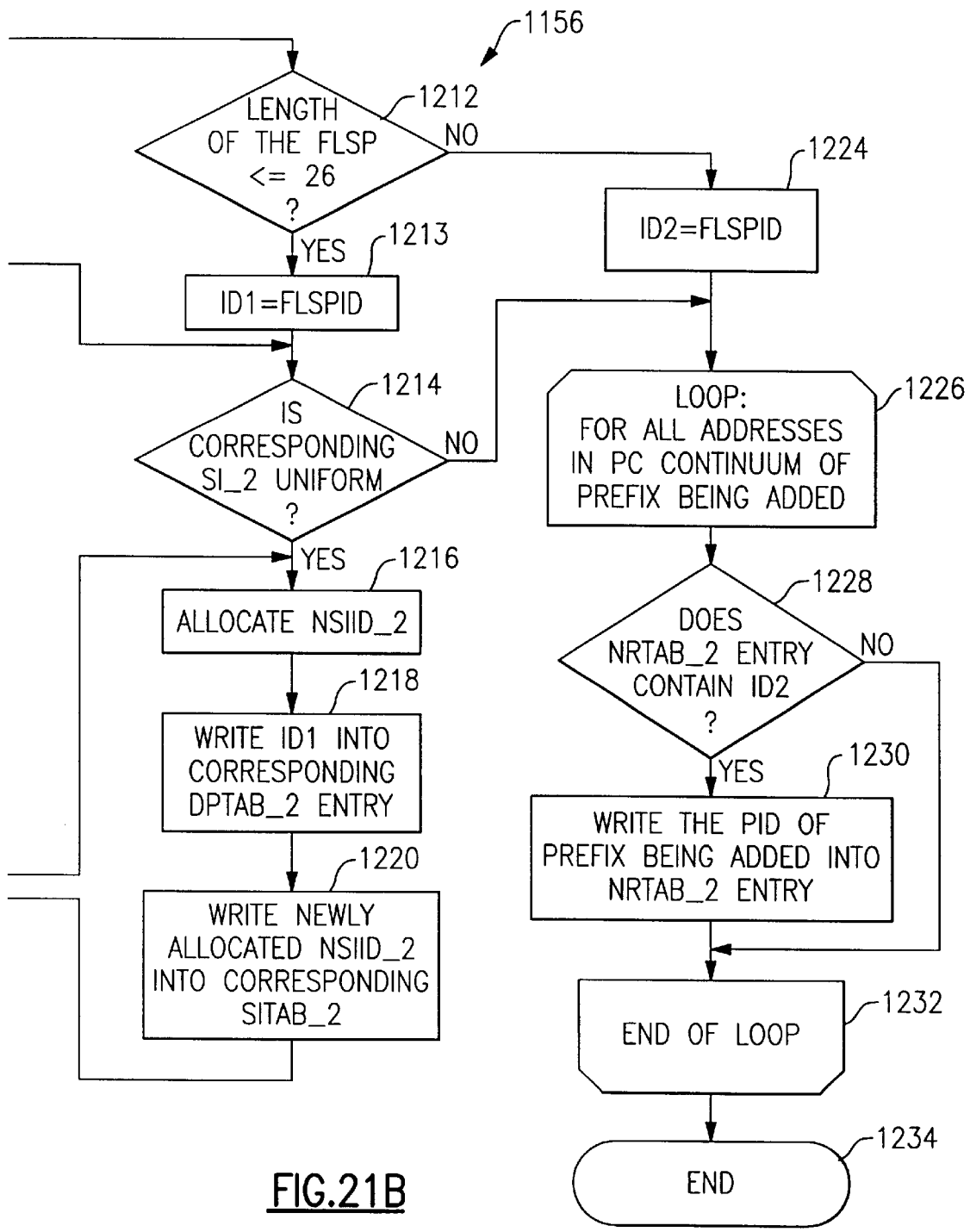

Referring to FIG. 21, the search table is updated in response to a prefix P with a length greater than 26 bits being added to the prefix database as follows. A variable ID1 is assigned the default prefix designator (used to specify a default prefix) and a variable ID2 is assigned the default prefix designator (step 1188). If the length of the prefix FLSP is less than or equal to 20 bits (decision step 1190), and if the corresponding level 1 search interval SI_1 is uniform (decision step 1192), then control proceeds as follows. A level 1 non-uniform search interval identifier NSIID_1 is allocated (step 1194). The prefix ID FLSPID is written into the level 1 default prefix table entry corresponding the non-uniform search interval (step 1196). NSIID_1 is written into the corresponding level 1 search interval 1 entry (step 1198). A level 2 non-uniform search interval identifier NSIID_2 is allocated (step 1216). The prefix identifier ID is written into the level 2 default prefix table entry corresponding to NSIID_2 (step 1218). NSIID_2 is written into the corresponding level 2 search interval 1 entry (step 1220). The prefix ID of prefix P is written into the entries in the level 2 non-uniform resolution table corresponding to intervals within the prime continuum of prefix P (step 1222). Updating of the multi-level search table terminates (step 1223).

If the length of the prefix FLSP is greater than 20 bits (decision step 1190) but less than or equal to 26 bits (decision step 1212), then the variable IDI is assigned the value of FLSPID (step 1213). If the level 2 search interval SI_2 corresponding to the prefix FLSP is uniform (decision step 1214), then control passes to step 1216, as described above. If the length of the prefix FLSP is greater than 26 bits (decision steps 1190 and 1212), the variable ID2 is assigned the value of FLSPID (step 1224). If the length of the prefix FLSP is greater than 26 bits (decision step 1212) or SI_2 is non-uniform (decision step 1214), then a loop over all level 2 non-uniform resolution table entries corresponding to addresses in the prime continuum of prefix P is entered (step 1226). If an entry contains the prefix identifier ID2 (decision step 1228), then the prefix identifier PID is written into the entry (step 1230). After the loop entered into in step 1226 completes (step 1232), updating of the search table terminates (step 1234).

Figure 22:
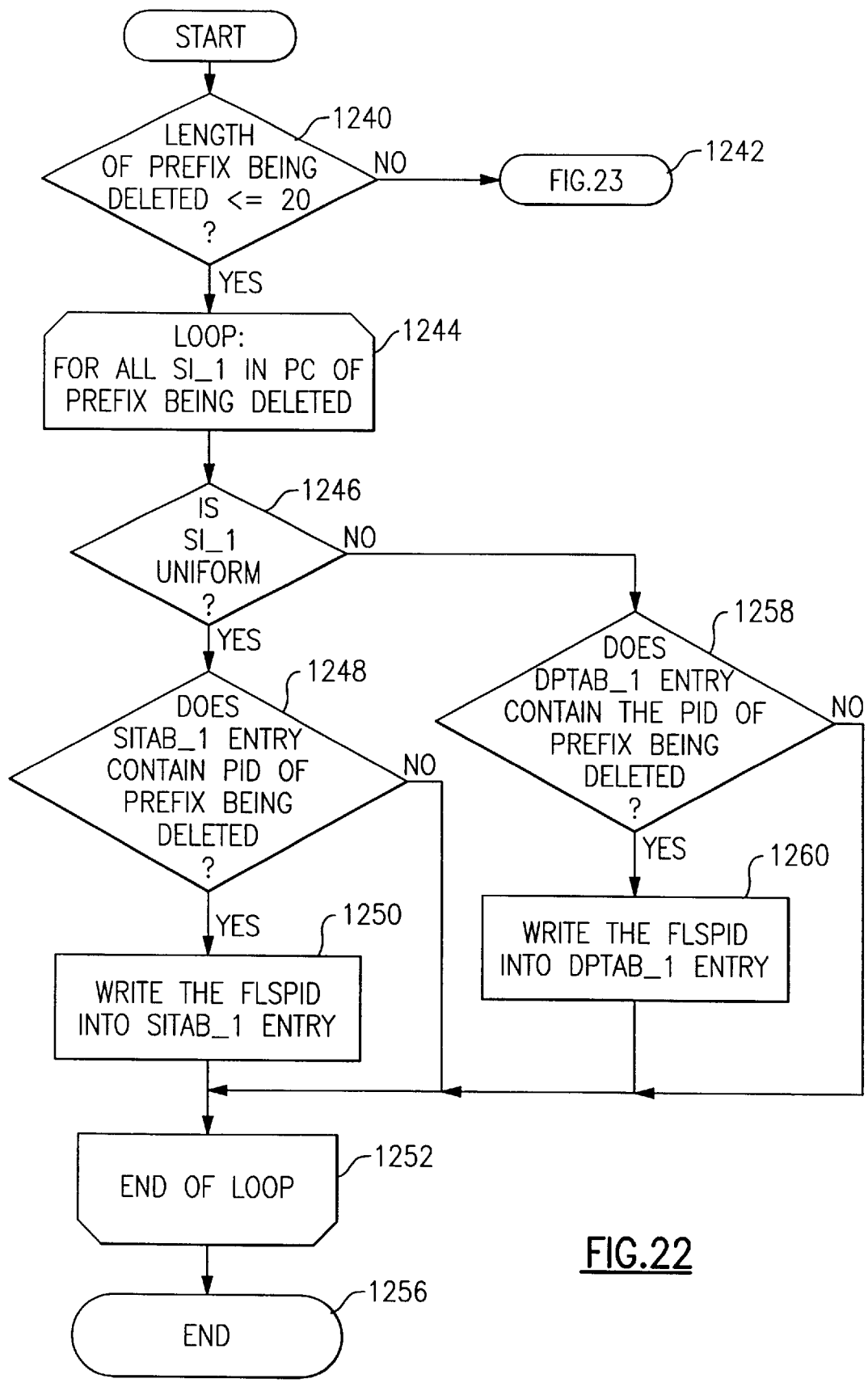

Referring to FIG. 22, a multi-level search table with default prefix tables is updated in response to a prefix P being deleted from the prefix database as follows. If the length of the prefix P is greater than 20 bits (decision step 1240), then control passes to the process shown in FIG. 23 (step 1242). If the length of the prefix P is less than or equal to 20 bits (decision step 1240), then a loop over all level 1 search interval table entries corresponding to level 1 search intervals SI_1 that are within the prime continuum of prefix P is entered (step 1244). For each entry, if SI_1 is uniform (decision step 1246), and if the entry contains the prefix identifier PID (decision step 1248), then the prefix ID FLSPID is written into the entry (step 1250). If SI_1 is non-uniform interval (decision step 1246), and if the level 1 default prefix table entry corresponding to SI_1 contains the prefix identifier PID (decision step 1258), then the prefix identifier PID is written into the level 1 default prefix table entry corresponding to SI_1 (step 1260). After the loop entered in step 1244 is complete (step 1252), updating of the search table terminates (step 1256).

Figure 23:
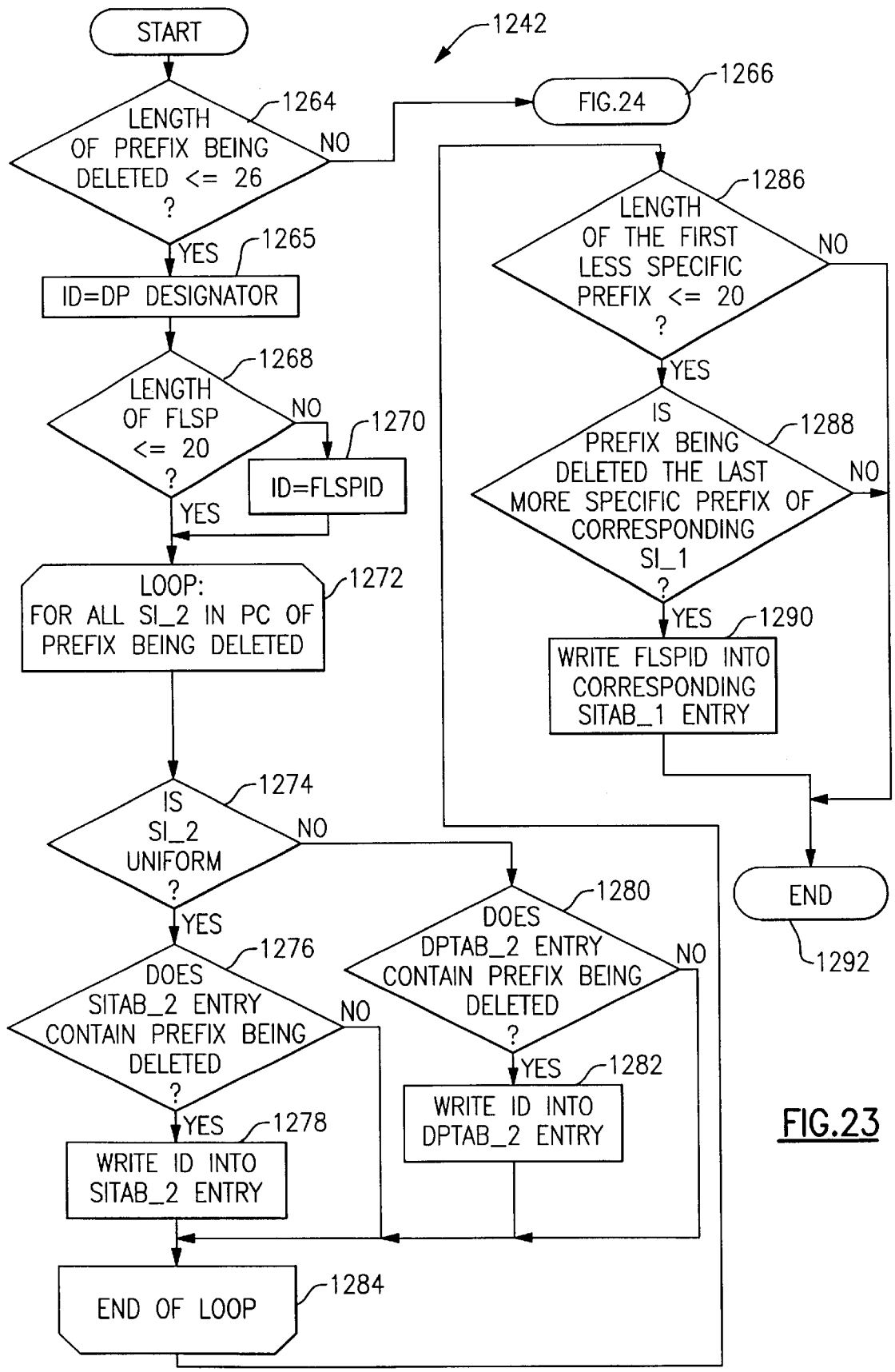

Referring to FIG. 23, the search table is updated in response to a prefix P with a length greater than 20 bits being deleted from the prefix database as follows. If the length of the prefix P is greater than 26 bits (decision step 1264), then control passes to the process shown in FIG. 24 (step 1266). Otherwise, a variable ID is assigned the default prefix designator (which indicates a default prefix) (step 1265).

If the length of FLSP is less than or equal to 20 bits (decision step 1268), then the variable ID is assigned the value of FLSPID (step 1270). A loop over all entries SI_2 in the level 2 search interval table corresponding to intervals within the prime continuum of prefix P is entered (step 1272). For each level 2 search interval table entry, if SI_2 is uniform (decision step 1274), and if the entry contains the prefix identifier PID (decision step 1276), then the prefix identifier FLSPID is written into the entry (step 1278). If SI_2 is not uniform (decision step 1274), and if the level 2 default prefix table entry corresponding to SI_2 contains the prefix ID of prefix P (decision step 1280), then the value of the variable ID is written into the level 2 default prefix table entry corresponding to SI_2 (step 1282). The loop entered into in step 1272 terminates (step 1284). If the length of FLSP is less than or equal to 20 bits (decision step 1286), and if the prefix P is the only prefix in the prefix database that is more specific than the prefix corresponding to SI_1 (decision step 1288), then the prefix identifier FLSPID is written into the level 1 search table entry corresponding to SI_1 (step 1290). Updating of the search table terminates (step 1292).

Figure 24B:
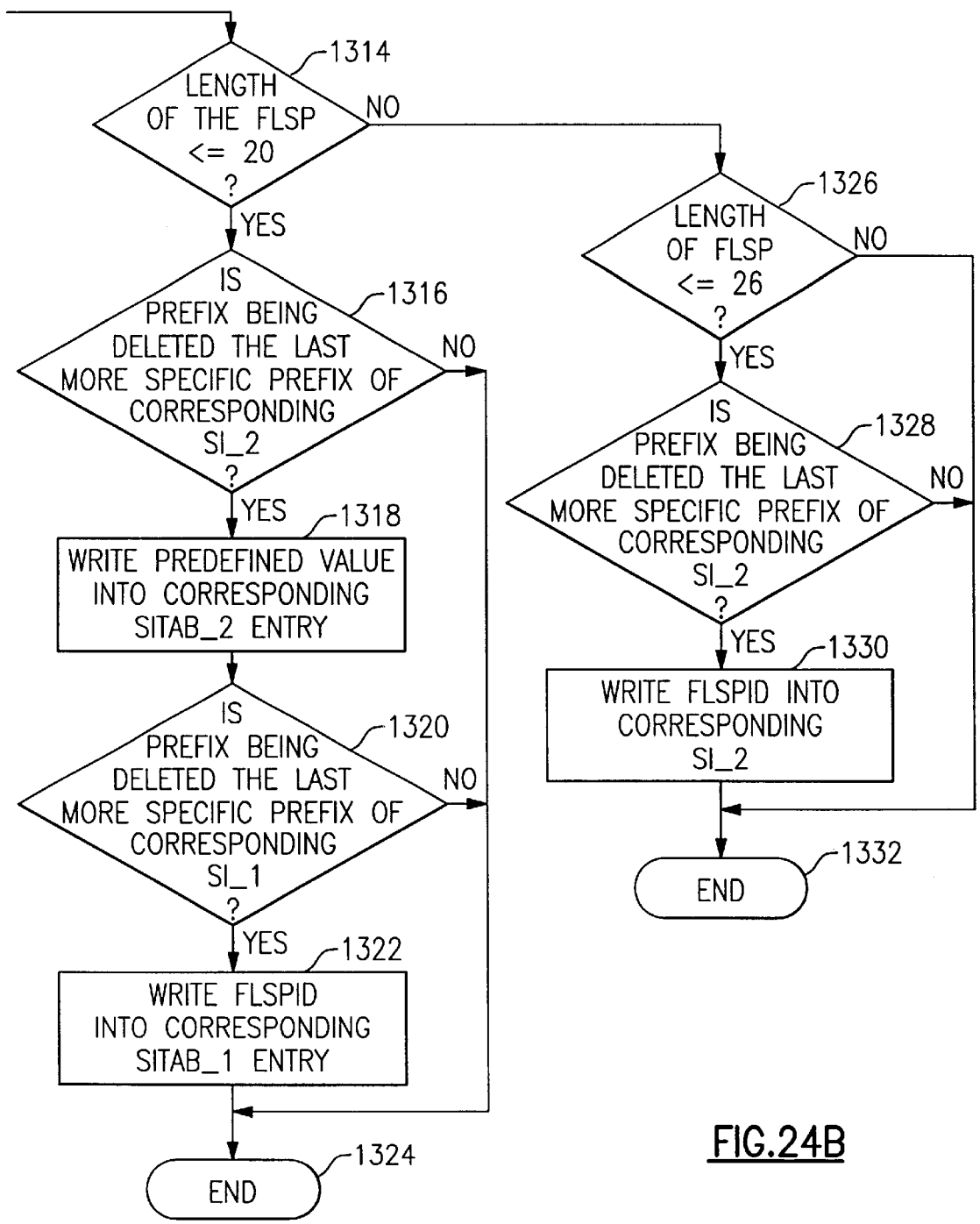

Referring to FIG. 24, the search table is updated in response to a prefix P with a length greater than 26 bits being deleted from the prefix database as follows. A variable ID is assigned the default prefix designator (indicating a default prefix) step 1300. If the length of the prefix FLSP is less than or equal to 20 bits (decision step 1302), the variable ID is assigned the prefix identifier FLSPID (step 1304). A loop over all entries in the level 2 non-uniform resolution table corresponding to intervals in the prime continuum of prefix P is entered (step 1306). For each entry, if the entry contains the prefix identifier of the prefix P (decision step 1308), then the value of the variable ID is written into the entry (step 1310). The loop entered into in step 1306 terminates (step 1312). If the length of the prefix FLSP is less than or equal to 20 bits (decision step 1314) and the prefix P is the only prefix in the prefix database that is more specific than the prefix corresponding to SI_2 (decision step 1316), then the default prefix designator is written into the corresponding level 2 search interval table entry (step 1318). If P is the only prefix in the prefix database that is more specific than the prefix corresponding to SI_1 (decision step 1326), then the prefix identifier FLSPID is written into the corresponding level 1 search interval table entry (step 1322). Updating of the multi-level search table terminates (step 1324).

If the length of the prefix FLSP is greater than 26 bits (decision steps 1314 and 1326) and the prefix P is the only prefix in the prefix database that is more specific than the prefix corresponding to SI_2 (decision step 1328), then the prefix identifier FLSPID is written into the entry corresponding to SI_2 (step 1330). Updating of the search table terminates (step 1332).

Miscellaneous Update Issues

The update techniques described above require both read and write access to the memory areas of the search device. However, it is also possible for the update circuitry to maintain copies of the memory areas of the device in a separate memory block connected only to update circuitry. In this case, there will be no need to read from the memory areas of the device while updates are being performed. This approach has the advantage of having a smaller impact on device throughput and a simpler device design at the price of using more memory.

It is also possible to detect the deletion of the last more specific prefix for a particular non-uniform search interval, resulting in the transformation of the non-uniform search interval into a uniform search interval. This is performed by associating a counter with each NSI. The counter contains the number of prefixes in the prefix database that are more specific than the NSI's search interval prefix. This counter is incremented whenever a new prefix more specific than the NSI's search interval prefix is added to the prefix database, and decremented whenever a prefix more specific than NSI's search interval prefix is removed from the prefix database. If the value of this counter becomes 0 as a result of a prefix being deleted from the prefix database, it is an indication of the fact that the deleted prefix is the last more specific prefix for the NSI.

It is also possible to use a single memory block containing both a SITAB_X entry and the corresponding DPTAB_X entry in the same word of memory. This layout has an advantage of having a less complicated hardware design, because it needs only three memory controllers instead of five as in FIG. 18. If such a single memory block is used in this way, then a 'hidden bit' technique can be used to store the uniform/non-uniform discriminator, thus providing for effective memory usage. For example, the number of NSI-ID's to be stored is one less than the number of PIDs. Therefore, it is possible to reserve one NSIID value to act as the uniform/non-uniform discriminator, thus saving one bit of memory per word.

The techniques described above assume that the search devices provide at least write access to all required memory areas. This writing can be performed either in off-line mode or in on-line mode. In the former case, the device is removed from active use before updates are performed. In the latter case, necessary arbitration circuitry is provided, allowing update accesses to be interleaved with search accesses, rendering the device unavailable to perform searches only for the time of a single update access. In the latter case, a simple FIFO queue can be used on both input and output to simplify the interface with the client.

Because the search devices described above have a pipelined design, updates can be performed in a pipelined manner. For example, the first update access can be performed by level 1 at the same time as level 2 is performing search operations. If the search device uses DRAM technology, then the necessary refresh operations can be performed in a similar pipelined manner.

Dealing with Singular Exceptions

Some routes require special handling of certain destination addresses. For example, a next hop represented by a particular prefix in the prefix database may require that destination addresses corresponding to the prefix padded with all zeros be handled specially. For example, it may be required to drop packets with such destination addresses, or to send such packets using broadcast transmission.

Such cases may also be handled by storing in the prefix database entry for such prefixes a "singular exception flag" indicating that it requires special treatment of such destination addresses and also storing the values of these destination addresses. The destination addresses themselves can either be stored directly in the prefix database's memory or be calculated on the fly from the prefix value and length. Once a prefix is found during a search operation, a check will be performed to determine whether (1) its entry has a singular exception flag and (2) whether the address being looked up matches the exception criteria. If criteria (1) and (2) are met, then an exception will be generated and the packet will be processed in a special way. It is also possible to keep the singular exception flag and destination address information in the same memory word as the prefix's prefix ID in order to eliminate extra lookup time.

Additional Device Examples

Figure 25:
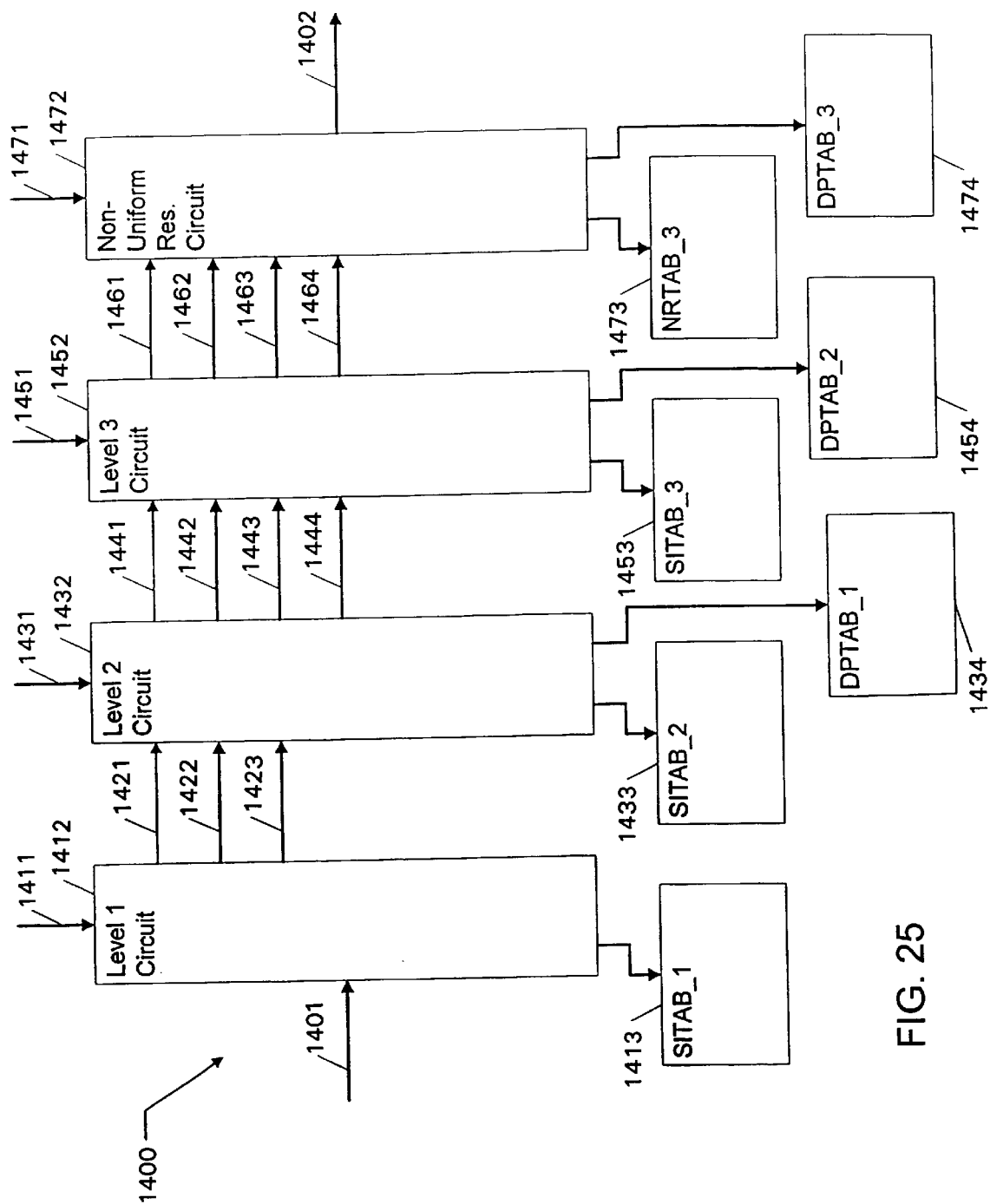
FIG. 25 is a block diagram of a three-level search device with default prefix tables.

Referring to FIG. 25, another embodiment of a four-stage (three-level) device 1400 is as follows. A destination address is inputted into the device 300 at an input 1401. A Level 1 Circuit 1412 uses part of the destination address to perform a lookup in a level 1 search interval table (SITAB_1) memory 1413. Update information is inputted into the Level 1 Circuit 1412 at an update connection 1411. Update connection 1411 is used to write data into and read data from SITAB_1 memory 1413. If a destination address is inputted into the Level 1 Circuit 1413 on connection 1401 at the same time as update information is inputted at connected 1411, the Level 1 Circuit 312 arbitrates and serializes the resulting accesses to SITAB_1 memory 1413. The results of the lookup into SITAB_1 memory 1413 are outputted from the Level 1 Circuit 1412 and are inputted into a level 2 Circuit 1432 on control lines 1421 and data lines 1422. The bits of the destination address which are not used by the Level 1 Circuit 312 are outputted on destination address lines 1423. Data lines 1422 contain either the prefix PID of the best-matching prefix for the destination address inputted on input 1401 or a level 1 non-uniform search interval ID corresponding to the destination address. Control lines 1421 provide synchronization information (for example, "data ready") to the level 2 Circuit 1432, and a signal indicating whether the data lines 1422 contain a prefix ID (a "prefix found" state) or a level 1 non-uniform search interval ID (a "prefix not found" state).

The level 2 Circuit 1432 performs a lookup in a level 2 search interval table (SITAB_2) memory 1433 and a level 1 default prefix table (DPTAB_1) memory 1434. Update information is inputted into the level 2 Circuit 1432 over an update connection 1431, which is used to write data into and read data from SITAB_2 memory 1433 and DPTAB_2 memory 1434. The operations performed by the level 2 Circuit 1432 depend upon the information on control lines 1421. If the control lines 1421 carry a "prefix found" signal, then the signals on data lines 1422 are outputted to data lines 1442 and a "prefix found" signal is output un control lines 1441. Otherwise, the level 2 Circuit 1432 combines the information on data lines 1422 and address lines 1423 to perform a lookup in SITAB_2 memory 1433. The level 2 Circuit 1432 also uses the information on data lines 1422 to perform a lookup in DPTAB_1 memory 1434.

If a prefix ID is found in SITAB_2 memory 1433, then the following operations are performed. If the prefix ID that is found is not 0, then the prefix ID is outputted on data lines 1442; otherwise, the prefix ID found in DPTAB_1 memory 1434 is outputted on data lines 1442. In either case, a "prefix found" signal is then output on control lines 1441. If a level 2 non-uniform search interval ID (NSIID_2) is found in SITAB_2 memory 1433, then NSIID_2 is outputted on data lines 1442 and the value of the prefix ID found in DPTAB_1 memory 1434 is outputted on default prefix data lines 1444. The unresolved bits of the destination address on lines 1401 are outputted on address lines 1443. A "prefix not found" signal is then outputted on control lines 1441.

Level 3 Circuit 1452 performs a lookup in a level 3 search interval table (SITAB_3) memory 1453 and a level 2 default prefix table (DPTAB_2) memory 1454. The Level 3 Circuit 1452 receives update information over an update connection 1451. Level 3 Circuit 1452 functions in the same manner as level 2 Circuit 1432, except that if the prefix ID found in DPTAB_2 memory 1454 is 0, then the default prefix received on default prefix data lines 1444 is outputted on default prefix lines 1464 instead of the value zero. Level 3 Circuit uses control lines 1461, data lines 1462, address lines 1463, and default prefix lines 1464 in the same manner as level 2 Circuit 1432 uses control lines 1441, data lines 1442, address lines 1443, and default prefix lines 1444, to transfer information into a Non-Uniform Resolution Circuit 1472.

Non-Uniform Resolution Circuit 1472 performs lookups in a level 3 non-uniform resolution table (NRTAB_3) memory 1473 and a level 3 default prefix table (DPTAB_3) memory 1474. The Non-Uniform Resolution Circuit 1472 receives update information over update connection 1471. Non-Uniform Resolution Circuit 1472 and Level 3 Circuit 1452 function in the same manner, except that the Non-Uniform Resolution Circuit 1472 has only a single output 1402 which carries a signal representing the best-matching prefix ID for the destination address input on lines 1401. Non-Uniform Resolution Circuit 1472 has only this output 1402 because the best-matching prefix ID is either received by it from the Level 3 Circuit 1452 or found in the NRTAB_3 memory 1473.

A device with more than three levels can be constructed from the device 1400 by adding additional circuits which are analogous to the Level 3 Circuit 1452. A device with fewer than three levels can be constructed from the device 1400 by removing the Level 3 Circuit 1452 or the level 2 Circuit 1452 and the level 2 Circuit 1432.

The following examples illustrate performance characteristics of search devices with various configurations. All devices described below use a pipelined design and default prefix table memories. In the following examples, the following SRAM memories produced by Cypress Semiconductor, San Jose, Calif., are used: CY7C1021 (64Kx16, 15 ns, $5.45) and CY7C1049 (512Kx8, 17 ns, $23). Furthermore, the model MT4C2M8E7 (2Mx8, 50 ns, $3.90) DRAM produced by Micron Technologies, Inc., Boise, Id., is used. This DRAM memory is able to perform a read, write, or refresh operation every 84 ns. Data are ready 25 ns after the beginning of a read operation. In calculating sustained update rate, we assume that updates do not take more than 3% of the maximum device throughput. We also assume that both updates and memory refresh operations are performed in pipelined mode, and that the device's update circuitry does not perform a read access from the device's memory.

Consider an example of a two-level search device for searching a prefix database with a capacity of 64K prefixes. The length of destination addresses is assumed to be 32 bits. The multi-level search table stored by the device uses level 1 search intervals with a prefix length of 16 bits and level 2 search intervals with a prefix length of 24 bits. Search interval table memories (SITAB_1, SITAB_2) use 17-bit words. Both default prefix table memories (DPTAB_1 and DPTAB_2) and the level 2 non-uniform resolution table memory (NRTAB_2) use 16-bit words. The SITAB_1 memory uses two CY7C1021 parts, and the DPTAB_1 and DPTAB_2 memories use one CY7C1021 part each. The SITAB_2 uses 24 MT4C2M8E7 parts, and the NRTAB_2 memory uses 16 MT4C2M8E7 parts. The total cost of such a device is $278, assuming the cost of connecting circuitry to be $100.

The MT4C2M8E7 can perform read or write operations every 84 ns. It requires a refresh cycle every 15.6 us, which equals 64K refreshes per second. Because each refresh cycle uses the time of a single memory lookup, 64K lookup cycles each second are used to refresh the MT4C2M8E7. Therefore, the search device will have a maximum throughput of 11,800,000 ($1/84\times10^{-9}$) prefix lookups per second.

It is reasonable to assume that each level n circuit (such as the Level 1 Circuit 1412) and each Non-Uniform Resolution Circuit (such as the Non-Uniform Resolution Circuit 1472) adds iOns of processing time to a raw memory access, and that the input circuits (from which the destination address is obtained) use an additional ions. Therefore, the total lookup delay in a three-level search device such as search device 1400 is 105 ns.

Each write operation of the update uses the time of one memory lookup. In the worst case (adding or deleting an 8-bit class A route), a single update will require 256 writes. Therefore, the sustained update rate of a three-level search device such as search device 1400 is 1300 updates per second.

If the capacity of the prefix database is 256K prefixes instead of 64K prefixes, the total cost of the device will rise to $510, the DPTAB_2 memory will require 4 CY7C1021 parts (instead of 1), and the NRTAB_2 memory will require 64 MT4C2M8E7 parts (instead of 16).

Consider an example of a three-level search device for searching a prefix database with a capacity of 64K prefixes. The length of destination addresses is assumed to be 32 bits. The multi-level search table stored by the device uses level 1 search intervals with a prefix length of 20 bits, level 2 search intervals with a prefix length of 24 bits, and level 3 search intervals with a prefix length of 28 bits. Search interval table memories (SITAB_1, SITAB_2, and SITAB_3) use 17-bit words. Default prefix table memories (DPTAB_1, DPTAB_2, and DPTAB_3) and the level 3 non-uniform resolution table memory (NRTAB_3) use 16-bit words. The SITAB_1 memory uses six CY7C1049 parts, and the DPTAB_1, DPTAB_2, and DPTAB_3 memories use one CY7C1021 part each. The SITAB_2 and SITAB_3 use 6 CY7C1049 parts each, and the NRTAB_3 uses 4 CY7C1049 parts. The total cost of such a device is $622, assuming the cost of connecting circuitry to be $100. The total throughput of such a device is 58,800,000 prefix lookups per second. The total lookup delay in such a device is 118 ns. In the worst update case, a single update will require 4K writes. Therefore, the sustained update rate of such a device is 435 updates per second.

Consider an example of a four-level IPv6 search device for searching a prefix database with a capacity of 32K prefixes. The length of destination addresses is assumed to be 128 bits. However, the maximum length of a routing prefix is 61 bits. The multi-level search table stored by the device uses level 1 search intervals with a prefix length of 25 bits, level 2 search intervals with a prefix length of 34 bits, level 3 search intervals with a prefix length of 43 bits, and level 4 search intervals with a prefix length of 52. The SITAB_1 memory uses 32 MT4C2M8E7 parts. The four DPTAB memories use one CY7C1021 part each. The level 2, 3, and 4 search interval table memories use 16 MT4C2M8E7 parts each. The NRTAB_4 memory uses 16 MT4C2M8E7 parts. The total cost of such a device is $472, assuming the cost of connecting circuitry to be $200. The maximum throughput of such a device is 58,800,000 prefix lookups per second. The total lookup delay in such a device is 185 ns. In the worst update case (adding or deleting a prefix of length 13), a single update will require 4K writes. Therefore, the sustained update rate of such a device is 82 updates per second.

The techniques described above may be employed to perform searching in other contexts. For example, consider a linear list of items $X_1, X_2, \ldots, X_n$. Each item is tagged with one or more tags from a set of tags $T_1, T_2, \ldots, T_m$. Each tag $T_j$ is attached to all items in one and only one range from $X_k$ to $X_l$. We will refer to $X_k$ as a "lower tag range border of $T_j$" and we will refer to $X_l$ as an "upper tag range border of $T_j$." Assume that there exists a rule $R(S_i)$ for selecting the highest priority tag among the set of tags $S_i$ attached to a particular element $X_i$. The rule $R(S_i)$ depends only upon the tags attached to $S_i$ and does not depend upon the element $S_i$. The problem is to quickly find the highest priority tag for element $X_i$.

If the number of items, n, is relatively small, or the number of tags, m, is greater than n, then this problem has a trivial solution: store the highest priority tag for each element $S_i$, where i ranges from 1 to n, in an array. The highest priority tag for an element $X_i$ can then be found quickly at a subsequent time by retrieving the array element at index i. However, the problem is more difficult to solve if n is big and m is relatively small. A typical application of this problem is that of finding the longest prefix matching an IP address. In this case, items are IP addresses, n is 4G ($2^{32}$), tags are routing prefixes, and m is the size of the prefix database (approximately 64K).

Assume now that the list of items is split into intervals. For each interval, all elements in the interval either have the same highest priority tag, or they do not. If all elements in an interval have the same highest priority tag, the interval is a "uniform intervals"; otherwise, the interval is a "non-uniform interval." A result of this is that if an interval does not contain any upper or lower tag range borders, then the interval is uniform. Furthermore, a non-uniform interval contains at least one tag range border.

The number of non-uniform intervals, $N_{nu}$, is less than or equal to twice the number of tags. In other words:

$$N_{nu} \leq 2m \qquad \text{Equation 2}$$

This is true because each non-uniform interval contains at least one tag range border, and each tag has exactly two tag range borders (an upper tag range border and a lower tag range border). Note that this relationship does not depend upon the size or number of intervals and does not require intervals to be of the same size.

Although the examples described above relate to searching for the longest-matching prefix for a destination IP address, the techniques are equally applicable to searching for the highest priority tag for a given element in other contexts, as described in more detail below, when it is possible to split the list of items $X_1, X_2, \ldots, X_n$ into search intervals such that there exists a function $F(X_i)$ that identifies to which search interval the item belongs. The method works more efficiently when the total number of tags is much less than the total number of elements. In some cases the index i of an item $X_i$ can be derived from the item $X_i$ itself. For example, the index of an IP address in a list of IP addresses is the IP address itself. In such a case, dividing the item's index by the number of intervals yields the index of the level 1 interval containing the address.

Assume for purposes of the following discussion that the item list $X_1, X_2, \ldots, X_n$ is split into search intervals referred to as "level 1 search intervals" (SI_1's). We will refer to the number of SI_1's as $N_1$. According to Equation 2, above, the number of non-uniform SI_1's (NSI_1's) is less than or equal to 2m. Assume that each NSI_1 is split into smaller search intervals, referred to as level 2 Search Intervals (SI_2s). We will refer to the number of SI_2's as $N_2$. According to Equation 2, above, the number of non-uniform SI_2's (NSI_2's) is less than or equal to 2*m. The SI_2's may be further split into SI_3's, and so on, until the search intervals at the last level are small enough that they each identify the highest priority tag for a single item.

A multi-level search table with X levels is used to search for the highest priority tag associated with an item. The multi-level search table includes a level 1 search interval table (SITAB_1). Each entry of the SITAB_1 is associated with a SI_1 and contains a discriminator which indicates whether the associated SI_1 is a uniform interval or a non-uniform interval. Each entry in the SITAB_1 corresponding to a non-uniform interval contains a pointer to a part of a level 2 search interval table (SITAB_2) representing all SI_2's within the non-uniform interval. Additional levels (SI_2, SI_3, etc.), if necessary, are organized in the same way. Each level X non-uniform search interval (NSI_X) entry in SITAB_X contains a pointer to a part of a level X non-uniform resolution table (NRTAB_X) corresponding to addresses within the NSI_X. Each entry in the NRTAB_X corresponds to a single item and contains the highest-priority tag for the item.

A function F1 (X) finds the SITAB_1 entry corresponding to the level 1 search interval containing item X. A function F2(Ptr, X) finds the SITAB_2 entry corresponding to the level 2 search interval containing item X, where Ptr is a pointer to a part of the SITAB_2. Functions to find entries at further levels (e.g., SITAB_3, SITAB_4, etc.) work similarly. A function FNR(Ptr, X) finds the NRTAB_X entry corresponding to the item X.

The highest-priority tag for an item X is found as follows. F1(X) is calculated to obtain the corresponding entry from SITAB_1. If the discriminator of the entry indicates that the SI_1 containing item X is a uniform interval, then the entry contains the highest-priority tag for the item X and searching is complete. Otherwise, the entry contains a pointer to a part of SITAB_2. F2(Ptr, X) is calculated to obtain the corresponding entry from SITAB_2. This process continues at subsequent levels of the multi-level search table until the highest-priority tag is found.

For example, in the case of searching for the best-matching routing prefix (out of 64K routing prefixes) for a given IP destination address ADDR, n=4G and m=64K. Assume that the multi-level search table has two levels, and that all intervals at a particular level have the same size. If $N_1$=4M and $N_2$=64, then the size $N_{nu}$ of each part of the NRTAB_X is 64 (4G/(4M*64)). In this case, F1(ADDR)=(ADDR>>12), F2(Ptr, ADDR)=(Ptr+((ADDR>>16) & 0x3F)), and FNR(Ptr, ADDR)=(Ptr+(ADDR & 0x3f)). The total number of entries $N_e$ in the multi-level search table is therefore $N_1+2mN_2+2mN_{nu}$, for a total of 20M entries.

In some cases tag ranges depend on each other. Such dependencies can be used to save memory and/or provide other efficiencies. For example, tag ranges can be in a less-specific/more-specific relationship to each other. This means that for any two tag ranges, (1) the two tag ranges have no common points, (2) the two tag ranges are the same, or (3) one tag range is completely contained within the other. If, in a particular case, it is possible to select search intervals that are in a less-specific/more-specific relationship to each other for all possible tag ranges, then $N_{nu}<=m$, and it is possible to use default tables, such as the default prefix tables described above.

Other Embodiments

As described above, the result of a search operation is a prefix ID corresponding to a single prefix in the prefix database. Alternatively, an identifier may be assigned to a contiguous sequence of prefixes, allowing a search to result in an identifier of the best-matching sequence of prefixes. Sequences may each contain the same number of prefixes or may contain variable numbers of prefixes.

A non-uniform search interval ID (NSI ID) stored at a level L of the multi-level search table may be used to directly calculate the offset of the first address of the corresponding sub-table in level L+1 of the multi-level search table. However, the NSI ID may take other forms, such as a pointer to the first address of the corresponding sub-table.

Although levels of the search table may be implemented using contiguous blocks of memory, levels of the search table may be represented in other ways, such as non-contiguous blocks of memory residing in the same physical memory device or in different memory devices.

The number of level 1 search intervals may be less than the number of entries in the prefix database. In such a case the number of level 1 non-uniform search intervals is limited by the total number of search intervals rather than the number of prefixes in the prefix database, and the number of level 2 intervals will be fewer than in the examples described above.

Search intervals may vary in size.

As described above, default prefix tables may be stored in dedicated default prefix memories. However, dedicated memories need not be used to store default prefix tables. For example, default prefix tables may be stored in the same memories as search interval tables. More broadly, any appropriate combination of memories may be used to store search interval tables, non-uniform resolution tables, and default prefix tables. Furthermore, in addition to the memory technologies described above (DRAM and SRAM), other memory technologies, such as RamBUS and SLDRAM, may be used instead of or in combination with other memory technologies. Where values, such as table entries, are described above as having a certain length (e.g., 17 bits), such values may be stored using physical memory which is more narrow, less narrow, or the same width as the value. Values described above, such as prefix identifiers and non-uniform search interval identifiers, may each be stored in a single physical memory location or be combined with other values into a single memory location.

It is also feasible to use information other than PIDs (e.g., next-hop and interface information) as the result of search operations. Also, prefix ID's may be kept in shadow memory which is used for updates while forwarding information (next hop and interface information) is stored directly in search memory to be used for searches.

A single search device may be used to perform a search on several unrelated classes of patterns by, for example, pre-pending each pattern with a unique class identifier before performing search.

The information retrieved from the multi-level search table may be used for purposes other than forwarding of packets. For example, the result of a search can be used for filtering, i.e., to determine whether or not to forward a packet.

If the distribution of the lengths of prefixes is known, it is possible to reduce the cost of the device or to improve its performance by taking this distribution into account when defining the number of levels in the search table and the size of the intervals in each level. The search device may reconfigure the structure of its search table dynamically according to changes in the distribution of prefix lengths in the prefix database.

If different memory technologies are combined in the same search device, it is possible to perform transparent updates to the faster memories. For example, if the SRAM memory is used to store the SITAB_1, and the rest of the search device uses DRAM technology, then the throughput of the device is limited by the access time of the DRAM memory. The SRAM memory, however, can perform two operations—one search and one update—during the time it takes to perform a single search operation in DRAM.

In the examples described above (e.g., the search device 400 shown in FIG. 9), part of the destination address is present at the input of each stage (except for the first stage) before any applicable non-uniform search interval identifier is propagated to the stage. The availability of this information can be used to reduce the delay per stage by, for example, using the available parts of the destination address to pre-charge the rows of DRAM memories if such memories are used.

The techniques described above may be used to perform matching of patterns which do not have a prefix structure. For example, patterns can effectively be matched by converting the patterns into prefixes before matching is performed. Another example is wildcard matching where part of a prefix can match to any prefix.

The present invention has been described in terms of an embodiment. The invention, however, is not limited to the embodiment depicted and described. Rather, the scope of the invention is defined by the claims.

What is claimed is:

1. A device for identifying an item that is an optimal match for a search key, the device comprising:
   a first search stage, comprising an input for receiving a signal corresponding to a first part of the search key, a first output for developing a first control signal indicating whether the item can be identified from the first part of the search key, and a second output for developing a first item identifier signal identifying the item if the item can be identified from the first part of the search key and for developing a second control signal if the item cannot be identified from the first part of the search key;
   a second search stage for identifying the item based on the second control signal and a second part of the search key, comprising a first input coupled-to the second output of the first search stage, a second input for receiving a signal corresponding to the second part of the search key, and the first output for developing a second item identifier signal identifying the item; and
   a demultiplexor for selecting a select one of the first item identifier signal and the second item identifier signal based on the first control signal.

2. The device of claim 1, wherein the item corresponds to a range of Internet Protocol addresses.

3. The device of claim 2, wherein the item comprises an Internet Protocol address prefix.

4. The device of claim 2, wherein the range of Internet Protocol addresses includes addresses corresponding to multiple Internet Protocol address prefixes.

5. The device of claim 2, wherein the search key comprises an Internet Protocol address.

6. The device of claim 5, wherein the item that is the optimal match for the search key comprises the longest prefix in a prefix database that matches the search key.

7. The device of claim 5, wherein the first part of the search key comprises a contiguous sequence of bits in the destination address.

8. The device of claim 5, wherein the second part of the identifier comprises a contiguous sequence of bits in the destination address.

9. The device of claim 5, wherein the first search stage comprises a first search table memory.

10. The device of claim 9, wherein the first search table memory stores a first search table, wherein entries in the first search table correspond to ranges of Internet Protocol addresses, some entries in the first search table store prefix identifiers for developing the first item identifier signal, and some entries store second search stage identifiers for developing the second control signal.

11. The device of claim 5, wherein:
the second search stage comprises a second search table memory; and
the second control signal comprises an addressing signal for partially addressing the second search table memory.

12. The device of claim 11, wherein the second search table memory stores a second search table, entries in the second search table corresponding to ranges of Internet Protocol addresses, the entries storing prefix identifiers for developing the second item identifier signal.

13. The device of claim 1, further comprising:
default memories for storing default values of items.

14. The device of claim 1, wherein the demultiplexor comprises a first control input coupled to the first output of the first search stage, a first data input coupled to the second output of the first search stage, and a second data input coupled to the output of the second search stage, and wherein the demultiplexor selects the first prefix identifier signal if the first control signal indicates that the prefix can be identified from the first part of the destination address, and selects the second prefix identifier signal otherwise.

15. The device of claim 1, wherein the second search stage operates simultaneously with the first search stage.

16. A computer-implemented method for searching a multi-level search table for a best-matching item identifier specifying an item corresponding to a search key, the method comprising the steps of:
searching a first level of the search table with a first part of the search key,
when an entry in the first level of the search table corresponds to the first part of the search key, identifying the entry corresponding to the first part of the search key as the best matching entry, and
if the entry contains an item identifier, providing a first level output identifying the item identifier in the entry as the best-matching item identifier; and
providing a first level output representing a first default value when an entry corresponding to the first part of the search key is not found, wherein a default value is the first shorter portion of a part of the search key corresponding to the entry in the search table,
otherwise, searching a subsequent level of the multi-level search table with the first default value and a second part of the search key for the best-matching item identifier using information associated with the entry that is descriptive of the subsequent level and of the first default value to provide as subsequent level output one of a subsequent level item identifier and a subsequent level default value, and
selecting the first level output or the subsequent level output as the item identifier matching the search key.

17. The method of claim 16, wherein searching the subsequent level of the multi-level search table results in information descriptive of a second default value, and further comprising replacing the second default value with the first default value.

18. The method of claim 16, wherein the item comprises a prefix of an Internet Protocol address.

19. The method of claim 18, wherein the search key comprises an Internet Protocol address.

20. The method of claim 19, wherein the information contained in the entry identifies a part of the subsequent level of the multi-level search table corresponding to the destination address.

21. The method of claim 20, wherein the part comprises a sub-table of the subsequent level of the multi-level search table.

22. The method of claim 20, wherein the part comprises an entry of the subsequent level of the multi-level search table.

23. A computer-implemented method for searching a multi-level search table for a best-matching item identifier specifying an item corresponding to a search key, the method comprising the steps of:
identifying an entry in a first level of the search table corresponding to the search key;
if the entry contains an item identifier, identifying the best-matching item identifier the item identifier contained in the entry;
otherwise, searching a subsequent level of the multi-level search table for the best-matching item identifier using information associated with the entry that is descriptive of the subsequent level and of a first default value, and wherein
the item comprises a prefix of an Internet Protocol address,
the search key comprises an Internet Protocol address, and
entries in the multi-level search table correspond to ranges of Internet Protocol addresses, and wherein
if a prefix database contains a prefix corresponding to all Internet Protocol addresses within a range, then the entry in the search table corresponding to the range identifies the prefix; and
otherwise, the entry in the search table corresponding to the range identifies a part of a subsequent level of the search table corresponding to the destination address.

24. The method of claim 16, further comprising:
if the entry indicates a default item identifier, identifying as the best-matching item identifier a default item identifier corresponding to the search key.

25. The method of claim 24, wherein the item comprises a prefix of an Internet Protocol address, and wherein the search key comprises an Internet Protocol address.

26. The method of claim 24, wherein:
the default item identifier is stored in a table of default item identifiers; and
the default item identifier is located in the table of default item identifiers using the search key.

27. The method of claim 16, further comprising:

generating an exception if the item identifier is associated with exception information descriptive of the search key.

28. A data structure tangibly stored on a computer-readable medium, the data structure representing a multi-level search table for identifying a best-matching prefix identifier identifying a prefix corresponding to a destination address, the data structure comprising:

a plurality of levels of search tables, entries of the search tables corresponding to ranges of Internet Protocol addresses, wherein:

if a prefix database contains a prefix corresponding to all Internet Protocol addresses within a range, then an entry in the search table corresponding to the range identifies the prefix; and otherwise, the entry in the search table corresponding to the range identifies a part of a subsequent level of the search table corresponding to the destination address; and a plurality of levels of default prefix tables, entries of the default prefix tables corresponding to default prefixes for ranges corresponding to entries in the search tables.

29. The data structure of claim 28, wherein:

if a prefix corresponding to all and only all of the addresses within the range is contained in a prefix database, then the default prefix of the range is the prefix; and otherwise, the default prefix of the range is the first prefix in the prefix database that is less specific than the prefix.

30. The computer-implemented method of claim 16 for searching a multi-level search table for a best-matching item identifier specifying an item corresponding to a search key, further comprising a computer-implemented method for updating a multi-level search table in response to addition of an item to an item database, the item corresponding to a level of the multi-level search table, the item addition updating method comprising:

updating the level of the search table; and updating a default table corresponding to the level of the search table.

31. The method of claim 30, wherein the item comprises an Internet Protocol address prefix and wherein the search key comprises an Internet Protocol address.

32. The method of claim 31, wherein entries in the default table correspond to ranges of Internet Protocol addresses corresponding to the level of the search table, and wherein entries of the default table contain default prefixes for the ranges of Internet Protocol addresses.

33. The method of claim 30, wherein entries of a first level of the multi-level search table contain a default value, and wherein other levels of the multi-level search table contain a default value designator.

34. The method of claim 30, wherein updating is pipelined.

35. The computer-implemented method of claim 16 for searching a multi-level search table for a best-matching item identifier specifying an item corresponding to a search key, further comprising a computer-implemented method for updating a multi-level search table in response to deletion of an item from an item database, the item corresponding to a level of the multi-level search table, the item deletion updating method comprising:

updating the level of the search table; and updating a default table corresponding to the level of the search table.

36. The method of claim 35, wherein the item comprises an Internet Protocol address prefix and wherein the search key comprises an Internet Protocol address.

37. The method of claim 36, wherein entries in the default table correspond to ranges of Internet Protocol addresses corresponding to the level of the search table, and wherein entries of the default table contain default prefixes for the ranges of Internet Protocol addresses.

38. The method of claim 35, wherein entries of a first level of the multi-level search table contain a default value, and wherein other levels of the multi-level search table contain a default value designator.

39. The method of claim 34, wherein updating is pipelined.

40. The method of claim 35, further comprising detecting whether the prefix is the only prefix in the item database that is more specific than a range of Internet Protocol addresses corresponding to an entry in the multi-level search table.

* * * * *